(12) United States Patent
Wixson et al.

(10) Patent No.: US 11,836,973 B2
(45) Date of Patent: Dec. 5, 2023

(54) AUTOMATED DIRECTION OF CAPTURING IN-ROOM INFORMATION FOR USE IN USABILITY ASSESSMENT OF BUILDINGS

(71) Applicant: MFTB Holdco, Inc., Seattle, WA (US)

(72) Inventors: Lambert E. Wixson, Bellevue, WA (US); Christopher Buehler, Seattle, WA (US)

(73) Assignee: MFTB Holdco, Inc., Seattle, WA (US)

( * ) Notice: Subject to any disclaimer, the term of this patent is extended or adjusted under 35 U.S.C. 154(b) by 180 days.

(21) Appl. No.: 17/185,816

(22) Filed: Feb. 25, 2021

(65) Prior Publication Data

US 2022/0269885 A1    Aug. 25, 2022

(51) Int. Cl.
*G06V 20/00* (2022.01)
*G06T 7/70* (2017.01)
(Continued)

(52) U.S. Cl.
CPC ............ *G06V 20/00* (2022.01); *G06F 18/24* (2023.01); *G06N 3/08* (2013.01); *G06T 7/0002* (2013.01);
(Continued)

(58) Field of Classification Search
CPC .... G06K 9/6267; G06N 3/08; G06N 5/23238; G06T 2207/20084; G06T 2207/30168;
(Continued)

(56) References Cited

U.S. PATENT DOCUMENTS 5,140,352 A    8/1992  Moore et al.
6,031,540 A    2/2000  Golin et al.
(Continued)

FOREIGN PATENT DOCUMENTS

EP    2413097 A2    2/2012
EP    2505961 A2    10/2012
(Continued)

OTHER PUBLICATIONS

CubiCasa | From video to floor plan in under 5 minutes, retrieved on Mar. 26, 2019, from https://www.cubi.casa/, 6 pages.
(Continued)

*Primary Examiner* — Jin Cheng Wang
(74) *Attorney, Agent, or Firm* — VLP Law Group LLP; James A. D. White

(57) ABSTRACT

Techniques are described for automated operations related to analyzing visual data from images captured in rooms of a building and optionally additional captured data about the rooms to assess room layout and other usability information for the building's rooms and optionally for the overall building, and to subsequently using the assessed usability information in one or more further automated manners, such as to improve navigation of the building. The automated operations may include identifying one or more objects in each of the rooms to assess and one or more target attributes of each object, and generating and providing instructions to cause the capture of images and optionally additional data about those objects and target attributes for further automated analysis, such as instructions provided to an automated image acquisition device in the room and/or an associated user. Once received, the captured images and other data is then analyzed accordingly.

30 Claims, 23 Drawing Sheets

(51) Int. Cl.
*G06N 3/08* (2023.01)
*G06T 7/00* (2017.01)
*G06T 11/00* (2006.01)
*G06F 18/24* (2023.01)
*H04N 23/60* (2023.01)
*H04N 23/698* (2023.01)

(52) U.S. Cl.
CPC ............... *G06T 7/70* (2017.01); *G06T 11/00* (2013.01); *H04N 23/64* (2023.01); *H04N 23/698* (2023.01); *G06T 2207/10016* (2013.01); *G06T 2207/20084* (2013.01); *G06T 2207/30168* (2013.01)

(58) Field of Classification Search
CPC ............ G06T 2207/10016; G06T 7/70; G06T 7/0002; G06V 10/82; G06V 20/36; G06V 10/993; G06V 20/00
See application file for complete search history.

(56) References Cited

U.S. PATENT DOCUMENTS

| | | | |
|---|---|---|---|
| 6,141,034 A | 10/2000 | McCutchen |
| 6,317,166 B1 | 11/2001 | McCutchen |
| 6,320,584 B1 | 11/2001 | Golin et al. |
| 6,323,858 B1 | 11/2001 | Gilbert et al. |
| 6,337,683 B1 | 1/2002 | Gilbert et al. |
| 6,654,019 B2 | 11/2003 | Gilbert et al. |
| 6,683,608 B2 | 1/2004 | Golin et al. |
| 6,690,374 B2 | 2/2004 | Park et al. |
| 6,731,305 B1 | 5/2004 | Park et al. |
| 6,738,073 B2 | 5/2004 | Park et al. |
| 7,050,085 B1 | 5/2006 | Park et al. |
| 7,129,971 B2 | 10/2006 | McCutchen |
| 7,196,722 B2 | 3/2007 | White et al. |
| 7,525,567 B2 | 4/2009 | McCutchen |
| 7,620,909 B2 | 11/2009 | Park et al. |
| 7,627,235 B2 | 12/2009 | McCutchen et al. |
| 7,782,319 B2 | 8/2010 | Ghosh et al. |
| 7,791,638 B2 | 9/2010 | McCutchen |
| 7,909,241 B2 | 3/2011 | Stone et al. |
| 7,973,838 B2 | 7/2011 | McCutchen |
| 8,072,455 B2 | 12/2011 | Temesvari et al. |
| 8,094,182 B2 | 1/2012 | Park et al. |
| RE43,786 E | 11/2012 | Cooper |
| 8,463,020 B1 | 6/2013 | Schuckmann et al. |
| 8,517,256 B2 | 8/2013 | Stone et al. |
| 8,520,060 B2 | 8/2013 | Zomet et al. |
| 8,523,066 B2 | 9/2013 | Stone et al. |
| 8,523,067 B2 | 9/2013 | Stone et al. |
| 8,528,816 B2 | 9/2013 | Stone et al. |
| 8,540,153 B2 | 9/2013 | Stone et al. |
| 8,594,428 B2 | 11/2013 | Aharoni et al. |
| 8,654,180 B2 | 2/2014 | Zomet et al. |
| 8,666,815 B1 | 3/2014 | Chau |
| 8,699,005 B2 | 4/2014 | Likholyot |
| 8,705,892 B2 | 4/2014 | Aguilera et al. |
| RE44,924 E | 6/2014 | Cooper et al. |
| 8,854,684 B2 | 10/2014 | Zomet |
| 8,861,840 B2 | 10/2014 | Bell et al. |
| 8,861,841 B2 | 10/2014 | Bell et al. |
| 8,879,828 B2 | 11/2014 | Bell et al. |
| 8,953,871 B2 | 2/2015 | Zomet |
| 8,989,440 B2 | 3/2015 | Klusza et al. |
| 8,996,336 B2 | 3/2015 | Malka et al. |
| 9,021,947 B2 | 5/2015 | Landa |
| 9,026,947 B2 | 5/2015 | Lee et al. |
| 9,035,968 B2 | 5/2015 | Zomet |
| 9,041,796 B2 | 5/2015 | Malka et al. |
| 9,071,714 B2 | 6/2015 | Zomet |
| 9,129,438 B2 | 9/2015 | Aarts et al. |
| 9,151,608 B2 | 10/2015 | Malka et al. |
| 9,165,410 B1 | 10/2015 | Bell et al. |
| 9,171,405 B1 | 10/2015 | Bell et al. |
| 9,324,190 B2 | 4/2016 | Bell et al. |
| 9,361,717 B2 | 6/2016 | Zomet |
| 9,396,586 B2 | 7/2016 | Bell et al. |
| 9,438,759 B2 | 9/2016 | Zomet |
| 9,438,775 B2 | 9/2016 | Powers et al. |
| 9,489,775 B1 | 11/2016 | Bell et al. |
| 9,495,783 B1 | 11/2016 | Samarasekera et al. |
| 9,576,401 B2 | 2/2017 | Zomet |
| 9,619,933 B2 | 4/2017 | Spinella-Marno et al. |
| 9,635,252 B2 | 4/2017 | Accardo et al. |
| 9,641,702 B2 | 5/2017 | Bin-Nun et al. |
| 9,760,994 B1 | 9/2017 | Bell et al. |
| 9,786,097 B2 | 10/2017 | Bell et al. |
| 9,787,904 B2 | 10/2017 | Birkler et al. |
| 9,836,885 B1 | 12/2017 | Eraker et al. |
| 9,852,351 B2 | 12/2017 | Aguilera Perez et al. |
| 9,953,111 B2 | 4/2018 | Bell et al. |
| 9,953,430 B1 | 4/2018 | Zakhor |
| 9,990,760 B2 | 6/2018 | Aguilera Perez et al. |
| 9,990,767 B2 | 6/2018 | Sheffield et al. |
| 10,026,224 B2 | 7/2018 | Bell et al. |
| 10,030,979 B2 | 7/2018 | Bjorke et al. |
| 10,055,876 B2 | 8/2018 | Ford et al. |
| 10,068,344 B2 | 9/2018 | Jovanovic et al. |
| 10,083,522 B2 | 9/2018 | Jovanovic et al. |
| 10,102,639 B2 | 10/2018 | Bell et al. |
| 10,102,673 B2 | 10/2018 | Eraker et al. |
| 10,120,397 B1 | 11/2018 | Zakhor et al. |
| 10,122,997 B1 | 11/2018 | Sheffield et al. |
| 10,127,718 B2 | 11/2018 | Zakhor et al. |
| 10,127,722 B2 | 11/2018 | Shakib et al. |
| 10,139,985 B2 | 11/2018 | Mildrew et al. |
| 10,163,261 B2 | 12/2018 | Bell et al. |
| 10,163,271 B1 | 12/2018 | Powers et al. |
| 10,181,215 B2 | 1/2019 | Sedeffow |
| 10,192,115 B1 | 1/2019 | Sheffield et al. |
| 10,204,185 B2 | 2/2019 | Mrowca et al. |
| 10,210,285 B2 | 2/2019 | Wong et al. |
| 10,235,797 B1 | 3/2019 | Sheffield et al. |
| 10,242,400 B1 | 3/2019 | Eraker et al. |
| 10,339,716 B1 | 7/2019 | Powers et al. |
| 10,366,531 B2 | 7/2019 | Sheffield |
| 10,375,306 B2 | 8/2019 | Shan et al. |
| 10,395,435 B2 | 8/2019 | Powers et al. |
| 10,530,997 B2 | 1/2020 | Shan et al. |
| 10,643,386 B2 | 5/2020 | Li et al. |
| 10,708,507 B1 | 7/2020 | Dawson et al. |
| 10,809,066 B2 | 10/2020 | Colburn et al. |
| 10,825,247 B1 | 11/2020 | Vincent et al. |
| 10,834,317 B2 | 11/2020 | Shan et al. |
| 11,057,561 B2 | 7/2021 | Shan et al. |
| 11,164,361 B2 | 11/2021 | Moulon et al. |
| 11,164,368 B2 | 11/2021 | Vincent et al. |
| 11,165,959 B2 | 11/2021 | Shan et al. |
| 11,217,019 B2 | 1/2022 | Li et al. |
| 11,238,652 B2 | 2/2022 | Impas et al. |
| 11,243,656 B2 | 2/2022 | Li et al. |
| 11,252,329 B1 | 2/2022 | Cier et al. |
| 11,284,006 B2 | 3/2022 | Dawson et al. |
| 11,405,549 B2 | 8/2022 | Cier et al. |
| 11,405,558 B2 | 8/2022 | Dawson et al. |
| 11,408,738 B2 | 8/2022 | Colburn et al. |
| 2006/0256109 A1 | 11/2006 | Acker et al. |
| 2010/0232709 A1 | 9/2010 | Zhang et al. |
| 2012/0075414 A1 | 3/2012 | Park et al. |
| 2012/0293613 A1 | 11/2012 | Powers et al. |
| 2013/0050407 A1 | 2/2013 | Brinda et al. |
| 2013/0342533 A1 | 12/2013 | Bell et al. |
| 2014/0043436 A1 | 2/2014 | Bell et al. |
| 2014/0044343 A1 | 2/2014 | Bell et al. |
| 2014/0044344 A1 | 2/2014 | Bell et al. |
| 2014/0125658 A1 | 5/2014 | Bell et al. |
| 2014/0125767 A1 | 5/2014 | Bell et al. |
| 2014/0125768 A1 | 5/2014 | Bell et al. |
| 2014/0125769 A1 | 5/2014 | Bell et al. |
| 2014/0125770 A1 | 5/2014 | Bell et al. |
| 2014/0236482 A1 | 8/2014 | Dorum et al. |
| 2014/0267631 A1 | 9/2014 | Powers et al. |
| 2014/0307100 A1 | 10/2014 | Myllykoski et al. |

(56) References Cited

U.S. PATENT DOCUMENTS

| | | |
|---|---|---|
| 2014/0320674 A1 | 10/2014 | Kuang |
| 2015/0116691 A1 | 4/2015 | Likholyot |
| 2015/0189165 A1 | 7/2015 | Milosevski et al. |
| 2015/0262421 A1 | 9/2015 | Bell et al. |
| 2015/0269785 A1 | 9/2015 | Bell et al. |
| 2015/0302636 A1 | 10/2015 | Arnoldus et al. |
| 2015/0310596 A1 | 10/2015 | Sheridan et al. |
| 2015/0332464 A1 | 11/2015 | O'Keefe et al. |
| 2016/0055268 A1 | 2/2016 | Bell et al. |
| 2016/0134860 A1 | 5/2016 | Jovanovic et al. |
| 2016/0140676 A1 | 5/2016 | Fritze et al. |
| 2016/0217225 A1 | 7/2016 | Bell et al. |
| 2016/0260250 A1 | 9/2016 | Jovanovic et al. |
| 2016/0286119 A1 | 9/2016 | Rondinelli |
| 2016/0300385 A1 | 10/2016 | Bell et al. |
| 2017/0034430 A1 | 2/2017 | Fu et al. |
| 2017/0067739 A1 | 3/2017 | Siercks et al. |
| 2017/0194768 A1 | 7/2017 | Powers et al. |
| 2017/0195654 A1 | 7/2017 | Powers et al. |
| 2017/0263050 A1 | 9/2017 | Ha et al. |
| 2017/0324941 A1 | 11/2017 | Birkler |
| 2017/0330273 A1 | 11/2017 | Holt et al. |
| 2017/0337737 A1 | 11/2017 | Edwards et al. |
| 2018/0007340 A1 | 1/2018 | Stachowski |
| 2018/0025536 A1 | 1/2018 | Bell et al. |
| 2018/0075168 A1 | 3/2018 | Tiwari et al. |
| 2018/0139431 A1 | 5/2018 | Simek et al. |
| 2018/0143023 A1 | 5/2018 | Bjorke et al. |
| 2018/0143756 A1 | 5/2018 | Mildrew et al. |
| 2018/0144487 A1 | 5/2018 | Bell et al. |
| 2018/0144535 A1 | 5/2018 | Ford et al. |
| 2018/0144547 A1 | 5/2018 | Shakib et al. |
| 2018/0144555 A1 | 5/2018 | Ford et al. |
| 2018/0146121 A1 | 5/2018 | Hensler et al. |
| 2018/0146193 A1 | 5/2018 | Safreed et al. |
| 2018/0146212 A1 | 5/2018 | Hensler et al. |
| 2018/0165871 A1 | 6/2018 | Mrowca |
| 2018/0203955 A1 | 7/2018 | Bell et al. |
| 2018/0241985 A1 | 8/2018 | O'Keefe et al. |
| 2018/0293793 A1 | 10/2018 | Bell et al. |
| 2018/0300936 A1 | 10/2018 | Ford et al. |
| 2018/0306588 A1 | 10/2018 | Bjorke et al. |
| 2018/0348854 A1 | 12/2018 | Powers et al. |
| 2018/0365496 A1 | 12/2018 | Hovden et al. |
| 2019/0012833 A1 | 1/2019 | Eraker et al. |
| 2019/0020816 A1* | 1/2019 | Shan .................. G01P 1/127 |
| 2019/0020817 A1* | 1/2019 | Shan .................. H04N 23/698 |
| 2019/0026956 A1 | 1/2019 | Gausebeck et al. |
| 2019/0026957 A1 | 1/2019 | Gausebeck |
| 2019/0026958 A1 | 1/2019 | Gausebeck et al. |
| 2019/0035165 A1 | 1/2019 | Gausebeck |
| 2019/0041972 A1 | 2/2019 | Bae |
| 2019/0050137 A1 | 2/2019 | Mildrew et al. |
| 2019/0051050 A1 | 2/2019 | Bell et al. |
| 2019/0051054 A1 | 2/2019 | Jovanovic et al. |
| 2019/0087067 A1 | 3/2019 | Hovden et al. |
| 2019/0122422 A1 | 4/2019 | Sheffield et al. |
| 2019/0164335 A1 | 5/2019 | Sheffield et al. |
| 2019/0180104 A1 | 6/2019 | Sheffield et al. |
| 2019/0251645 A1 | 8/2019 | Winans |
| 2019/0266293 A1* | 8/2019 | Ishida .................. G06F 30/00 |
| 2019/0287164 A1 | 9/2019 | Eraker et al. |
| 2020/0074668 A1* | 3/2020 | Stenger .................. G06V 10/82 |
| 2020/0302681 A1* | 9/2020 | Totty .................. G06T 7/74 |
| 2020/0336675 A1 | 10/2020 | Dawson et al. |
| 2020/0389602 A1 | 12/2020 | Dawson et al. |
| 2020/0408532 A1 | 12/2020 | Colburn et al. |
| 2021/0004589 A1 | 1/2021 | Turkelson et al. |
| 2021/0021761 A1 | 1/2021 | Shan et al. |
| 2021/0027485 A1 | 1/2021 | Zhang |
| 2021/0044760 A1 | 2/2021 | Dawson et al. |
| 2021/0117582 A1* | 4/2021 | Kamenca .................. G06F 30/13 |
| 2021/0199809 A1* | 7/2021 | Wynn .................. G01S 17/931 |
| 2021/0377442 A1 | 12/2021 | Boyadzhiev et al. |
| 2021/0385378 A1 | 12/2021 | Cier et al. |
| 2022/0003555 A1 | 1/2022 | Colburn et al. |
| 2022/0028156 A1 | 1/2022 | Boyadzhiev et al. |
| 2022/0028159 A1 | 1/2022 | Vincent et al. |
| 2022/0076019 A1 | 3/2022 | Moulon et al. |
| 2022/0092227 A1 | 3/2022 | Yin et al. |
| 2022/0114291 A1 | 4/2022 | Li et al. |
| 2022/0164493 A1 | 5/2022 | Li et al. |
| 2022/0189122 A1 | 6/2022 | Li et al. |

FOREIGN PATENT DOCUMENTS

| | | |
|---|---|---|
| EP | 2506170 A2 | 10/2012 |
| KR | 101770648 B1 | 8/2017 |
| KR | 101930796 B1 | 12/2018 |
| WO | 2005091894 A2 | 10/2005 |
| WO | 2016154306 A1 | 9/2016 |
| WO | 2018170421 A1 | 9/2018 |
| WO | 2018204279 A1 | 11/2018 |
| WO | 2019083832 A1 | 5/2019 |
| WO | 2019104049 A1 | 5/2019 |
| WO | 2019118599 A2 | 6/2019 |

OTHER PUBLICATIONS

CubiCasa FAQ & Manual, retrieved on Mar. 26, 2019, from https://www.cubi.casa/faq/, 5 pages.

Cupix Home, retrieved on Mar. 26, 2019, from https://www.cupix.com/, 1 page.

Cupix—FAQ, retrieved on Mar. 26, 2019, from https://www.cupix.com/faq.html, 3 pages.

Guide: 3D Virtual Tours, retrieved on Mar. 26, 2019, from https://goiguide.com/, 6 pages.

immoviewer.com | Automated Video Creation & Simple Affordable 3D 360 Tours, retrieved on Mar. 26, 2019, from https://www.immoviewer.com/, 5 pages.

MagicPlan | #1 Floor Plan App, Construction & Surveying Samples, retrieved on Mar. 26, 2019, from https://www.magicplan.app/, 9 pages.

EyeSpy360 Virtual Tours | Virtual Tour with any 360 camera, retrieved on Mar. 27, 2019, from https://www.eyespy360.com/en-us/, 15 pages.

Indoor Reality, retrieved on Mar. 27, 2019, from https://www.indoorreality.com/, 9 pages.

InsideMaps, retrieved on Mar. 27, 2019, from https://www.insidemaps.com/, 7 pages.

Staging | Augmented & Virtual Reality Platform for Business, retrieved on Mar. 27, 2019, from https://www.istaging.com/en/, 7 pages.

Metareal, retrieved on Mar. 27, 2019, from https://www.metareal.com/, 4 pages.

PLNAR—The AR 3D Measuring / Modeling Platform, retrieved on Mar. 27, 2019, from https://www.plnar.co, 6 pages.

YouVR Global, retrieved on Mar. 27, 2019, from https://global.youvr.io/, 9 pages.

GeoCV, retrieved on Mar. 28, 2019, from https://geocv.com/, 4 pages.

Biersdorfer, J.D., "How to Make a 3-D Model of Your Home Renovation Vision," in the New York Times, Feb. 13, 2019, retrieved Mar. 28, 2019, 6 pages.

Chen et al. "Rise of the indoor crowd: Reconstruction of building interior view via mobile crowdsourcing." In: Proceedings of the 13th ACM Conference on Embedded Networked Sensor Systems. Nov. 4, 2015, 13 pages.

Immersive 3D for the Real World, retrieved from https://matterport.com/, on Mar. 27, 2017, 5 pages.

Learn About Our Complete 3D System, retrieved from https://matterport.com/how-it-works/, on Mar. 27, 2017, 6 pages.

Surefield FAQ, retrieved from https://surefield.com/faq, on Mar. 27, 2017, 1 page.

Why Surefield, retrieved from https://surefield.com/why-surefield, on Mar. 27, 2017, 7 pages.

Schneider, V., "Create immersive photo experiences with Google Photo Sphere," retrieved from http://geojournalism.org/2015/02/create-immersive-photo-experiences-with-google-photo-sphere/, on Mar. 27, 2017, 7 pages.

(56) References Cited

OTHER PUBLICATIONS

Tango (platform), Wikipedia, retrieved from https://en.wikipedia.org/wiki/Tango_(platform), on Jun. 12, 2018, 5 pages.
Zou et al. "LayoutNet: Reconstructing the 3D Room Layout from a Single RGB Image" in arXiv:1803.08999, submitted Mar. 23, 2018, 9 pages.
Lee et al. "RoomNet: End-to-End Room Layout Estimation" in arXiv:1703.00241v2, submitted Aug. 7, 2017, 10 pages.
Time-of-flight camera, Wikipedia, retrieved from https://en.wikipedia.org/wiki/Time-of-flight_camera, on Aug. 30, 2018, 8 pages.
Magicplan—Android Apps on Go . . . , retrieved from https://play.google.com/store/apps/details?id=com.sensopia.magicplan, on Feb. 21, 2018, 5 pages.
Kim et al., "Room Layout Estimation With Object and Material Attributes Information Using a Spherical Camera", 2016 ,Fourth International Conference on 3D Vision (3DV), Oct. 25-28, 2016, 9 pages.

\* cited by examiner

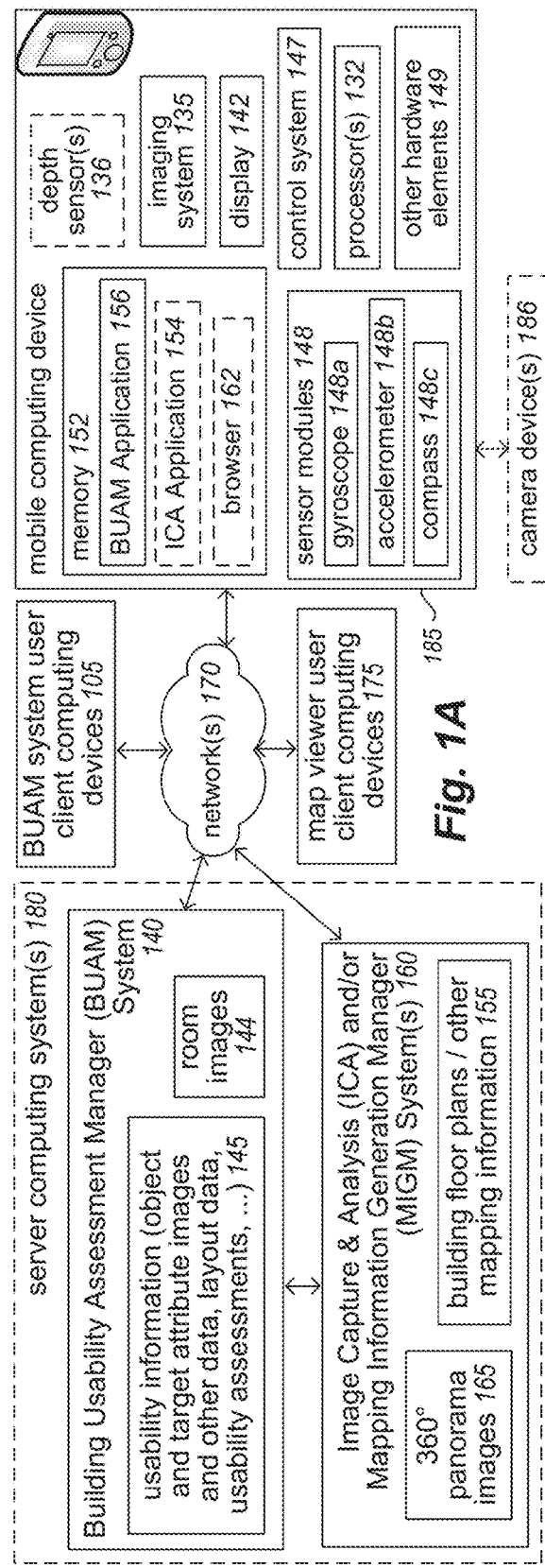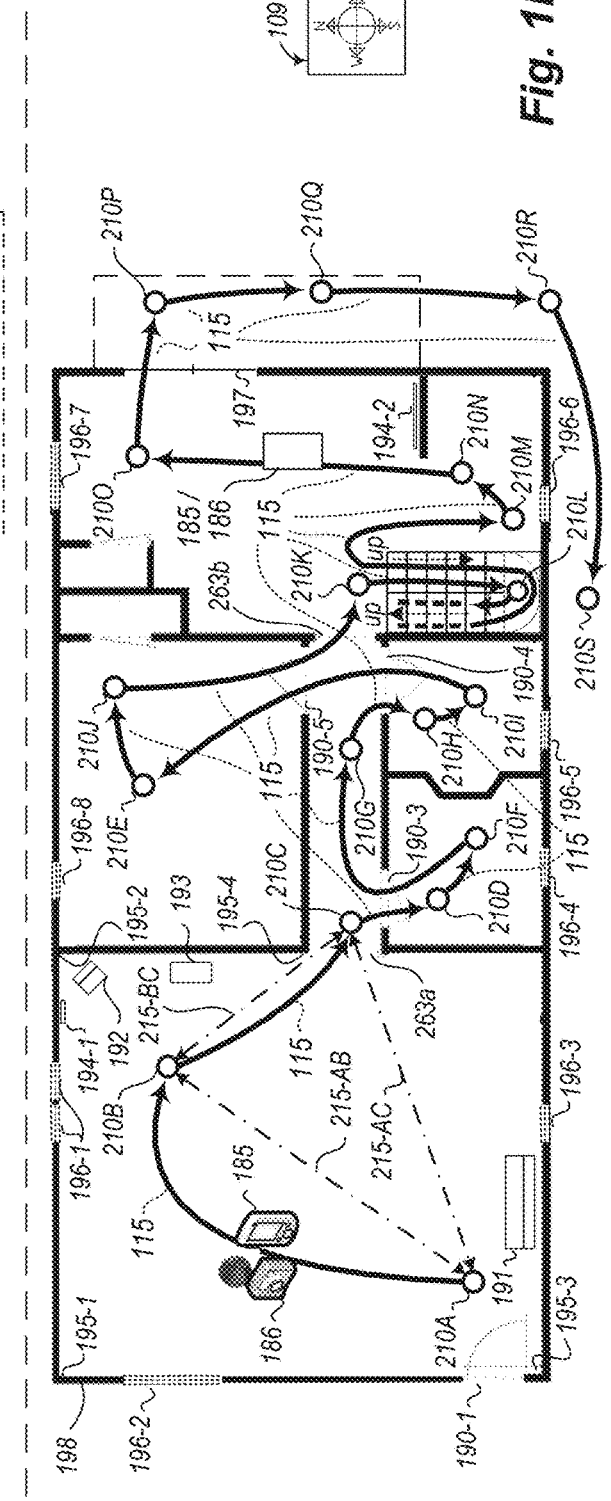
Fig. 1A
Fig. 1B

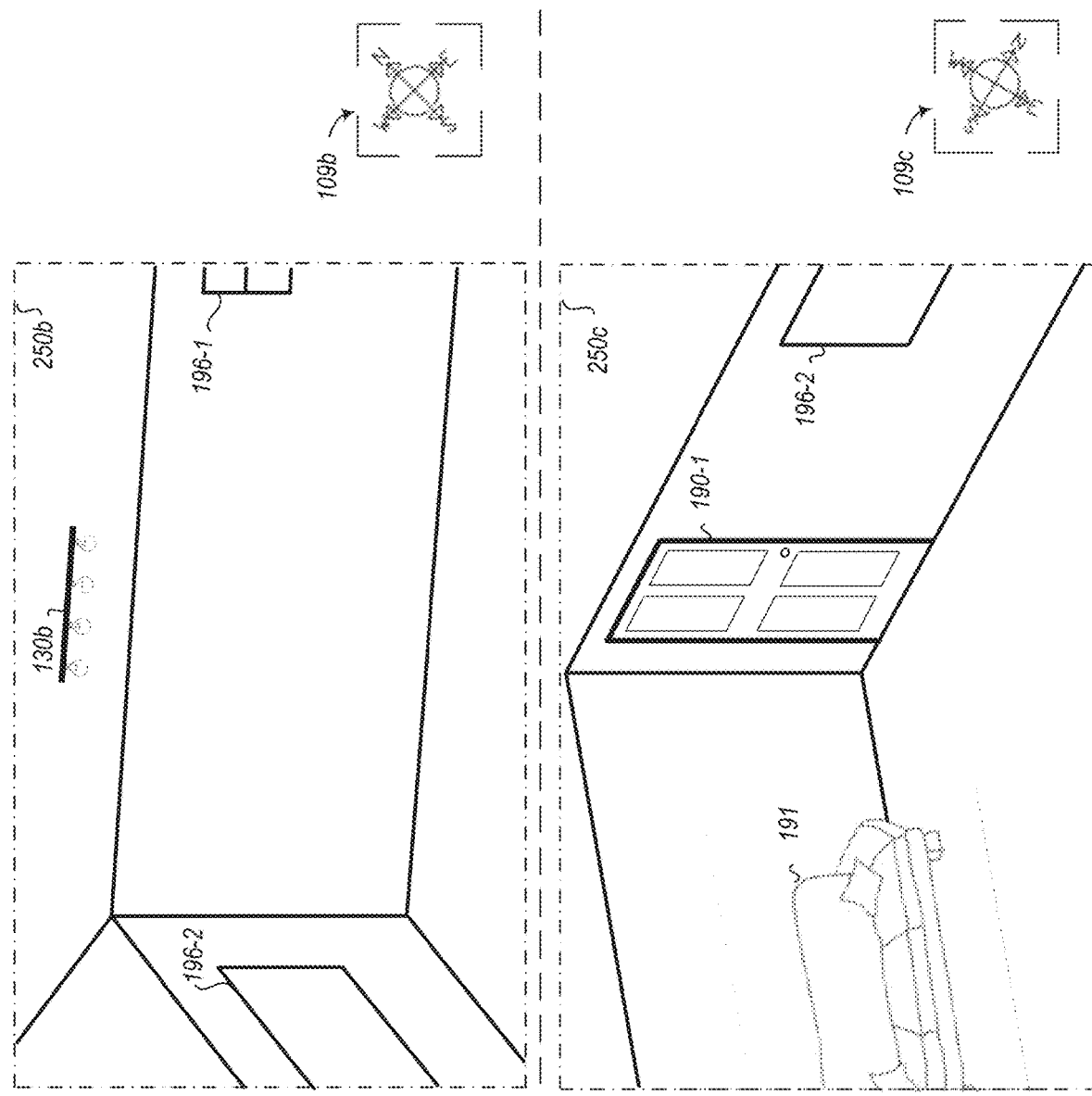

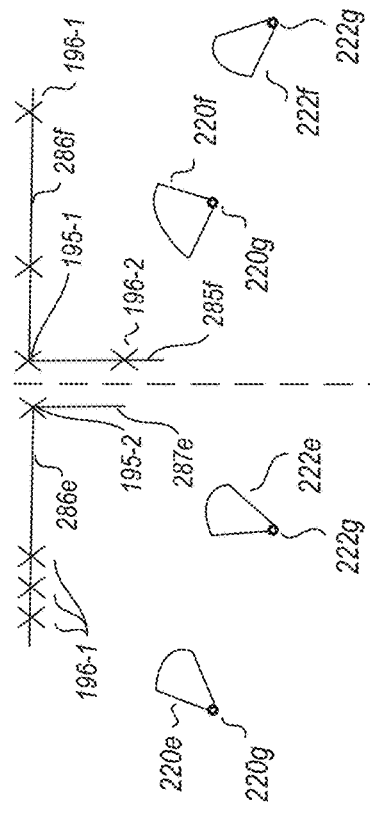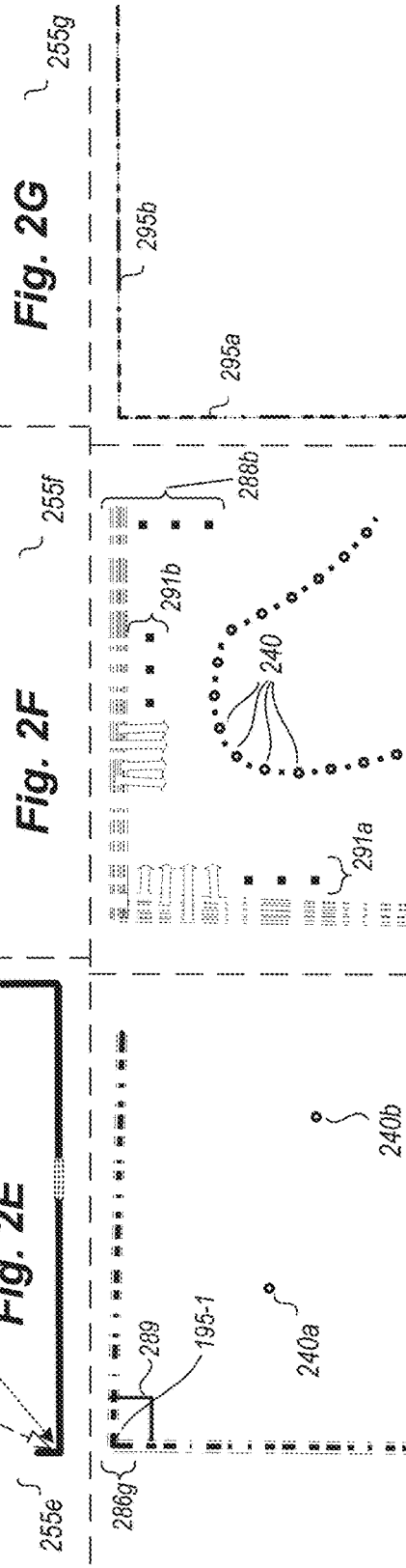

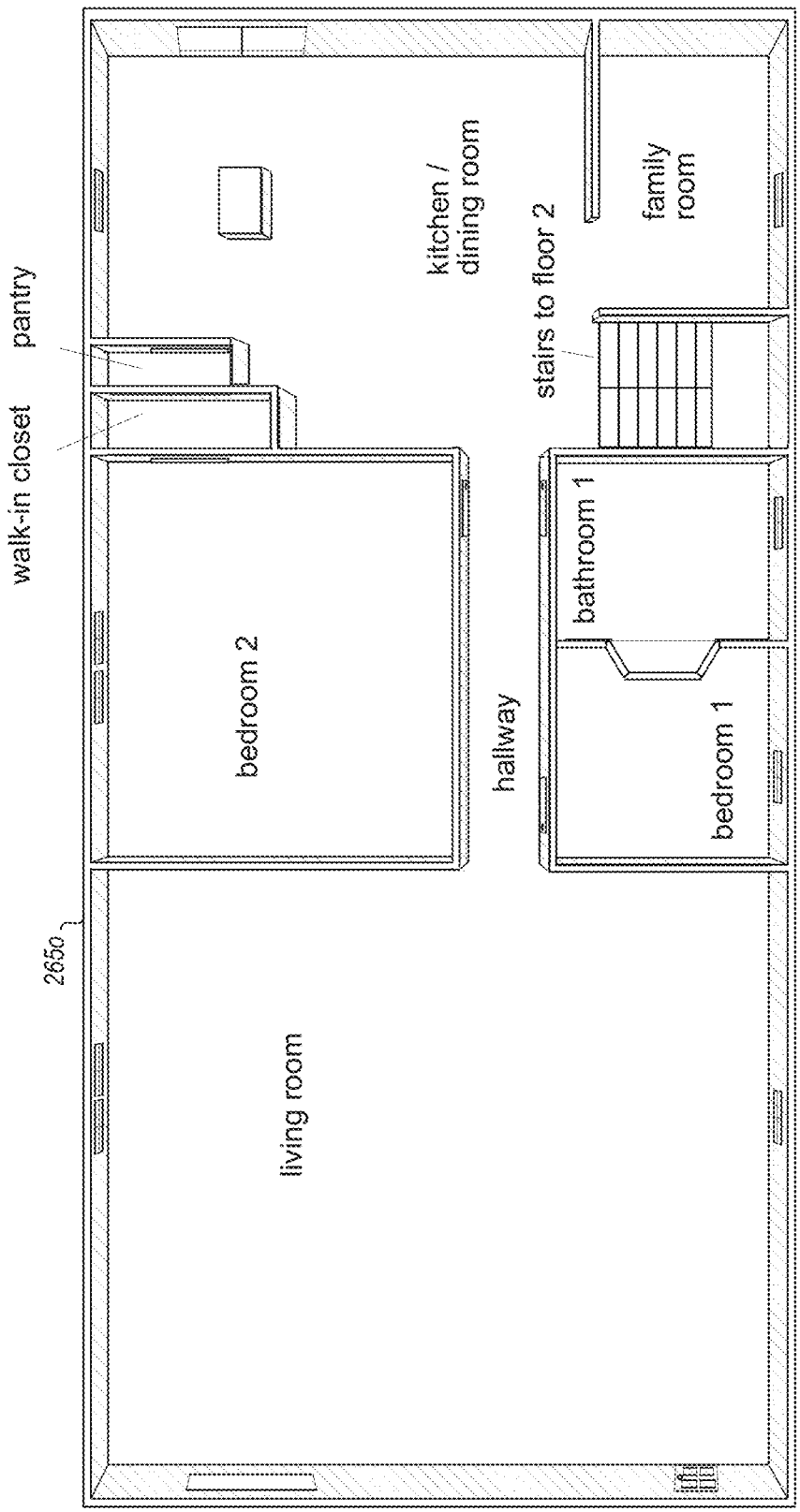
Fig. 2-O

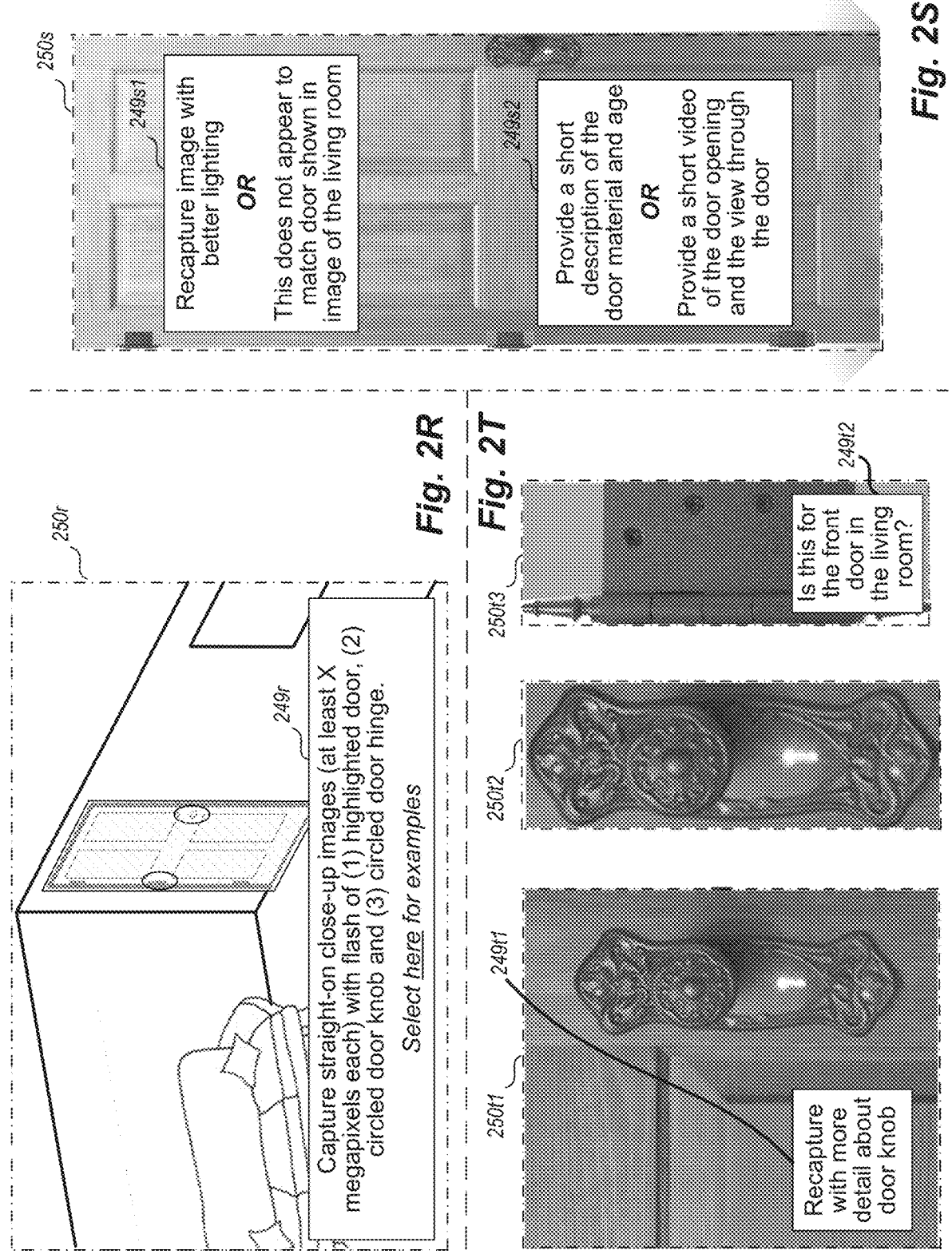

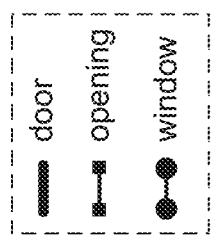
Fig. 2U
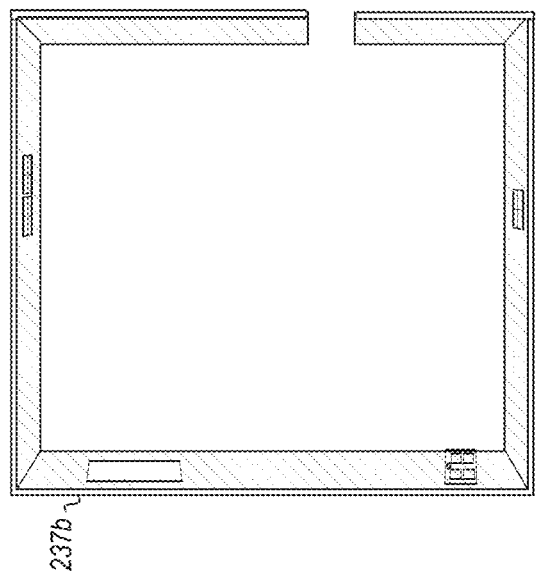
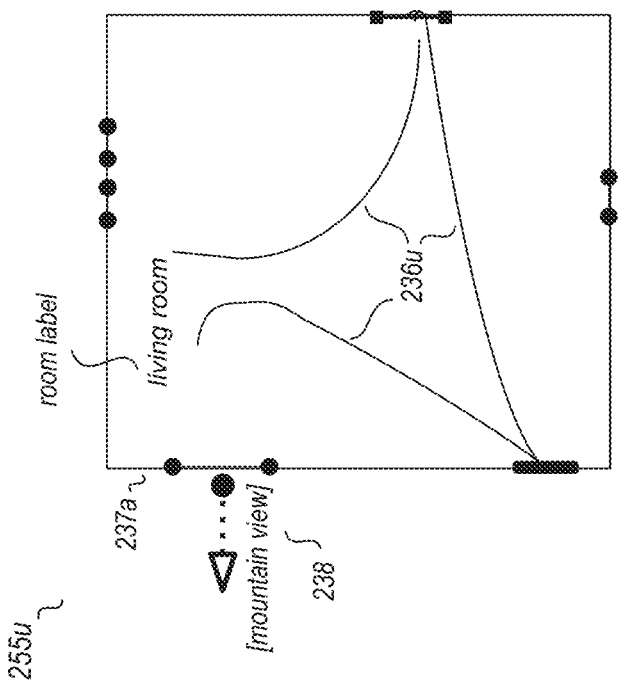

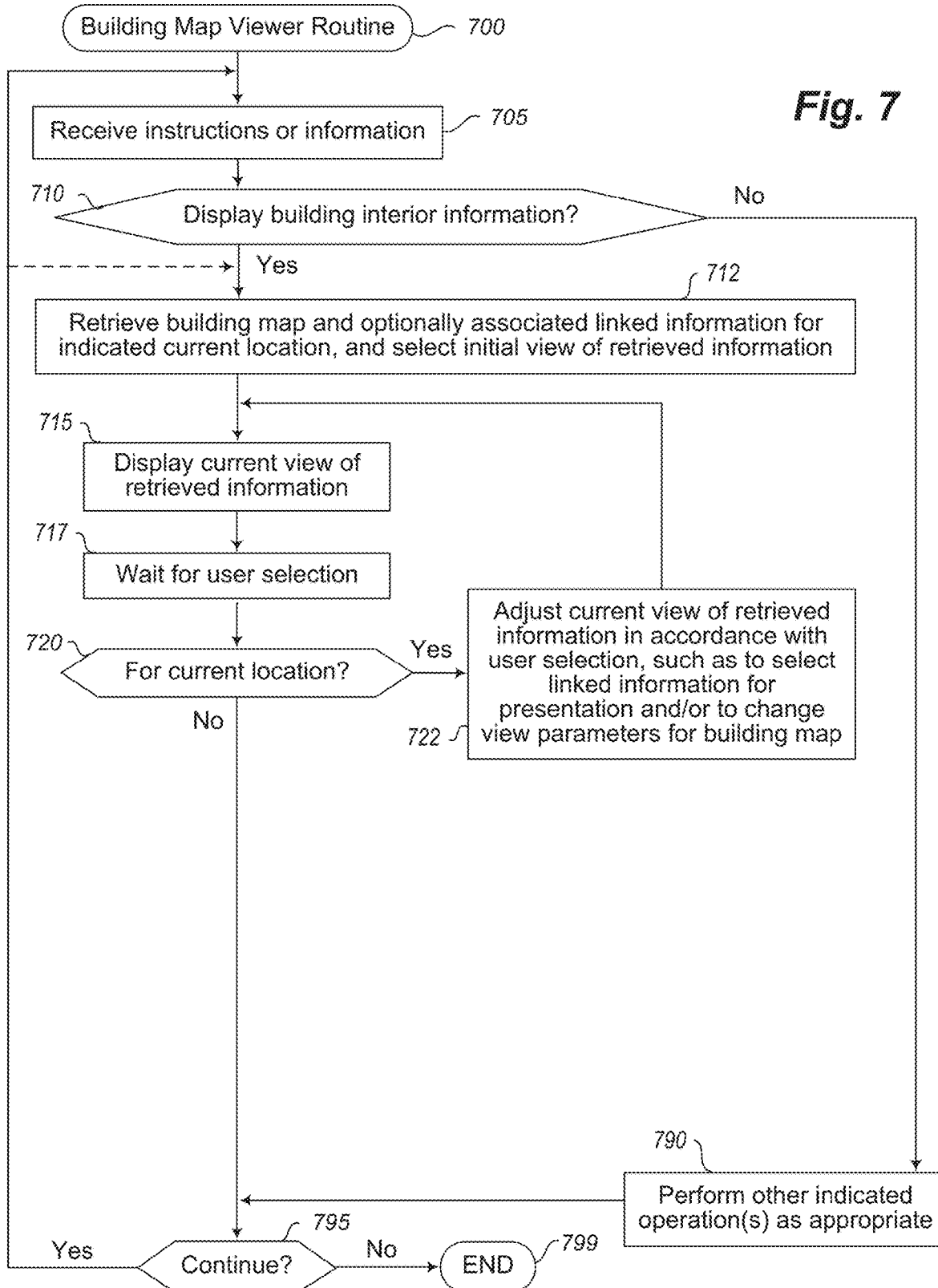

US 11,836,973 B2

AUTOMATED DIRECTION OF CAPTURING IN-ROOM INFORMATION FOR USE IN USABILITY ASSESSMENT OF BUILDINGS

TECHNICAL FIELD

The following disclosure relates generally to techniques for automatically directing the capture of images and other data in rooms of a building for use in assessing usability of the rooms in the building and for subsequently using the assessed usability information in one or more manners, such as to direct the capture of information about built-in elements of a room and to analyze visual data from captured images to determine attributes of the elements and to use that information to assess the room's layout and other usability information, and to use the assessed room layout and other usability information to improve navigation and other uses of the building.

BACKGROUND

In various fields and circumstances, such as architectural analysis, property inspection, real estate acquisition and development, remodeling and improvement services, general contracting and other circumstances, it may be desirable to view information about the interior of a house, office, or other building without having to physically travel to and enter the building, including to determine actual as-built information about the building rather than design information from before the building is constructed. However, it can be difficult to effectively capture, represent and use such building interior information, including to display visual information captured within building interiors to users at remote locations (e.g., to enable a user to fully understand the layout and other details of the interior, including to control the display in a user-selected manner). In addition, while a floor plan of a building may provide some information about layout and other details of a building interior, such use of floor plans has some drawbacks in certain situations, including that floor plans can be difficult to construct and maintain, to accurately scale and populate with information about room interiors, to visualize and otherwise use, etc.

BRIEF DESCRIPTION OF THE DRAWINGS

FIGS. 1A-1B are diagrams depicting an exemplary building environment and computing system(s) for use in embodiments of the present disclosure, such as for performing automated operations to capture images in rooms and to subsequently analyze the visual data of the captured images in one or more manners to produce resulting information about the rooms and the building.

FIG. 7 illustrates an example flow diagram for a Building Map Viewer system routine in accordance with an embodiment of the present disclosure.

DETAILED DESCRIPTION

Figure 2A:
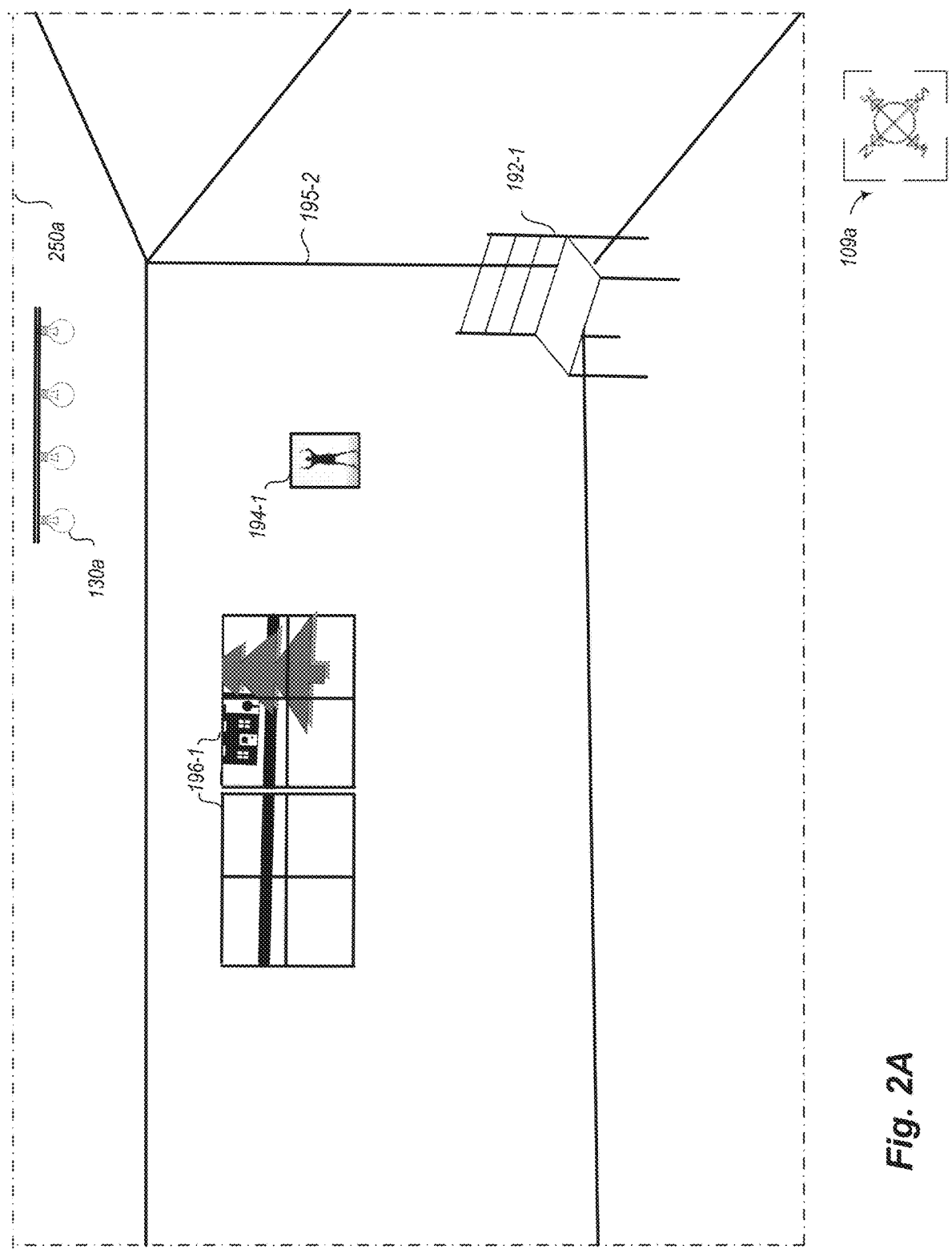
FIGS. 2A-2X illustrate examples of automated operations to capture images in rooms and to subsequently analyze the visual data of the captured images in one or more manners, such as for assessing room layout and other usability of rooms of the building and for generating and presenting information about a floor plan for the building.

The present disclosure describes techniques for using computing devices to perform automated operations related to analyzing visual data from images captured in rooms of a building to assess room layout and other usability information for the building's rooms and optionally for the overall building, and to subsequently using the assessed usability information in one or more further automated manners. The images may, for example, include panorama images (e.g., in an equirectangular or other spherical format) and/or other types of images (e.g., in a rectilinear perspective format) that are acquired at acquisition locations in or around a multi-room building (e.g., a house, office, etc.), referred to at times herein as 'target images'—in addition, in at least some embodiments, the automated operations are further performed without having or using information from any depth sensors or other distance-measuring devices about distances from an image's acquisition location to walls or other objects in a surrounding building. The assessed room layout and other usability information for one or more rooms of a building may be further used in various manners in various embodiments, such as in conjunction with generating or annotating a corresponding building floor plan and/or other generated information for the building, including for controlling navigation of mobile devices (e.g., autonomous vehicles) in accordance with structural elements of the rooms, for display or other presentation over one or more computer networks on one or more client devices in corresponding GUIs (graphical user interfaces), etc. Additional details are included below regarding the automated determination and use of room and building usability information, and some or all of the techniques described herein may be performed via automated operations of a Building Usability Assessment Manager ("BUAM") system in at least some embodiments, as discussed further below.

As noted above, the automated operations of the BUAM system may include analyzing visual data from the visual coverage of target images captured in one or more rooms of a building, for subsequent use in assessing usability of the room(s) and in some cases the overall building. In at least some embodiments, one or more initial target images captured in a room are analyzed in order to identify various types of information about the room, such as to analyze one or more initial images with room-level visual coverage and to identify particular objects in the room or other elements of the room for which to capture additional data, including to capture additional target images that provide more details about the identified objects, including about particular target attributes of interest for the objects—in some embodiments, the one or more initial target images may provide wide angles and in the aggregate includes up to 360° of horizontal coverage of the room around a vertical axis and between 180° and 360° of vertical coverage around a horizontal axis (e.g., one or more panorama images, such as in a spherical format), and in some embodiments the additional target images may be more focused than the initial target images (e.g., perspective images, such as in a rectilinear format). After those additional images are captured, the automated operations of the BUAM system may further include analyzing additional visual data in additional visual coverage of the additional images in order to obtain sufficient data (e.g., above a defined detail threshold, or to otherwise satisfy one or more defined detail criteria) to allow one or more target attributes of interest for each of the identified objects to be evaluated. Once the evaluations of the target attributes of the identified objects are available, the automated operations of the BUAM system may further include performing an assessment of each of those identified objects based at least in part on the evaluation(s) of that object's target attribute(s), such as to estimate how that object contributes to an overall assessment of the room (e.g., an assessment of usability of the room for an indicated purpose). The automated operations of the BUAM system may further include performing an overall assessment of the room based at least in part on a combination of the assessments of the identified objects in the room, optionally in combination with other information about the room (e.g., a layout of the room, human traffic flow for the room, etc.). Similarly, in at least some embodiments, the automated operations of the BUAM system may further include performing an overall assessment of a building based at least in part on a combination of the assessments of some or all rooms in the building, optionally in combination with other information about the building (e.g., a layout of the building, human traffic flow for the building, etc.). In addition, in at least some embodiments, areas external to a building may be treated as a room for the purposes of the analyses discussed herein, such as for a defined area (e.g., a patio, a deck, a garden, etc.) and/or for all of a surrounding area (e.g., the external perimeter of a building), and including to identify and assess usability of objects in such a 'room', and to evaluate target attributes of such objects, and to assess overall usability of the 'room', and to include the usability of such a 'room' as part of the assessment of overall usability of the building.

As noted above, the automated operations of the BUAM system may in some embodiments include analyzing one or more initial images captured in a room that provide room-level visual coverage in order to identify various types of information about the room. Non-exclusive examples of information that may be automatically determined from analysis of the visual data in the one or more initial images includes one or more of the following:

the existence of particular visible identified objects in the room or other elements of the room for which to capture additional data, such as for objects that are built-in or otherwise installed in a non-transitory manner and/or other objects that are more transitory (e.g., easily moveable, such as furniture and other furnishings, etc.);

the existence of particular visible target attributes of particular identified objects;

the locations of some or all of the identified objects in the room (e.g., locations within particular images, such as using bounding boxes and/or pixel-level masks; with respect to a shape of the room, such as relative to walls and/or the floor and/or the ceiling; with respect to geographical directions, such as the west wall or the southwest corner; etc.);

the types of some or all of the identified objects in the room, such as using an object label or other category for the object (e.g., a window, a door, a chair, etc.);

a type of the room, such as using a room label or other category for the room (e.g., a bedroom, a bathroom, a living room, etc.);

a layout of the room (e.g., an arrangement of furniture and other items in the room, optionally with respect to the shapes of the walls and other structural elements of the room);

expected and/or actual traffic flow patterns in the room (e.g., for moving between doors and other wall openings of the room, and optionally to one or more other identified areas of the room, such as with respect to information about the room layout);

an intended purpose of the room (e.g., a type of functionality of the room, such as based on the room type and/or layout, including non-exclusive examples of 'kitchen' or 'living room', or of 'cooking' or 'personal cooking' or 'industrial cooking' for a kitchen, or of 'group entertaining' or 'personal relaxation' for a living room, etc.; and/or a quality of the room and its contents at a time of installation or otherwise when new, such as for room types in which quality affects or is otherwise some or all of the intended purpose; and/or a condition of the room and its contents at a current time, such as with respect to a state or repair or disrepair; etc.); and/or a usability of the room, such as based on room layout and/or traffic flow and/or functionality and/or quality and/or condition;

other attributes of the room, such as a degree of 'openness' and/or a complexity of the room shape (e.g., cuboid, L-shape, etc.) and/or a degree of accessibility; etc.

In other embodiments, some or all of the types of information noted above may not be used in a room usability assessment for some or all rooms and/or in a building usability assessment for some or all buildings, and/or may be obtained in other manners (e.g., supplied by one or more users, such as a system operator user of the BUAM system who is in the room to participate in data capture).

As noted above, each room may have one or more elements or other objects that are identified as being of interest (e.g., as contributing to the planned assessment of the room), such as based on the type of the room. Identified objects in a room may include built-in or otherwise installed objects, with non-exclusive examples including the following: a window and/or window hardware (e.g., latching mechanism, opening/closing mechanisms, etc.); a door and/or door hardware (e.g., hinges, a door knob, a locking mechanism; a viewport; etc.); installed flooring (e.g., tile, wood, laminate, carpet, etc.); an installed countertop and/or backsplash (e.g., on a kitchen island, kitchen or bathroom counter, etc.); an installed wall covering (e.g., wallpaper, paint, wainscoting, etc.); a kitchen island or other built-in structure inside walls of the room (e.g., a sunken or raised subset of the floor, a coffered ceiling, etc.); an electrical appliance or gas-powered appliance or other type of powered appliance (e.g., a stove, oven, microwave, trash compactor, refrigerator, etc.); a light fixture (e.g., attached to a wall or ceiling); a plumbing fixture (e.g., a sink; a bathtub; a shower; a toilet; hardware on or inside a sink or bathtub or shower, such as drains, spouts, sprayers, faucets and other controls; etc.), a piece of built-in furniture (e.g., a bookshelf, bay window sitting area, etc.); a security system; a built-in vacuum system; an air heating and/or cooling system; a water heating system; types of pipes or other plumbing; types of electrical wiring; types of communications wiring; built-in speakers or other built-in electronic devices; etc. In addition, objects in a room may include moveable or otherwise transitory objects, with non-exclusive examples including the following: a piece of furniture; furnishings, such as pictures or drapes; etc. In some embodiments, some or all of the identified objects for a room may be automatically determined based on analysis of visual data of the one or more initial images, while in other embodiments, some or all of the identified objects for a room may be automatically determined based on a type of room (e.g., for a bathroom, a sink and a toilet; for a kitchen, a sink and oven; etc.), such as based on a predefined list for that room type.

In addition, each identified object may have one or more target attributes that are identified as being of interest (e.g., as contributing to the planned assessment of the object), such as based on the type of the object and/or a type of the room in which the object is located—such target attributes may include physical features and/or sub-elements of an object and/or may include types of functionality or other properties of the object. Non-exclusive examples of target attributes including the following: size; material; age; installation type; for a door object, one or more pieces of door hardware, a view or other indication of the environment on the other side, etc.; for a window object, one or more pieces of window hardware, a view or other indication of the environment on the other side, etc.; for a sink or bathtub or shower, hardware on or inside it, a type (e.g., a clawfoot tub, a wall-mounted sink, etc.), functionality (e.g., for a bathtub, to include jets), a model, etc.; for a stove, a number of burners, a type of energy used (e.g., electric, gas, etc.), a model, other features or functionality such as a built-in fan, etc.; for other appliances, a model or other type; etc. In some embodiments, some or all of the target attributes of interest for an identified object may be automatically determined based on analysis of visual data of the one or more initial images, while in other embodiments, some or all of the target attributes of interest for an object may be automatically determined based on a type of the object and/or a type of room in which the object is located (e.g., for a sink in a bathroom, the sink hardware and a type of the sink, such as wall-mounted or free-standing; for a sink in the kitchen, a size of the sink and number of bowls and the sink hardware; for a sink in a utility room, a size of the sink and number of bowls), such as based on a predefined list for that object type and/or room type.

Initial images of a room and additional data about the room may be captured in various manners in various embodiments. In some embodiments, some or all of the initial images of a room may be provided to the BUAM system by another system that already acquired those images for other uses, such as by an Image Capture and Analysis (ICA) system and/or a Mapping Information Generation Manager (MIGM) system that uses images of rooms of a building to generate floor plans and/or other mapping information related to the building, as discussed in greater detail below. In other embodiments, some or all of the initial images of a room may be captured by the BUAM system or in response to instructions provided by the BUAM system, such as to an automated image acquisition device in the room and/or to a user (e.g., a BUAM system operator user) in the room with information indicating the types of initial images to capture. In a similar manner, in at least some embodiments, some or all of the additional images for a room may be captured by the BUAM system or in response to instructions provided by the BUAM system, such as to an automated image acquisition device in the room and/or to a user (e.g., a BUAM system operator user) in the room with information indicating the types of additional images to capture. For example, the BUAM system may provide instructions that identify the one or more objects of interest in a room for which to capture additional data, and that identify the one or more target attributes for each of the objects of interest for which to capture additional data that satisfies a defined detail threshold or otherwise satisfies one or more defined detail criteria (or otherwise provides a description of the additional data to capture for the object that causes sufficient data about the one or more target attributes to be captured). Such instructions may be provided in various manners in various embodiments, including to be displayed to a user in a GUI of the BUAM system on a mobile computing device of the user (e.g., a mobile computing device that acts as an image acquisition device and is used to capture some or all of the additional images, such as using one or more imaging sensors of that device and optionally additional hardware components of that device, such as a light, one or more IMU (internal measurement unit) sensors such as one or more gyroscopes and/or accelerometers and/or magnetometers or other compasses, etc.) or otherwise provided to the user (e.g., overlaid on an image of the room that is shown on such a mobile computing device and/or other separate camera device, such as to provide dynamic augmented reality instructions to the user as the image changes in response to movement of the device, and/or to provide static instructions to the user on a previously captured image, and optionally with visual markings on the image(s) of visible objects and/or target attribute), or instead provided to an automated device that acquires the additional images in response to the instructions.

Furthermore, the automated operations of the BUAM system may further include analyzing visual data of images to verify that they include sufficient details to satisfy a defined detail threshold or otherwise satisfy one or more defined detail criteria, and initiating further automated operations in response to the verification activities. For example, visual data of one or more initial images may be analyzed to determine, for each of some or all of the objects of interest, whether the one or more initial images already include sufficient data about details of one or more target attributes of interest for that object—if so may perform an assessment of that object and its target attribute(s) using the visual data of the one or more initial images in place of the additional images that would otherwise be captured and used, but if not, then the BUAM system may initiate the capture of one or more additional images to provide sufficient data about the details of the one or more target attributes of interest for that object. In addition, once one or more additional images are captured for an object (e.g., an additional image for each of one or more target attributes of that object), the additional visual data of the additional image(s) may similarly be analyzed to verify that they include visual data for the target attribute(s) with sufficient details to satisfy the defined detail threshold or otherwise satisfy one or more defined detail criteria, as well as in some embodiments to verify that the additional image(s) are actually of the correct object and/or of the correct target attributes (e.g., by comparing the visual data of the additional images to corresponding visual data of the one or more initial images for that object)—if so those additional images may be verified as being available for use in the evaluation of those target attributes and associated assessment of that object, but if not, then the BUAM system may initiate the re-capture of one or more new additional images that are for use in place of those one or more prior additional images having the verification problem and that do provide sufficient details of the one or more target attributes of interest for that object (or initiate other corrective actions, such as to request that additional details about the one or more target attributes be provided in text or other form). The defined detail threshold or other one or more defined detail criteria may have various forms in various embodiments, such as a minimum quantity of pixels or other measure of resolution in an image showing a target attribute or object that is the subject of that image, a minimum lighting level, a maximum amount of blurriness or other measure of the clarity of the visual data, etc.

In addition, the automated operations of the BUAM system to capture additional data may further include capturing other types of data than additional images in at least some embodiments, whether in addition to or instead of corresponding additional images, and such as in response to corresponding instructions provided by the BUAM system to a user and/or automated device. For example, the BUAM system may provide instructions to an image acquisition device (e.g., a mobile computing device with one or more imaging sensors and other hardware components) to capture data with other sensors (e.g., IMU sensors, microphone, GPS or other location sensor, etc.) about a particular object and/or target attribute and to provide that other captured additional data to the BUAM system for further analysis, and/or may provide instructions to a user to obtain and provide additional data in forms other than visual data (e.g., textual answers and/or recorded voice answers to questions), such as for aspects of an object and/or target attribute that may not be easily determinable from visual data (e.g., for an object or target attribute, a material, age, size, precise location, installation technique/type, model, one or more types of functionality, etc.). Such types of captured additional data other than captured additional images may be used in various manners, including as part of the evaluation of a target attribute and associated assessment of its object, as discussed in greater detail elsewhere herein. The details of interest to obtain for a target attribute and/or object, and associated instructions provided by the BUAM system, may be automatically determined by the BUAM system in various manners in various embodiments, such as based on a predefined list or other description for a type of target attribute and/or type of object and/or type of room in which the object and its target attribute(s) are located.

After the BUAM system has obtained the captured additional data for the objects and target attributes of interest in a room (whether from visual data of captured additional images, other captured additional data, and/or visual data of one or more initial room-level images), the additional data may be analyzed in various manners to evaluate each of the target attributes and to assess each of the objects, such as based at least in part on the evaluations of that object's target attribute(s). In at least some embodiments, each of the target attributes may be evaluated by the BUAM system with respect to one or more defined evaluation criteria, such as in a manner specific to a type of that target attribute—for example, a target attribute may be evaluated with respect to one or more factors, with non-exclusive examples of such factors including the following: material; age; size; precise location; installation technique/type; model; one or more types of functionality; quality of a target attribute at time of installation or when new; condition of a target attribute at a current time, such as with respect to a state of repair or disrepair; etc., as well as factors specific to particular types of objects and/or target attributes (e.g., for a door and/or door lock and/or window latch, a degree of strength and/or other anti-break-in protection; for a door and/or door knob and/or window, a degree of decorative appeal; etc.)—if multiple factors are separately evaluated, an overall evaluation of the target attribute may be further determined in at least some embodiments, such as via a weighted average or other combination technique, and optionally with the weights varying based on the particular factor. It will be appreciated that in some embodiments, the evaluation of a particular target attribute of an object with respect to a particular factor may be provided by one or more users, and used in combination with other automatically determined evaluations of other target attributes of that object with respect to the assessment of that object.

In addition, after target attribute(s) of an object are evaluated, an assessment of the object may be automatically determined by the BUAM system with respect to one or more object assessment criteria, whether the same as or different from the evaluation criteria of the object's target attribute(s)—in at least some embodiments, the assessment of an object in a room is made at least in part with respect to usability of the room for an intended purpose of the room, such as to estimate that object's contribution to fulfillment of the usability for the intended purpose of the room. As one non-exclusive example, having a sink of high quality and condition and functionality (e.g., based at least in part on sink fixtures or other sink hardware) in a master bathroom may contribute significantly to the assessment of the master bathroom and its intended purpose (e.g., with respect to overall quality and/or condition and/or functionality of the master bathroom, such as if a luxurious environment is part of that intended purpose), but may contribute little-to-none (or even negatively contribute) to the assessment of a utility room and its intended purpose if the sink is located there (e.g., with respect to overall quality and/or condition and/or functionality of the utility room, such as based on utilitarian functionality being part of that intended purpose). More generally, each of the objects may be assessed by the BUAM system based at least in part on combining the evaluation(s) of the one or more target attribute(s) of that object, and optionally with respect to one or more additional defined object assessment criteria, such as in a manner specific to a type of that object—for example, an object may be evaluated with respect to one or more factors, with non-exclusive examples of such factors including the following: material; age; size; precise location; installation technique/type; model; one or more types of functionality; quality of an object at time of installation or when new; condition of an object at a current time, such as with respect to a state of repair or disrepair; etc., as well as factors specific to particular types of objects (e.g., for a door, a degree of strength and/or other anti-break-in protection, a degree of decorative appeal, etc.)—if multiple factors are separately evaluated, an overall evaluation of the object may be further determined in at least some embodiments, such as via a weighted average or other combination technique, and optionally with the weights varying based on the particular factor. It will be appreciated that in some embodiments, the assessment of a particular object in a room with respect to a particular factor, or more generally with respect to usability for an intended purpose of the room, may be provided by one or more users, and used in combination with other automatically determined assessments of other objects in the room as part of the assessment of that room. As noted above, the intended purpose of a room may be based at least in part on a type of the room, and the usability of the room for that intended purpose may be based on one or more factors, such as functionality, quality, condition, etc.

Moreover, after one or more objects of interest in a room are assessed, an assessment of the room may be automatically determined by the BUAM system with respect to one or more room assessment criteria, whether the same as or different from the object assessment criteria of the room's object(s)—in at least some embodiments, the assessment of a room is made at least in part with respect to usability for an intended purpose of the room, such as based at least in part on the assessments of the object(s) of interest in that room and their estimated contribution to fulfillment of the usability for the intended purpose of the room. As one non-exclusive example, having a sink of high quality and condition and functionality (e.g., based at least in part on sink fixtures or other sink hardware) in a master bathroom may contribute significantly to the assessment of the master bathroom and its intended purpose (e.g., with respect to overall quality and/or condition and/or functionality of the master bathroom, such as based on a luxurious environment being part of that intended purpose), but may contribute little-to-none (or even negatively contribute) to the assessment of a utility room and its intended purpose if the sink is located there (e.g., with respect to overall quality and/or condition and/or functionality of the utility room, such as based on utilitarian functionality being part of that intended purpose). As another non-exclusive example, an assessment of a room may be based at least in part on compatibility of fixtures and/or other objects within a room, such as to share a common style, quality, etc. More generally, each of one or more rooms of a building may be assessed by the BUAM system based at least in part on combining the assessment(s) of the one or more objects of interest in that room, and optionally with respect to one or more additional defined room assessment criteria, such as in a manner specific to a type of that room—for example, a room may be evaluated with respect to one or more factors, with non-exclusive examples of such factors including the following: size; layout; shape; traffic flow; materials; age; quality of the room at time of installation or when new; condition of the room at a current time, such as with respect to a state of repair or disrepair; etc., as well as factors specific to particular types of rooms (e.g., for a master bathroom or kitchen, a degree of luxury and/or quality; for a utility room or hallway, a degree of functionality or usability; etc.)—if multiple factors are separately evaluated, an overall assessment of the room may be further determined in at least some embodiments, such as via a weighted average or other combination technique, and optionally with the weights varying based on the particular factor. It will be appreciated that in some embodiments, the assessment of a particular room with respect to a particular factor, or more generally with respect to an intended purpose of the room, may be provided by one or more users, and used in combination with other automatically determined assessments of other rooms in the same building as part of an overall assessment of that building.

In addition, after the rooms of a multi-room building are assessed, an overall assessment of the building may be automatically determined by the BUAM system with respect to one or more building assessment criteria, whether the same as or different from the room assessment criteria of the building's rooms—in at least some embodiments, the assessment of a building is made at least in part with respect to usability for an intended purpose of the building, such as based at least in part on the assessments of the rooms in the building and their assessed fulfillment of their usability for the individual intended purposes of the rooms, optionally in combination with additional factors such as an overall layout of the building and/or expected traffic flow through the building. As one non-exclusive example, having a sink of high quality and condition and functionality (e.g., based at least in part on sink fixtures or other sink hardware) in a bathroom may contribute significantly to the overall assessment of the building and its intended purpose if the building is a single-family house (e.g., with respect to overall quality and/or condition and/or functionality of the house), but may contribute little-to-none (or even negatively contribute) to the overall assessment of the building and its intended purpose if the building is a warehouse (e.g., with respect to overall quality and/or condition and/or functionality of the warehouse, such as based on utility being part of that intended purpose). More generally, the building may be assessed by the BUAM system based at least in part on combining the assessment(s) of some or all rooms in that building, and optionally with respect to one or more additional defined building assessment criteria, such as in a manner specific to a type of that building—for example, a building may be evaluated with respect to one or more factors, with non-exclusive examples of such factors including the following: size; layout (e.g., based on a floor plan of the building); shape; traffic flow; materials; age; quality of the building at time of installation or when new; condition of the building at a current time, such as with respect to a state of repair or disrepair; etc., as well as factors specific to particular types of buildings (e.g., for a house or office building, a degree of luxury and/or quality; for a warehouse or storage facility, a degree of functionality or usability; etc.)—if multiple factors are evaluated, an overall assessment of the building may be further determined in at least some embodiments, such as via a weighted average or other combination technique, and optionally with the weights varying based on the particular factor. It will be appreciated that in some embodiments, the assessment of a particular building with respect to a particular factor, or more generally with respect to usability for an intended purpose of the building, may be provided by one or more users, and used in combination with other automatically determined assessments of other related buildings in a group as part of an overall assessment of that group of buildings.

As noted above, with respect to information from the captured additional data that is used in the evaluation of target attributes and/or assessment of objects and/or assessments of a room, some or all of that information may be based on analysis of visual data in one or more initial room-level images and/or in one or more additional images. As part of the automated operations of the BUAM system, the described techniques may, in at least some embodiments, include using one or more trained neural networks or other techniques to analyze the visual data of one or more initial images and/or additional images. As non-exclusive examples, such techniques may include one or more of the following: using a trained neural network or other analysis technique (e.g., a convolutional neural network) to take one or more images of some or all of a room as input and to identify objects of interest in the room—such objects may include, for example, wall structural elements (e.g., windows and/or sky-lights; passages into and/or out of the room, such as doorways and other openings in walls, stairs, hallways, etc.; borders between adjacent walls; borders between walls and a floor; borders between walls and a ceiling; corners (or solid geometry vertices) where at least three surfaces or planes meet; etc.), other fixed structural elements (e.g., countertops, bath tubs, sinks, islands, fireplaces, etc.); using a trained neural network or other analysis technique to take one or more images of some or all of a room as input and to determine a room shape for the room, such as a 3D point cloud (with a plurality of 3D data points corresponding to locations on the walls and optionally the floor and/or ceiling) and/or fully or partially connected planar surfaces (corresponding to some or all of the walls and optionally the floor and/or ceiling) and/or wireframe structural lines (e.g., to show one or more of borders between walls, borders between walls and ceiling, borders between walls and floor, outlines of doorways and/or other inter-room wall openings, outlines of windows, etc.); using a trained neural network or other analysis technique (e.g., a deep learning detector model or other type of classifier) to take one or more images of some or all of a room as input (and optionally a determined room shape of the room) and to determine locations for the detected objects and other elements in the room (e.g., with respect to a shape of the room, based on performing object detection to generate a bounding box around the element or other object in one or more of the images, based on performing object segmentation to generate a pixel-level mask that identifies the pixels in or more of the images that represent the element or other object, etc.); using a trained neural network or other analysis technique (e.g., a convolutional neural network) to take one or more images of some or all of a room as input and to determine object tags and/or object types (e.g., window, doorway, etc.) for those elements or other objects; using a trained neural network or other analysis technique to take one or more images of some or all of a room as input and to determine a room type and/or room tag for the enclosing room (e.g., living room, bedroom, bathroom, kitchen, etc.); using a trained neural network or other analysis technique to take one or more images (e.g., a panorama image with 360° of horizontal visual coverage) of some or all of a room as input and to determine a layout of the room; using a trained neural network or other analysis technique to take one or more images of some or all of a room as input and to determine an expected traffic flow for the room; using a trained neural network or other analysis technique to take one or more images of some or all of a room as input (and optionally information about the room type/tag and/or layout and/or traffic flow) and to determine an intended purpose for the enclosing room; using a trained neural network or other analysis technique to take one or more images of some or all of a room as input and to identify visible target attributes of objects of interest; using a trained neural network or other analysis technique to take one or more images of some or all of a room as input and to determine whether one or more visible target attributes have sufficient detail in the visual data to satisfy a defined detail threshold or to otherwise satisfy one or more defined detail criteria; using a trained neural network or other analysis technique to take one or more images of some or all of a room as input and to determine whether one or more visible objects have sufficient detail in the visual data to satisfy a defined detail threshold or to otherwise satisfy one or more defined detail criteria; using a trained neural network or other analysis technique to take one or more images of some or all of an object and one or more target attributes of the object (and optionally additional captured data about the target attribute(s) and/or object) as input and to evaluate each of the target attribute(s) based at least in part on the visual data of the image(s); using a trained neural network or other analysis technique to take one or more images of an object (and optionally additional captured data about the object and/or its room, including to identify an intended purpose of the room) as input and to assess the object based at least in part on the visual data of the image(s); using a trained neural network or other analysis technique (e.g., using rule-based decision making, such as with predefined rules specified by one or more BUAM system operator users or determined in other manners) to take evaluations of one or more target attributes of an object (and optionally additional captured data about the object and/or its room, including to identify an intended purpose of the room) as input and to assess the object based at least in part on the evaluations of the target attributes; using a trained neural network or other analysis technique to take evaluations of one or more objects in a room (and optionally additional captured data about the objects and/or room, including to identify an intended purpose of the room) as input and to assess the room based at least in part on the assessments of the objects; using a trained neural network or other analysis technique to take assessments of one or more rooms in a building (and optionally additional captured data about the room and/or its building, including to identify an intended purpose of the building) as input and to assess the building based at least in part on the assessments of the rooms; etc. Such neural networks may use, for example, different detection and/or segmentation frameworks in different embodiments, and may otherwise be of various types in different embodiments, and may be trained before use by the BUAM system on data sets corresponding to the type of determination that the neural network performs. In some embodiments, acquisition metadata for such an image may be further used as part of determining one or more of the types of information discussed above, such as by using data from IMU (internal measurement unit) sensors on the acquiring camera or other associated device as part of performing a SLAM (Simultaneous Localization And Mapping) and/or SfM (Structure from Motion) and/or MVS (multiple-view stereovision) analysis, or to otherwise determine acquisition pose information for the image in the room, as discussed elsewhere herein.

Additional details are included below regarding automated operations that may be performed by the BUAM system in at least some embodiments for acquiring and analyzing visual data from the visual coverage of target images captured in one or more rooms of a building, and/or for using information from the analysis to assess usability of the rooms. For example, some corresponding additional details are included with respect to the examples of FIG. 2P-2X and their associated descriptions and in FIGS. 6A-6B and elsewhere herein.

As noted above, after assessing usability of one or more rooms of a building based at least in part on an analysis of visual data from images captured in the room(s), and optionally further assessing overall usability of the building, automated operations of an BUAM system may further include using the assessed room and/or building usability information in one or more further automated manners. For example, as discussed in greater detail elsewhere herein, such assessment information may be associated with floor plans and/or other generated mapping information for the room(s) and/or building, and used to improve automated navigation of a building by mobile devices (e.g., semi-autonomous or fully-autonomous vehicles), based at least in part on the determined assessments of rooms and buildings (e.g., based on room layouts, traffic flows, etc.). Such information about room and/or building and/or object assessments, and about evaluations of objects' target attributes, may further be used in additional manners in some embodiments, such as to display the information to users to assist in their navigation of the room(s) and/or building, or for other uses by the users. Such information about room and/or building and/or object assessments, and about evaluations of objects' target attributes, may also be used in other manners in some embodiments, such as to automatically identify areas of improvement or renovation in a building (e.g., in particular rooms, and/or with respect to particular objects and/or their target attributes), to automatically assess prices and/or values of buildings (e.g., based on a comparison to other buildings with similar assessments of overall building usability with respect to an overall intended purpose of the building and/or with similar assessments of room usability with respect to intended purposes of some or all rooms of the building), etc. It will be appreciated that various other uses of the assessment information may be made in other embodiments.

The described techniques provide various benefits in various embodiments, including to allow floor plans of multi-room buildings and other structures to be automatically augmented with information about assessments of rooms in the building and/or about an overall assessment of the building, and optionally assessments of particular objects in the rooms, evaluations of target attributes of objects. Such information about room and/or building and/or object assessments, and about evaluations of objects' target attributes, may further be used in additional manners in some embodiments, such as to automatically identify areas for improvement or renovation in a building (e.g., in particular rooms, and/or with respect to particular objects and/or their target attributes), to automatically assess prices and/or values of buildings, to automatically ensure that desired types of information are captured and used (e.g., at least in part by an associated user who is not a specialist or otherwise trained in such information capture), etc. Furthermore, such automated techniques allow such building, room and object information to be determined more quickly than previously existing techniques, and in at least some embodiments with greater accuracy, including by using information acquired from the actual building environment (rather than from plans on how the building should theoretically be constructed), as well as enabling the capture of changes to structural elements or other parts of a building that occur after a building is initially constructed. Such described techniques further provide benefits in allowing improved automated navigation of a building by mobile devices (e.g., semi-autonomous or fully-autonomous vehicles), based at least in part on the determined assessments of rooms and buildings (e.g., based on room layouts, traffic flows, etc.), including to significantly reduce computing power and time used to attempt to otherwise learn a building's layout. In addition, in some embodiments the described techniques may be used to provide an improved GUI in which a user may more accurately and quickly obtain information about a building's interior (e.g., for use in navigating that interior), including in response to search requests, as part of providing personalized information to the user, as part of providing value estimates and/or other information about a building to a user, etc. Various other benefits are also provided by the described techniques, some of which are further described elsewhere herein.

As noted above, in at least some embodiments and situations, some or all of the images acquired for a building may be panorama images that are each acquired at one of multiple acquisition locations in or around the building, such as to generate a panorama image at each such acquisition location from one or more of a video captured at that acquisition location (e.g., a 360° video taken from a smartphone or other mobile device held by a user turning at that acquisition location), or multiple images captured in multiple directions from the acquisition location (e.g., from a smartphone or other mobile device held by a user turning at that acquisition location; from automated rotation of a device at that acquisition location, such as on a tripod at that acquisition location; etc.), or a simultaneous capture of all the image information for a particular acquisition location (e.g., using one or more fisheye lenses), etc. It will be appreciated that such a panorama image may in some situations be represented in a spherical coordinate system and provide up to 360° coverage around horizontal and/or vertical axes (e.g., 360° of coverage along a horizontal plane and around a vertical axis), while in other embodiments the acquired panorama images or other images may include less than 360° of horizontal and/or vertical coverage (e.g., for images with a width exceeding a height by more than a typical aspect ratio, such as at or exceeding 21:9 or 16:9 or 3:2 or 7:5 or 4:3 or 5:4 or 1:1, including for so-called 'ultrawide' lenses and resulting ultrawide images). In addition, it will be appreciated that a user viewing such a panorama image (or other image with sufficient horizontal and/or vertical coverage that only a portion of the image is displayed at any given time) may be permitted to move the viewing direction within the panorama image to different orientations to cause different subset images (or "views") to be rendered within the panorama image, and that such a panorama image may in some situations be represented in a spherical coordinate system (including, if the panorama image is represented in a spherical coordinate system and a particular view is being rendered, to convert the image being rendered into a planar coordinate system, such as for a perspective image view before it is displayed). Furthermore, acquisition metadata regarding the capture of such panorama images may be obtained and used in various manners, such as data acquired from IMU (inertial measurement unit) sensors or other sensors of a mobile device as it is carried by a user or otherwise moved between acquisition locations—non-exclusive examples of such acquisition metadata may include one or more of acquisition time; acquisition location, such as GPS coordinates or other indication of location; acquisition direction and/or orientation; relative or absolute order of acquisition for multiple images acquired for a building or that are otherwise associated; etc., and such acquisition metadata may further optionally be used as part of determining the images' acquisition locations in at least some embodiments and situations, as discussed further below. Additional details are included below regarding automated operations of device(s) implementing an Image Capture and Analysis (ICA) system involved in acquiring images and optionally acquisition metadata, including with respect to FIGS. 1A-1B and 2A-2D and 4 and elsewhere herein.

As is also noted above, shapes of rooms of a building may be automatically determined in various manners in various embodiments, including at a time before automated determination of a particular image's acquisition location within the building. For example, in at least some embodiments, a Mapping Information Generation Manager (MIGM) system may analyze various images acquired in and around a building in order to automatically determine room shapes of the building's rooms (e.g., 3D room shapes, 2D room shapes, etc.) and to automatically generate a floor plan for the building. As one example, if multiple images are acquired within a particular room, those images may be analyzed to determine a 3D shape of the room in the building (e.g., to reflect the geometry of the surrounding structural elements of the building)—the analysis may include, for example, automated operations to 'register' the camera positions for the images in a common frame of reference so as to 'align' the images and to estimate 3D locations and shapes of objects in the room, such as by determining features visible in the content of such images (e.g., to determine the direction and/or orientation of the acquisition device when it took particular images, a path through the room traveled by the acquisition device, etc., such as by using SLAM techniques for multiple video frame images and/or other SfM techniques for a 'dense' set of images that are separated by at most a defined distance (such as 6 feet) to generate a 3D point cloud for the room including 3D points along walls of the room and at least some of the ceiling and floor of the room and optionally with 3D points corresponding to other objects in the room, etc.) and/or by determining and aggregating information about planes for detected features and normal (orthogonal) directions to those planes to identify planar surfaces for likely locations of walls and other surfaces of the room and to connect the various likely wall locations (e.g., using one or more constraints, such as having 90° angles between walls and/or between walls and the floor, as part of the so-called 'Manhattan world assumption') and form an estimated room shape for the room. After determining the estimated room shapes of the rooms in the building, the automated operations may, in at least some embodiments, further include positioning the multiple room shapes together to form a floor plan and/or other related mapping information for the building, such as by connecting the various room shapes. Such a building floor plan may thus have associated room shape information, and may have various forms in various embodiments, such as a 2D (two-dimensional) floor map of the building (e.g., an orthographic top view or other overhead view of a schematic floor map that does not include or display height information) and/or a 3D (three-dimensional) or 2.5D (two and a half-dimensional) floor map model of the building that does display height information. As part of the automated analysis of the visual data of one or more target images, the automated operations may include determining the acquisition location and optionally orientation of a target image that is captured in a room of a house or other building (or in another defined area), and using the determined acquisition location and optionally orientation of a target image to further analyze visual data of the target image—a combination of acquisition location and orientation for a target image is referred to at times herein as an 'acquisition pose' or 'acquisition position' or merely 'pose' or 'position' of the target image. Additional details are included below regarding automated operations of device(s) implementing an MIGM system involved in determining room shapes and combining room shapes to generate a floor plan, including with respect to FIGS. 1A-1B and 2E-2M and 5A-5C and elsewhere herein.

For illustrative purposes, some embodiments are described below in which specific types of information are acquired, used and/or presented in specific ways for specific types of structures and by using specific types of devices—however, it will be understood that the described techniques may be used in other manners in other embodiments, and that the invention is thus not limited to the exemplary details provided. As one non-exclusive example, while assessments of particular types for objects and rooms of houses are discussed in some examples, it will be appreciated that other types of assessments may be similarly generated in other embodiments, including for buildings (or other structures or layouts) separate from houses. As another non-exclusive example, while instructions of particular types are provided in particular manners for obtaining particular types of data in some examples, other types instructions may be used and other types of data may be acquired in other manners in other embodiments. In addition, the term "building" refers herein to any partially or fully enclosed structure, typically but not necessarily encompassing one or more rooms that visually or otherwise divide the interior space of the structure—non-limiting examples of such buildings include houses, apartment buildings or individual apartments therein, condominiums, office buildings, commercial buildings or other wholesale and retail structures (e.g., shopping malls, department stores, warehouses, etc.), etc. The term "acquire" or "capture" as used herein with reference to a building interior, acquisition location, or other location (unless context clearly indicates otherwise) may refer to any recording, storage, or logging of media, sensor data, and/or other information related to spatial and/or visual characteristics and/or otherwise perceivable characteristics of the building interior or subsets thereof, such as by a recording device or by another device that receives information from the recording device. As used herein, the term "panorama image" may refer to a visual representation that is based on, includes or is separable into multiple discrete component images originating from a substantially similar physical location in different directions and that depicts a larger field of view than any of the discrete component images depict individually, including images with a sufficiently wide-angle view from a physical location to include angles beyond that perceivable from a person's gaze in a single direction (e.g., greater than 120° or 150° or 180°, etc.). The term "sequence" of acquisition locations, as used herein, refers generally to two or more acquisition locations that are each visited at least once in a corresponding order, whether or not other non-acquisition locations are visited between them, and whether or not the visits to the acquisition locations occur during a single continuous period of time or at multiple different times, or by a single user and/or device or by multiple different users and/or devices. In addition, various details are provided in the drawings and text for exemplary purposes, but are not intended to limit the scope of the invention. For example, sizes and relative positions of elements in the drawings are not necessarily drawn to scale, with some details omitted and/or provided with greater prominence (e.g., via size and positioning) to enhance legibility and/or clarity. Furthermore, identical reference numbers may be used in the drawings to identify similar elements or acts.

FIG. 1A is an example block diagram of various computing devices and systems that may participate in the described techniques in some embodiments. In particular, panorama images 165 are illustrated in FIG. 1A that have been generated by an Interior Capture and Analysis ("ICA") system 160 executing in this example on one or more server computing systems 180, such as with respect to one or more buildings or other structures, and for which inter-image directional links have optionally been generated for at least some pairs of images—FIG. 1B shows one example of such linked panorama image acquisition locations 210 for a particular house 198 (e.g., inter-image relative directional links 215-AB and 215-AC and 215-BC between image pairs from acquisition locations 210A and 210B, 210A and 210C, and 210B and 210C, respectively), as discussed further below, and additional details related to the automated operation of the ICA system are included elsewhere herein, including with respect to FIG. 4. In at least some embodiments, at least some of the ICA system may execute in part on a mobile computing device 185 (whether in addition to or instead of ICA system 160 on the one or more server computing systems 180), such as in optional ICA application 154, to control acquisition of target images and optionally additional non-visual data by that mobile computing device and/or by one or more nearby (e.g., in the same room) optional separate camera devices 186 operating in conjunction with that mobile computing device, as discussed further with respect to FIG. 1B. An MIGM (Mapping Information Generation Manager) system 160 is further executing on one or more server computing systems 180 in FIG. 1A to generate and provide building floor plans 155 and/or other mapping-related information based on use of the panorama images 165 and optionally associated metadata about their acquisition and linking—FIGS. 2M through 2O (referred to herein as '2-O' for clarity) show examples of such floor plans, as discussed further below, and additional details related to the automated operation of the MIGM system are included elsewhere herein, including with respect to FIGS. 5A-5B.

FIG. 1A further illustrates an BUAM (Building Usability Assessment Manager) system 140 that is executing on one or more server computing systems 180 to automatically analyze visual data from images 144 captured in rooms of a building (e.g., based at least in part on panorama images 165) to assess usability of the rooms in the building and for subsequently using the assessed usability information in one or more manners, including to generate and use various usability information 145 (e.g., information about in-room objects and their target attributes, images of objects and their target attributes, room layout data, evaluations of target attributes, assessments of objects and/or rooms and/or buildings, etc.) during operation of the BUAM system. In at least some embodiments and situations, one or more users of BUAM client computing devices 105 may further interact over the network(s) 170 with the BUAM system 140, such as to assist with some of the automated operations of the BUAM system. Additional details related to the automated operation of the BUAM system are included elsewhere herein, including with respect to FIGS. 2P-2X and FIGS. 6A-6B. In some embodiments, the ICA system and/or MIGM system and/or BUAM system 140 may execute on the same server computing system(s), such as if multiple or all of those systems are operated by a single entity or are otherwise executed in coordination with each other (e.g., with some or all functionality of those systems integrated together into a larger system), while in other embodiments the BUAM system may instead operate separately from the ICA and/or MIGM systems (e.g., without using any information generated by the ICA and/or MIGM systems).

One or more users (not shown) of one or more client computing devices 175 may further interact over one or more computer networks 170 with the BUAM system 140 and optionally the ICA system and/or MIGM system, such as to assist in the automated operations of the system(s), and/or to obtain and optionally interact with information generated by one or more of the systems (e.g., captured images; a generated floor plan, such as having information about generated object and/or room and/or building assessments overlaid on or otherwise associated with the floor plan, and/or having information about one or more captured images being overlaid on or otherwise associated with the floor plan); information about generated object and/or room and/or building assessments; etc.), including to optionally change between a floor plan view and a view of a particular image at an acquisition location within or near the floor plan; to change the horizontal and/or vertical viewing direction from which a corresponding view of a panorama image is displayed, such as to determine a portion of a panorama image to which a current user viewing direction is directed, etc. In addition, while not illustrated in FIG. 1A, a floor plan (or portion of it) may be linked to or otherwise associated with one or more other types of information, including for a floor plan of a multi-story or otherwise multi-level building to have multiple associated sub-floor plans for different stories or levels that are interlinked (e.g., via connecting stairway passages), for a two-dimensional ("2D") floor plan of a building to be linked to or otherwise associated with a three-dimensional ("3D") rendering floor plan of the building, etc. In addition, while not illustrated in FIG. 1A, in some embodiments the client computing devices 175 (or other devices, not shown), may receive and use information about generated object and/or room and/or building assessments (optionally in combination with generated floor plans and/or other generated mapping-related information and/or corresponding captured images) in additional manners, such as to control or assist automated navigation activities by those devices (e.g., by autonomous vehicles or other devices), whether instead of or in addition to display of the generated information.

In the depicted computing environment of FIG. 1A, the network 170 may be one or more publicly accessible linked networks, possibly operated by various distinct parties, such as the Internet. In other implementations, the network 170 may have other forms. For example, the network 170 may instead be a private network, such as a corporate or university network that is wholly or partially inaccessible to non-privileged users. In still other implementations, the network 170 may include both private and public networks, with one or more of the private networks having access to and/or from one or more of the public networks. Furthermore, the network 170 may include various types of wired and/or wireless networks in various situations. In addition, the client computing devices 105 and 175 and server computing systems 180 may include various hardware components and stored information, as discussed in greater detail below with respect to FIG. 3.

In the example of FIG. 1A, ICA system 160 may perform automated operations involved in generating multiple target panorama images (e.g., each a 360 degree panorama around a vertical axis) at multiple associated acquisition locations (e.g., in multiple rooms or other locations within a building or other structure and optionally around some or all of the exterior of the building or other structure), such as for use in generating and providing a representation of an interior of the building or other structure. In some embodiments, further automated operations of the ICA system may further include analyzing information to determine relative positions/directions between each of two or more acquisition locations, creating inter-panorama positional/directional links in the panoramas to each of one or more other panoramas based on such determined positions/directions, and then providing information to display or otherwise present multiple linked panorama images for the various acquisition locations within the building, while in other embodiments some or all such further automated operations may instead be performed by the MIGM system. Additional details related to embodiments of a system providing at least some such functionality are included in U.S. Non-Provisional patent application Ser. No. 17/064,601, filed Oct. 7, 2020 and entitled "Connecting And Using Building Data Acquired From Mobile Devices" (which includes disclosure of an example BICA system that is generally directed to obtaining and using panorama images from within one or more buildings or other structures); in U.S. Non-Provisional patent application Ser. No. 17/082,044, filed Oct. 28, 2020 and entitled "Automated Control Of Image Acquisition Via Acquisition Location Determination" (which includes disclosure of an example ICA system that is generally directed to obtaining and using panorama images from within one or more buildings or other structures); in U.S. Non-Provisional patent application Ser. No. 17/019,247, filed Sep. 12, 2020 and entitled "Automated Mapping Information Generation From Inter-Connected Images"; in U.S. Non-Provisional patent application Ser. No. 17/080,604, filed Oct. 26, 2020 and entitled "Generating Floor Maps For Buildings From Automated Analysis Of Visual Data Of The Buildings' Interiors"; and in U.S. Provisional Patent Application No. 63/035,619, filed Jun. 5, 2020 and entitled "Automated Generation On Mobile Devices Of Panorama Images For Buildings Locations And Subsequent Use"; each of which is incorporated herein by reference in its entirety FIG. 1B depicts a block diagram of an exemplary building interior environment in which linked panorama images have been generated and are ready for use to generate and provide a corresponding building floor plan, as well as for use in presenting the linked panorama images to users. In particular, FIG. 1B includes a building 198 (in this example, a house 198) with an interior that was captured at least in part via multiple panorama images, such as by a user (not shown) carrying a mobile device 185 with image acquisition capabilities and/or one or more separate camera devices 186 through the building interior to a sequence of multiple acquisition locations 210. An embodiment of the ICA system (e.g., ICA system 160 on server computing system(s) 180; a copy of some or all of the ICA system executing on the user's mobile device, such as ICA application system 154 executing in memory 152 on device 185; etc.) may automatically perform or assist in the capturing of the data representing the building interior, as well as to in some embodiments further analyze the captured data to generate linked panorama images providing a visual representation of the building interior. While the mobile device of the user may include various hardware components, such as one or more cameras or other imaging systems 135, one or more sensors 148 (e.g., a gyroscope 148*a*, an accelerometer 148*b*, a compass 148*c*, etc., such as part of one or more IMUs, or inertial measurement units, of the mobile device); one or more hardware processors 132, memory 152, a display 142 (e.g., including a touch-sensitive display screen), optionally one or more depth sensors 136, optionally other hardware elements (e.g., an altimeter; light detector; GPS receiver; additional memory or other storage, whether volatile or non-volatile; a microphone; one or more external lights; transmission capabilities to interact with other devices over the network(s) 170 and/or via direct device-to-device communication, such as with an associated camera device 186 or a remote server computing system 180; a microphone; one or more external lights; etc.), the mobile device does not in at least some embodiments have access to or use equipment (such as depth sensors 136) to measure the depth of objects in the building relative to a location of the mobile device, such that relationships between different panorama images and their acquisition locations may be determined in part or in whole based on matching elements in different images and/or by using information from other of the listed hardware components, but without using any data from any such depth sensors. While not illustrated for the sake of brevity, the one or more camera devices 186 may similarly each include at least one or more image sensors and storage on which to store acquired target images and transmission capabilities to transmit the captured target images to other devices (e.g., an associated mobile computing device 185, a remote server computing system 180, etc.), optionally along with one or more lenses and lights, and optionally in some embodiments some or all of the other components shown for the mobile computing device. In addition, while directional indicator 109 is provided for reference of the viewer, the mobile device and/or ICA system may not use such absolute directional information in at least some embodiments, such as to instead determine relative directions and distances between panorama images 210 without regard to actual geographical positions or directions.

In operation, the mobile computing device 185 and/or camera device 186 (hereinafter for the example of FIG. 1B, "one or more image acquisition devices") arrive at a first acquisition location 210A within a first room of the building interior (in this example, via an entryway from an external door 190-1 to the living room), and capture visual data for a portion of the building interior that is visible from that acquisition location 210A (e.g., some or all of the first room, and optionally small portions of one or more other adjacent or nearby rooms, such as through doorways, halls, stairways or other connecting passages from the first room)—in at least some situations, the one or more image acquisition devices may be carried by or otherwise accompanied by one or more users, while in other embodiments and situations may be mounted on or carried by one or more self-powered devices that move through the building under their own power. In addition, the capture of the visual data from the acquisition location may be performed in various manners in various embodiments (e.g., by using one or more lenses that capture all of the image data simultaneously, by an associated user turning his or her body in a circle while holding the one or more image acquisition devices stationary relative to the user's body, by an automated device on which the one or more image acquisition devices are mounted or carried rotating the one or more image acquisition devices, etc.), and may include recording a video at the acquisition location and/or taking a succession of one or more images at the acquisition location, including to capture visual information depicting a number of elements or other objects (e.g., structural details) that may be visible in images (e.g., video frames) captured from or near the acquisition location. In the example of FIG. 1B, such elements or other objects include various elements that are structurally part of the walls (or structural "wall elements") of rooms of the house, such as the doorways 190 and 197 and their doors (e.g., with swinging and/or sliding doors), windows 196, inter-wall borders (e.g., corners or edges) 195 (including corner 195-1 in the northwest corner of the house 198, corner 195-2 in the northeast corner of the first room (living room), and corner 195-3 in the southwest corner of the first room)—in addition, such elements or other objects in the example of FIG. 1B may further include other objects within the rooms, such as furniture 191-193 (e.g., a couch 191; chair 192; table 193; etc.), pictures or paintings or televisions or other objects 194 (such as 194-1 and 194-2) hung on walls, light fixtures, etc. The one or more image acquisition devices further capture additional data (e.g., additional visual data using imaging system 135, additional motion data using sensor modules 148, optionally additional depth data using distance-measuring sensors 136, etc.) at or near the acquisition location 210A, optionally while being rotated, as well as to optionally capture further such additional data while the one or more image acquisition devices move to and/or from acquisition locations. The actions of the one or more image acquisition devices may in some embodiments be controlled or facilitated via use of one or more programs executing on the mobile computing device 185 (e.g., via automated instructions to one or more image acquisition devices or to another mobile device, not shown, that is carrying those devices through the building under its own power; via instructions to an associated user in the room; etc.), such as ICA application system 154 and/or optional browser 162, control system 147 to manage I/O (input/output) and/or communications and/or networking for the device 185 (e.g., to receive instructions from and present information to its user), etc. The user may also optionally provide a textual or auditory identifier to be associated with an acquisition location, such as "entry" for acquisition location 210A or "living room" for acquisition location 210B, while in other embodiments the ICA system may automatically generate such identifiers (e.g., by automatically analyzing video and/or other recorded information for a building to perform a corresponding automated determination, such as by using machine learning) or the identifiers may not be used.

After the first acquisition location 210A has been adequately captured, the one or more image acquisition devices (and the user, if present) may proceed to a next acquisition location (such as acquisition location 210B along travel path 115), optionally recording movement data by the one or more image acquisition devices during movement between the acquisition locations, such as visual data and/or other non-visual data from the hardware components (e.g., from one or more IMUs 148, from the imaging system 135 and/or by the camera device(s) 186, from the distance-measuring sensors 136, etc.). At the next acquisition location, the one or more image acquisition devices may similarly capture one or more target images from that acquisition location, and optionally additional data at or near that acquisition location. This process may repeat from some or all rooms of the building and optionally external to the building, as illustrated for acquisition locations 210C-210S. The video and/or other images acquired for each acquisition location by the one or more image acquisition devices are further analyzed to generate a target panorama image for each of acquisition locations 210A-210S, including in some embodiments to stitch together multiple constituent images to create a panorama image and/or to match objects and other elements in different images.

In addition to generating such panorama images, further analysis may be performed in at least some embodiments by the MIGM system (e.g., concurrently with the image capture activities or subsequent to the image capture) to determine room shapes for each of the rooms (and optionally for other defined areas, such as a deck or other patio outside of the building or other external defined area), including to optionally determine acquisition position information for each target image, and to optionally further determine a floor plan for the building and/or other related mapping information for the building (e.g., an interconnected group of linked panorama images, etc.)—for example, in order to 'link' at least some of the panoramas and their acquisition locations together (with some corresponding directional lines 215 between example acquisition locations 210A-210C being shown for the sake of illustration), a copy of the MIGM system may determine relative positional information between pairs of acquisition locations that are visible to each other, store corresponding inter-panorama links (e.g., links 215-AB, 215-BC and 215-AC between acquisition locations 210A and 210B, 210B and 210C, and 210A and 210C, respectively), and in some embodiments and situations further link at least some acquisition locations that are not visible to each other (e.g., a link 215-BE, not shown, between acquisition locations 210B and 210E; a link 215-CS, not shown, between acquisition locations 210C and 210S, etc.). Additional details related to embodiments of generating and using linking information between panorama images, including using travel path information and/or elements or other features visible in multiple images, are included in U.S. Non-Provisional patent application Ser. No. 17/064,601, filed Oct. 7, 2020 and entitled "Connecting And Using Building Data Acquired From Mobile Devices" (which includes disclosure of an example BICA system that is generally directed to obtaining and using linking information to inter-connect multiple panorama images captured within one or more buildings or other structures); in U.S. Non-Provisional patent application Ser. No. 17/080,604, filed Oct. 26, 2020 and entitled "Generating Floor Maps For Buildings From Automated Analysis Of Visual Data Of The Buildings' Interiors"; and in U.S. Provisional Patent Application No. 63/035,619, filed Jun. 5, 2020 and entitled "Automated Generation On Mobile Devices Of Panorama Images For Buildings Locations And Subsequent Use"; each of which is incorporated herein by reference in its entirety.

In addition, the mobile computing device 185 and/or camera device 186 may operate under control of the BUAM system (whether system 140 on server computing system(s) 180 and/or BUAM application 156 executing in memory 152 of the mobile computing device 185) to capture images of rooms and in-room objects and their target attributes, whether instead of or in addition to performing image acquisition operations for the ICA system (e.g., in some embodiments to capture images for both systems simultaneously, to capture images only for the BUAM system but not for the ICA system, etc.). In a manner analogous to that discussed above with respect to the ICA system, the image acquisition devices may move through some or all rooms of the building 198 to capture initial images and additional images (e.g., at the same time, such as if the analysis of the visual data of the initial images is performed in a real-time or near-real-time manner, such as within seconds or minutes of acquiring the initial images; in two or more different trips through the building, such as one or more first trips to capture the initial images and one or more second trips to capture the additional images; etc.), although in other situations the BUAM system may acquire only additional images (e.g., if images from another system, such as the ICA system, are used as the initial images) and/or only initial images (e.g., if the initial images include sufficient visual detail about all of the object and target attributes of objects to perform the evaluation of the target attributes and assessments of the objects and assessments of the rooms). The acquisition of the initial images and/or additional images by the BUAM system may, for example, include following the path 115 through the acquisition locations 210 in whole or in part, and optionally may include deviations from the path to capture sufficient details about individual objects and/or object attributes—in at least some situations, the one or more image acquisition devices may be carried by or otherwise accompanied by one or more users while participating in the capture of initial images and/or additional images for the BUAM systems, while in other embodiments and situations may be mounted on or carried by one or more self-powered devices that move through the building under their own power. In addition, the capture of the visual data may be performed in various manners in various embodiments, as discussed in greater detail above with respect to operations of the ICA system. The one or more image acquisition devices further capture additional data for the BUAM system (e.g., additional visual data using imaging system 135, additional motion data using sensor modules 148, optionally additional depth data using distance-measuring sensors 136, etc.), as well as data that is input or otherwise provided by one or more accompanying users (e.g., a BUAM system operator user). The actions of the one or more image acquisition devices may in some embodiments be controlled or facilitated via use of one or more programs executing on the mobile computing device 185 (e.g., via automated instructions to one or more image acquisition devices or to another mobile device, not shown, that is carrying those devices through the building under its own power; via instructions to an associated user in the room; etc.), such as BUAM application system 156 and/or BUAM system 140. After the various initial images and additional images and any other additional data is captured, the BUAM system proceeds to perform its automated operations to evaluate the target attributes and to assess usability information for the objects, rooms and/or building, as well as to use that generated usability information in various manners, as discussed in greater detail elsewhere herein.

Various details are provided with respect to FIGS. 1A-1B, but it will be appreciated that the provided details are non-exclusive examples included for illustrative purposes, and other embodiments may be performed in other manners without some or all such details.

Figure 2D:
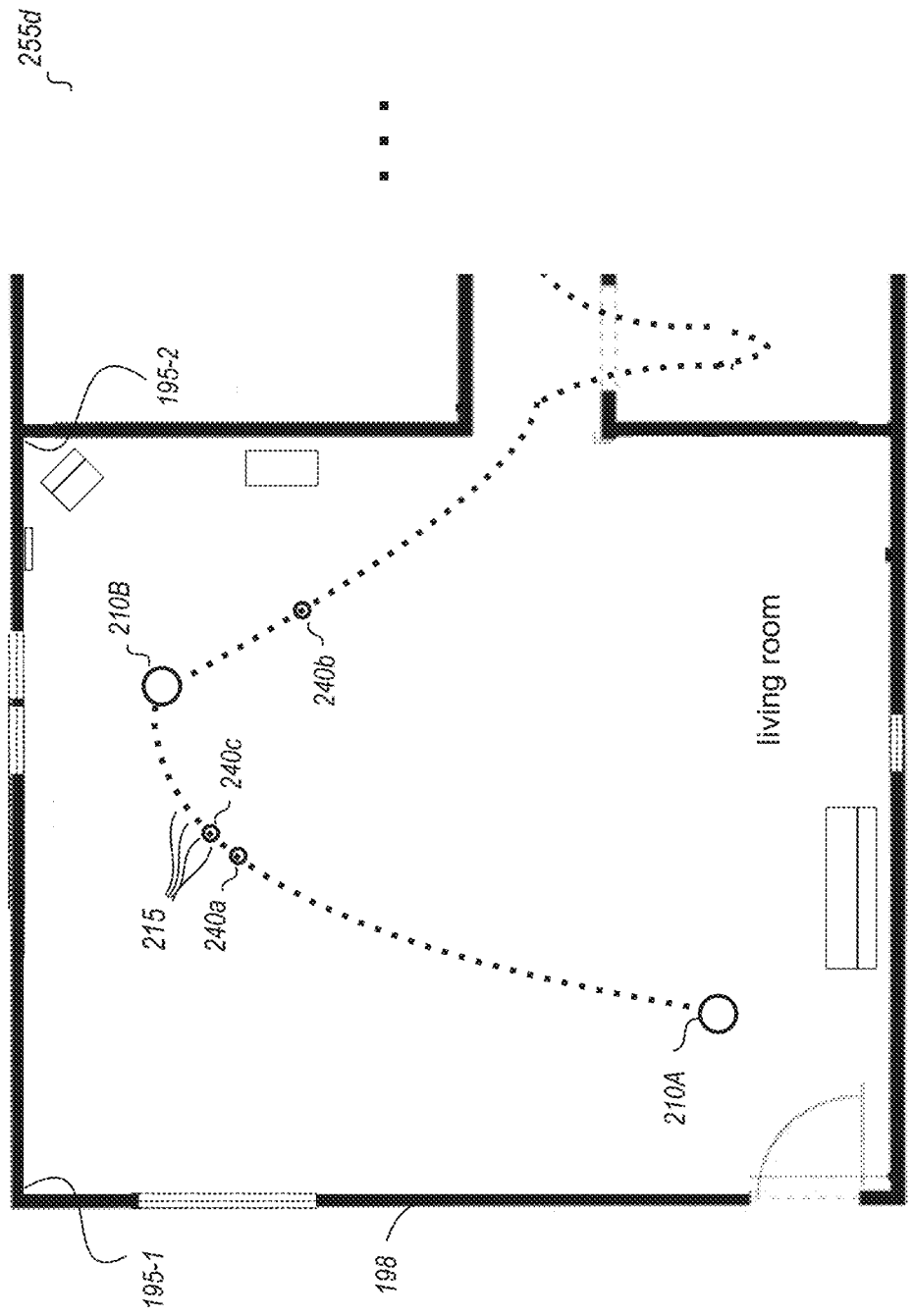
Figure 2K:
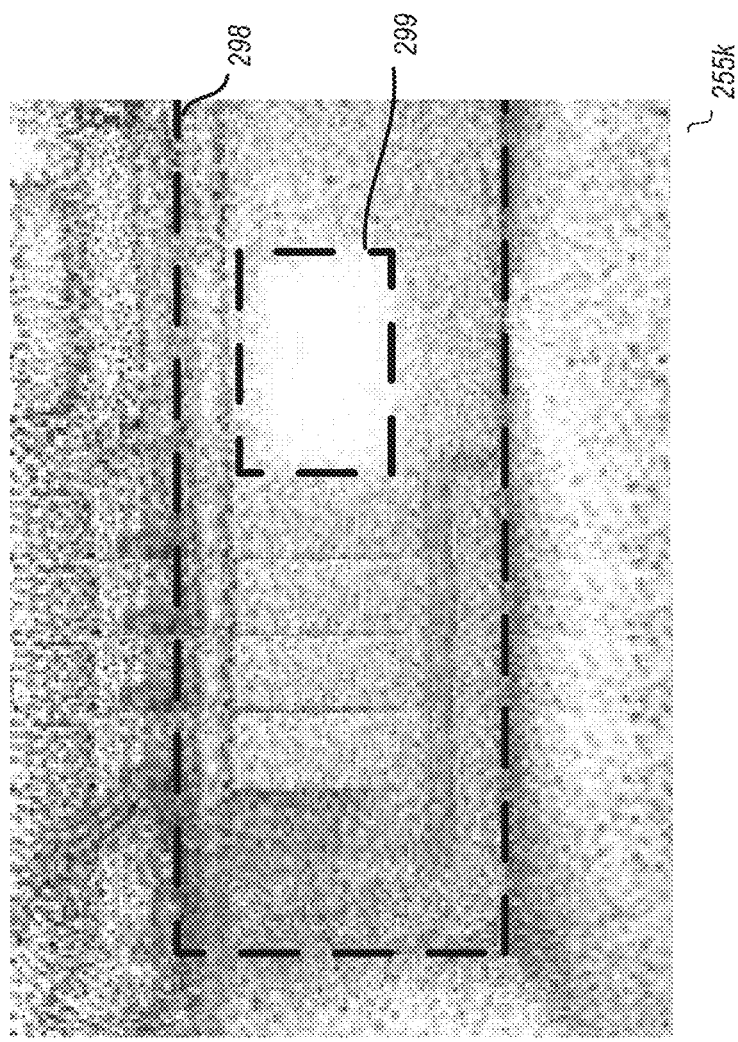
Figure 2L:
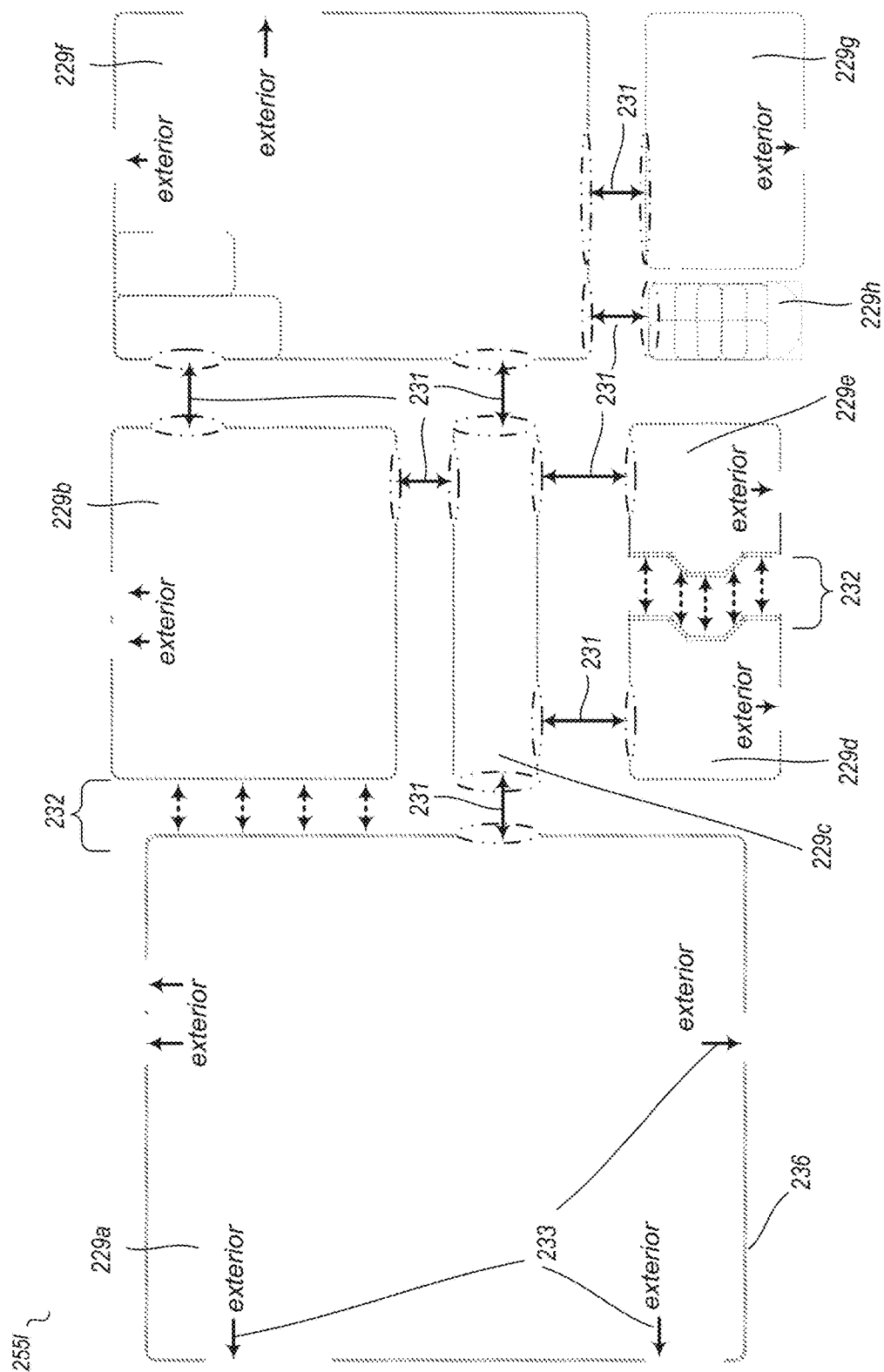
Figure 2M:
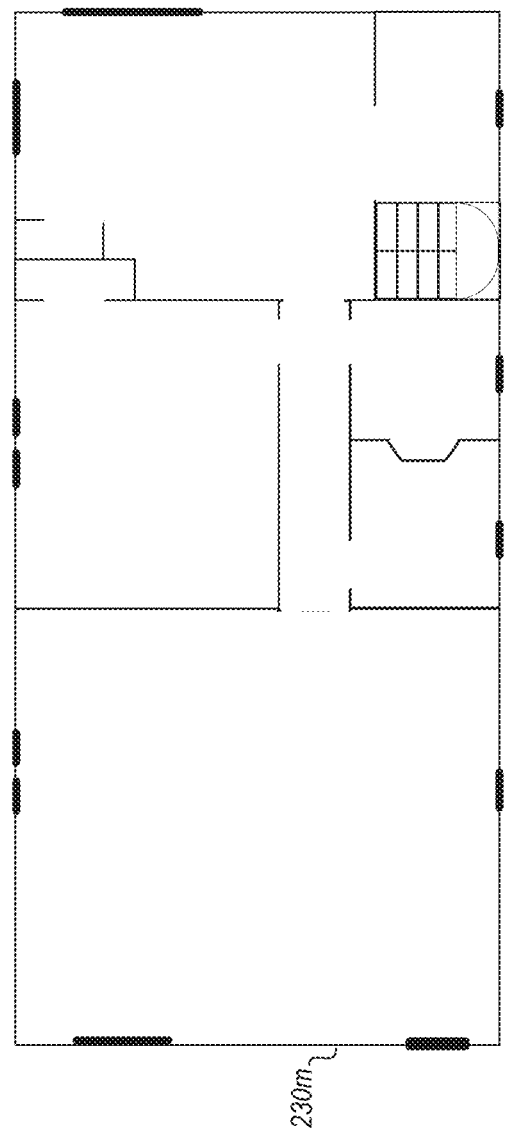
Figure 2N:
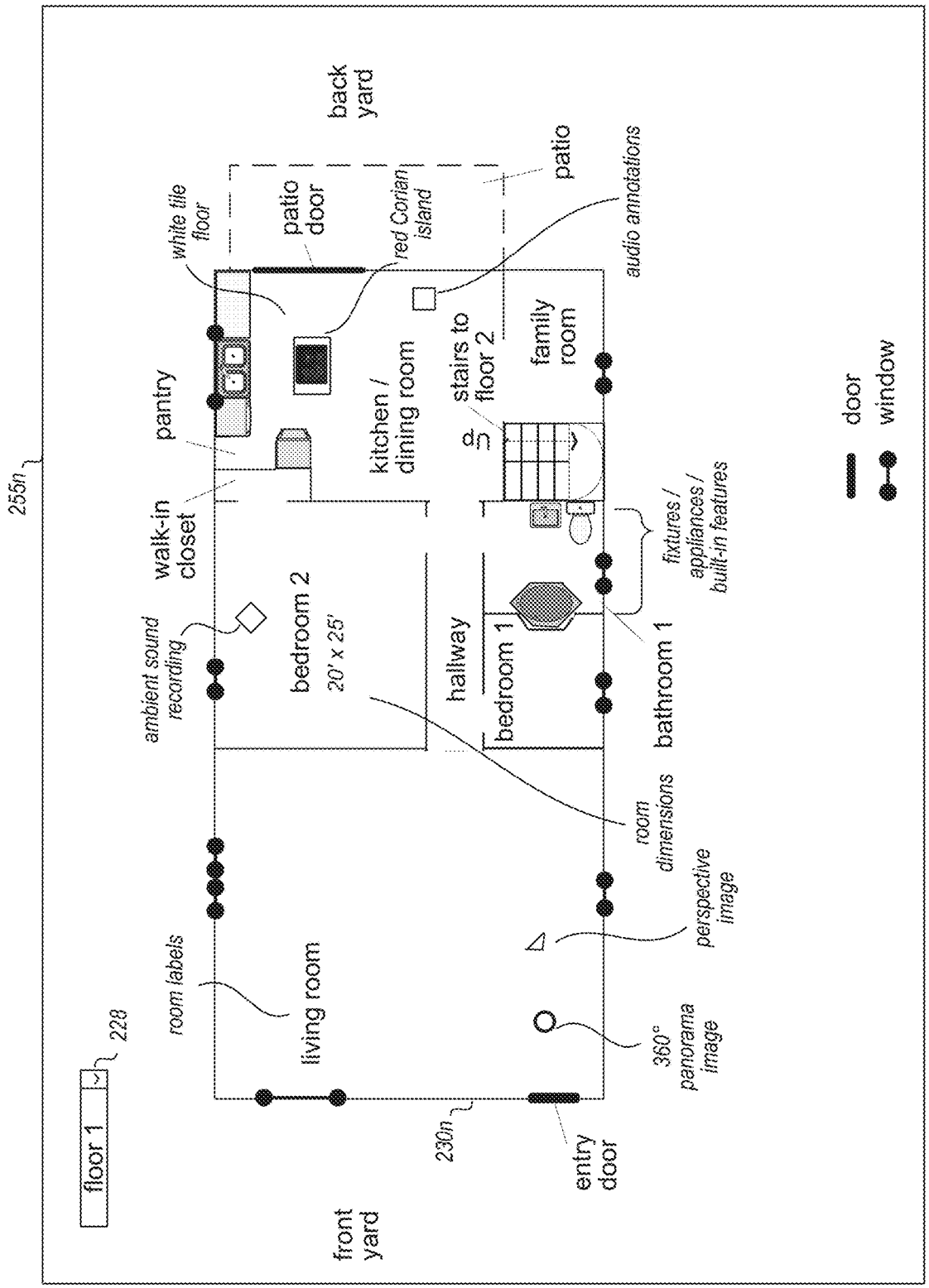
Figure 2P:
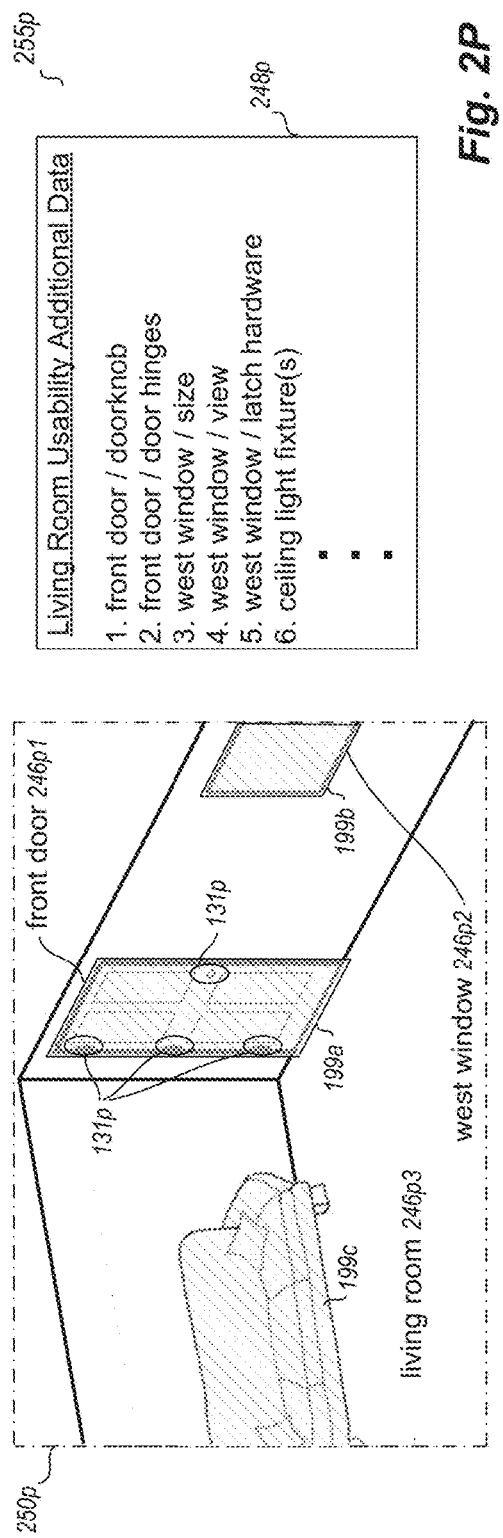
Figure 2Q:
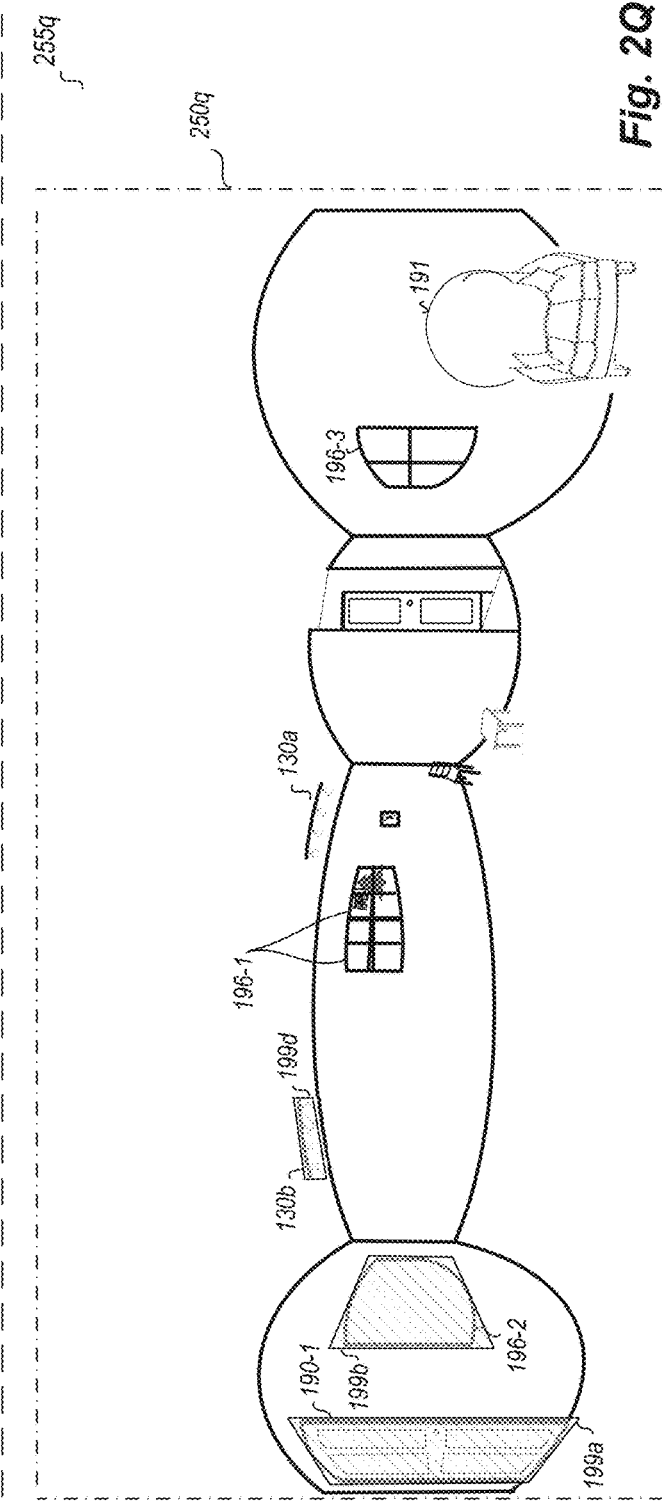
Figure 2V:
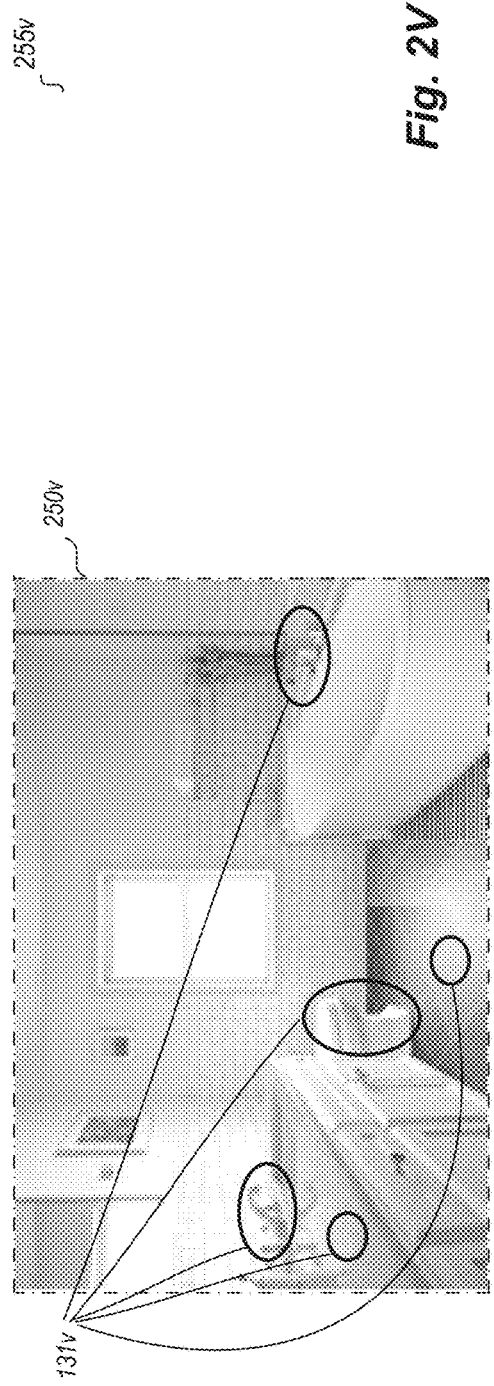
Figure 2W:
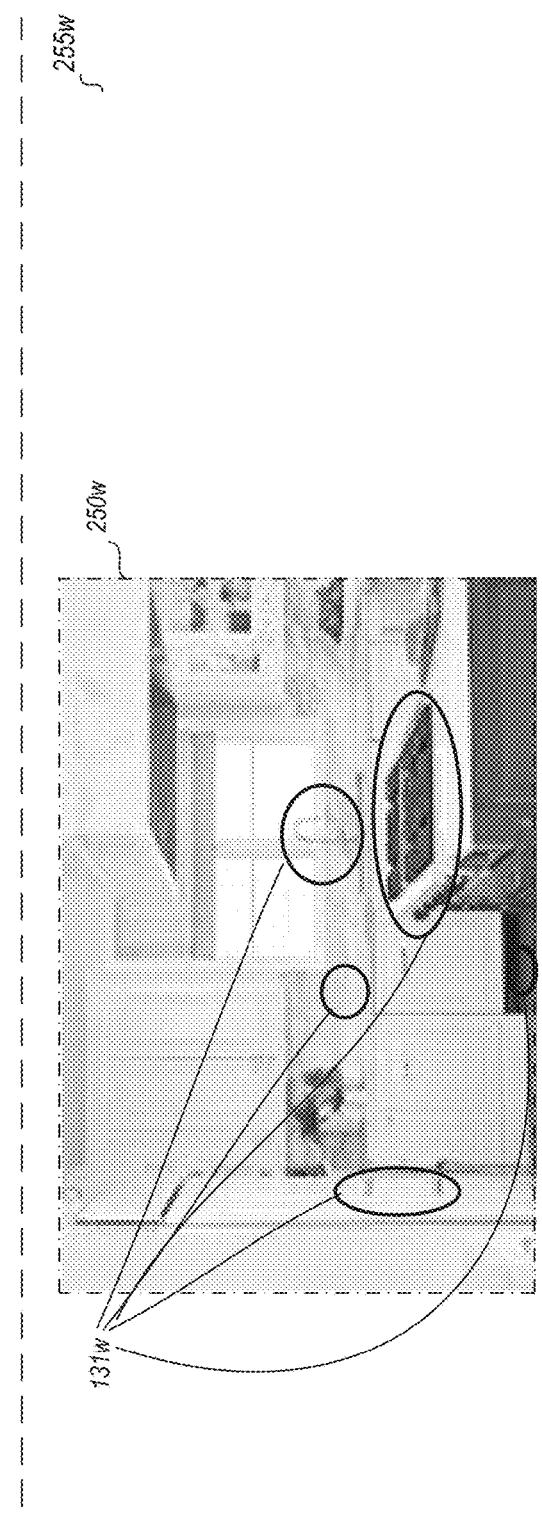
Figure 2X:
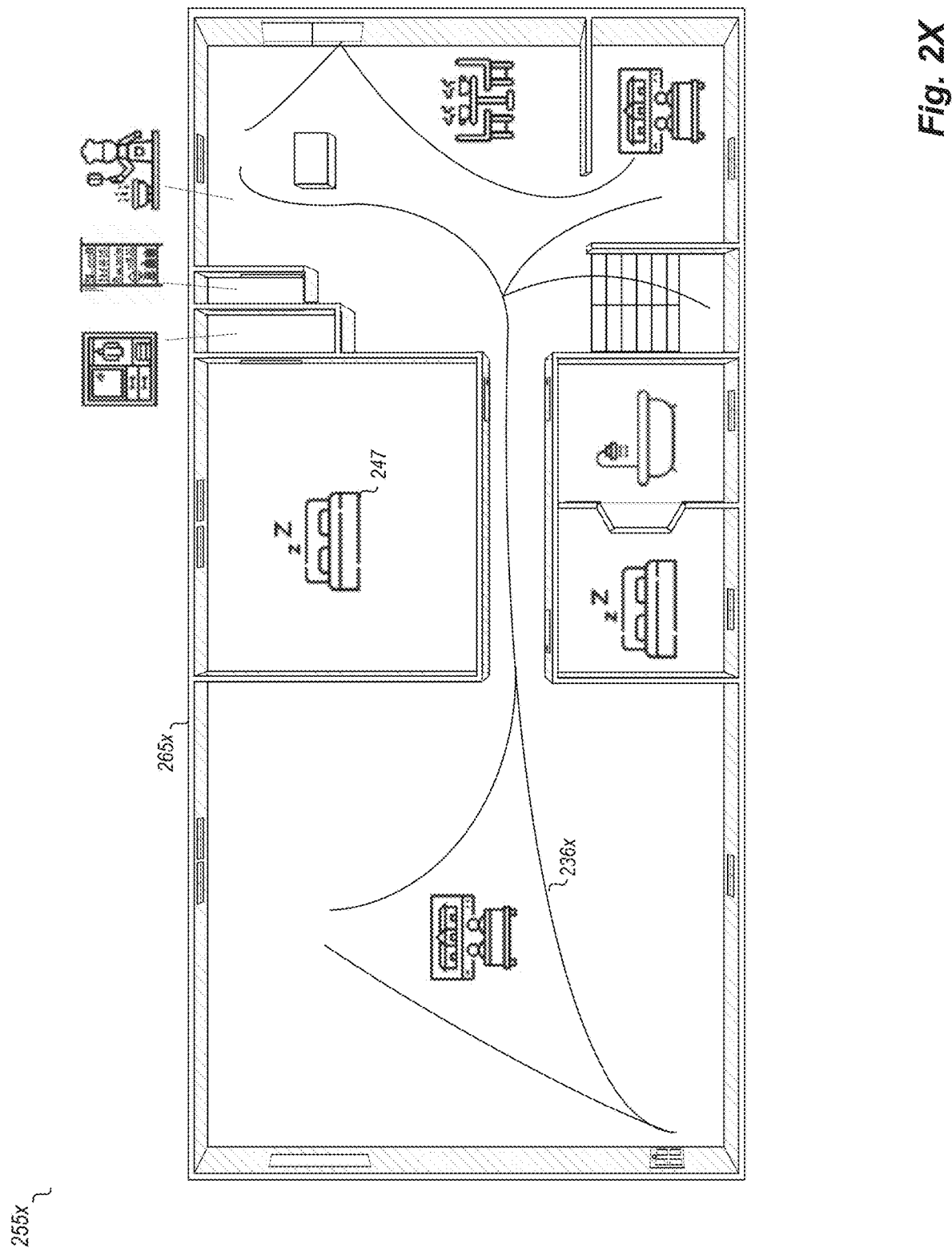

FIGS. 2A-2X illustrate examples of automatically capturing images associated with a building and analyzing the visual data of the images (optionally along with additional types of captured data) to generate and use various information about the building and its rooms, such as to generate a floor plan for the building, room shapes of rooms of the building, assessments of usability of the rooms and in-room objects (and evaluations of the objects' target attributes) and the building—at least some of the images are captured at acquisition locations 210 within the building 198 discussed in FIG. 1B.

In particular, FIG. 2A illustrates an example image 250a, such as a non-panorama perspective image taken in a northeasterly direction from acquisition location 210B in the living room of house 198 of FIG. 1B (or a northeasterly facing subset view of a 360-degree panorama image taken from that acquisition location and formatted in a rectilinear manner), such as by the ICA system, and/or by the BUAM system as an initial image. The directional indicator 109a is further displayed in this example to illustrate the northeasterly direction in which the image is taken. In the illustrated example, the displayed image includes built-in elements (e.g., light fixture 130a), furniture (e.g., chair 192-1), two windows 196-1, and a picture 194-1 hanging on the north wall of the living room. No inter-room passages into or out of the living room (e.g., doorways or other wall openings) are visible in this image. However, multiple room borders are visible in the image 250a, including horizontal borders between a visible portion of the north wall of the living room and the living room's ceiling and floor, horizontal borders between a visible portion of the east wall of the living room and the living room's ceiling and floor, and the inter-wall vertical border 195-2 between the north and east walls.

FIG. 2B continues the example of FIG. 2A, and illustrates an additional perspective image 250b captured by the one or more image acquisition devices in a northwesterly direction from acquisition location 210B in the living room of house 198 of FIG. 1B (or a northwesterly facing subset view of a 360-degree panorama image taken from that acquisition location and formatted in a rectilinear manner)—the directional indicator 109b is further displayed to illustrate the northwesterly direction in which the image is taken. In this example image, a small portion of one of the windows 196-1 continues to be visible, along with a portion of window 196-2 and a new lighting fixture 130b. In addition, horizontal and vertical room borders are visible in image 250b in a manner similar to that of FIG. 2A.

FIG. 2C continues the examples of FIGS. 2A-2B, and illustrates a third perspective image 250c captured by the one or more image acquisition devices in a southwesterly direction in the living room of house 198 of FIG. 1B (or a southwesterly facing subset view of a 360-degree panorama image taken from that acquisition location and formatted in a rectilinear manner), such as from acquisition location 210B—the directional indicator 109c is further displayed to illustrate the southwesterly direction in which the image is taken. In this example image, a portion of window 196-2 continues to be visible, as is a couch 191 and visual horizontal and vertical room borders in a manner similar to that of FIGS. 2A and 2B. This example image further illustrates a wall opening passage into/out of the living room, which in this example is a doorway 190-1 to enter and leave the living room (which FIG. 1B identifies as a door to the exterior of the house). It will be appreciated that a variety of other perspective images may be taken from acquisition location 210B and/or other acquisition locations and displayed in a similar manner.

FIG. 2D illustrates further information 255d for a portion of the house 198 of FIG. 1B, including the living room and limited portions of the further rooms to the east of the living room. As discussed with respect to FIGS. 1B and 2A-2C, in some embodiments, target panorama images may be captured at various locations in the house interior, such as at locations 210A and 210B in the living room, with corresponding visual contents of one or both such resulting target panorama images subsequently used to determine a room shape of the living room. In addition, in at least some embodiments, additional images may be captured, such as if the one or more image acquisition devices (not shown) are capturing video or one or more other sequences of continuous or near-continuous images as they move through the interior of the house. In this example, information is illustrated for a portion of the path 115 illustrated in FIG. 1B, and in particular illustrates a sequence of locations 215 along the path at which one or more video frame images (or other sequence of continuous or near-continuous images) may be captured (e.g., if video data is being captured) of the surrounding interior of the house while the one or more image acquisition devices are moved—examples of such locations include capture locations 240a-c, with further information related to video frame images captured from those locations shown in FIGS. 2E-2J. In this example, the locations 215 along the path are shown as being separated by short distances (e.g., a foot, an inch, a fraction of an inch, etc.), although it will be appreciated that video capture may be substantially continuous—thus, in at least some embodiments, only a subset of such captured video frame images (or other images from a sequence of continuous or near-continuous images) may be selected and used for further analysis, such as images that are separated by defined distances and/or that are separated by a defined amount of time between their capture (e.g., a second, a fraction of a second, multiple seconds, etc.) and/or based on other criteria.

FIGS. 2E-2J continue the examples of FIGS. 2A-2D, and illustrate additional information about the living room and about analyzing 360° image frames from the video captured along the path 155 as part of determining one type of estimate of a partial likely shape of the room, such as by the MIGM system. While not illustrated in these figures, similar techniques could be performed for target panorama images captured at two or more of acquisition locations 210A, 210B and 210C by the camera device, whether in addition to analysis of the additional image frames illustrated in FIG. 2D (e.g., to generate an additional estimate of the likely shape of the room using the visual data of the target images)

or instead of the analysis of the additional image frames illustrated in FIG. 2D. In particular, FIG. 2E includes information 255e illustrating that a 360° image frame taken from location 240b will share information about a variety of visible 2D features with that of a 360° image frame taken from location 240a, although only a limited subset of such features are illustrated in FIG. 2E for a portion of the living room for the sake of simplicity. In FIG. 2E, example lines of sight 228 from location 240b to various example features in the room are shown, and similar example lines of sight 227 from location 240a to corresponding features are shown, which illustrate degrees of difference between the views at significantly spaced capture locations. Accordingly, analysis of the sequence of images corresponding to locations 215 of FIG. 2D using SLAM and/or MVS and/or SfM techniques may provide a variety of initial information about the features of the living room, as illustrated further with respect to FIGS. 2F-2I.

In particular, FIG. 2F illustrates information 255f about the northeast portion of the living room that is visible in subsets of 360° image frames taken from locations 240a and 240b, and FIG. 2G illustrates information 255g about the northwest portion of the living room that is visible in other subsets of 360° image frames taken from locations 240a and 240b, with various example features in those portions of the living room being visible in both 360° image frames (e.g., corners 195-1 and 195-2, windows 196-1 and 196-2, etc.). As part of the automated analysis of the 360° image frames using SLAM and/or MVS and/or SfM techniques, partial information about planes 286e and 286f corresponding to portions of the northern wall of the living room may be determined from the features that are detected, and partial information 287e and 285f about portions of the east and west walls of the living room may be similarly determined from corresponding features identified in the images. In addition to identifying such partial plane information for detected features (e.g., for each point in a determined sparse 3D point cloud from the image analysis), the SLAM and/or MVS and/or SfM techniques may further determine information about likely locations and orientations/directions 220 for the image subsets from capture location 240a, and likely locations and orientations/directions 222 for the image subsets from capture location 240b (e.g., locations 220g and 222g in FIG. 2F of the capture locations 240a and 240b, respectively, and optionally directions 220e and 222e for the image subsets shown in FIG. 2F; and corresponding locations 220g and 222g in FIG. 2G of the capture locations 240a and 240b, respectively, and optionally directions 220f and 222f for the image subsets shown in FIG. 2G). While only features for part of the living room are illustrated in FIGS. 2F and 2G, it will be appreciated that the other portions of the 360° image frames corresponding to other portions of the living room may be analyzed in a similar manner, in order to determine possible information about possible planes for the various walls of the room, as well as for other features (not shown) in the living room. In addition, similar analyses may be performed between some or all other images at locations 215 in the living room that are selected for use, resulting in a variety of determined feature planes from the various image analyses that may correspond to portions of the walls of the room.

FIG. 2H continues the examples of FIGS. 2A-2G, and illustrates information 255h about a variety of determined feature planes that may correspond to portions of the west and north walls of the living room, from analyses of the 360° image frames captured at locations 240a and 240b. The illustrated plane information includes determined planes 286g near or at the northern wall (and thus corresponding possible locations of parts of the northern wall), and determined planes 285g near or at the western wall (and thus corresponding possible locations of parts of the western wall). As would be expected, there are a number of variations in different determined planes for the northern and western walls from different features detected in the analysis of the two 360° image frames, such as differences in position, angle and/or length, as well as missing data for some portions of the walls, causing uncertainty as to the actual exact position and angle of each of the walls. While not illustrated in FIG. 2H, it will be appreciated that similar determined feature planes for the other walls of the living room would similarly be detected, along with determined feature planes corresponding to features that are not along the walls (e.g., furniture).

FIG. 2I continues the examples of FIGS. 2A-2H, and illustrates information 255i about additional determined feature plane information that may correspond to portions of the west and north walls of the living room, from analyses of various additional 360° image frames selected from additional locations 215 along the path 115 in the living room—as would be expected, the analyses of the further images provides even greater variations in different determined planes for the northern and western walls in this example. FIG. 2I further illustrates additional determined information that is used to aggregate information about the various determined feature planes portions in order to identify likely partial locations 295a and 295b of the west and north walls, as illustrated in information 255j of FIG. 2J. In particular, FIG. 2I illustrates information 291a about normal orthogonal directions for some of the determined feature planes corresponding to the west wall, along with additional information 288a about those determined feature planes. In the example embodiment, the determined feature planes are clustered to represent hypothesized wall locations of the west wall, and the information about the hypothesized wall locations is combined to determine the likely wall location 295a, such as by weighting information from the various clusters and/or the underlying determined feature planes. In at least some embodiments, the hypothesized wall locations and/or normal information is analyzed via use of machine learning techniques to determine the resulting likely wall location, optionally by further applying assumptions or other constraints (such as a 90° corner, as illustrated in information 289 of FIG. 2H, and/or having flat walls) as part of the machine learning analysis or to results of the analysis. Similar analysis may be performed for the north wall using information 288b about corresponding determined feature planes and additional information 291b about resulting normal orthogonal directions for at least some of those determined feature planes. FIG. 2J illustrates the resulting likely partial wall locations 295a and 295b for the west and north walls of the living room, respectively, including to optionally estimate the locations of missing data (e.g., via interpolation and/or extrapolation using other data).

While not illustrated in FIG. 2I, it will be appreciated that similar determined feature planes and corresponding normal directions for the other walls of the living room will similarly be detected and analyzed to determine their likely locations, resulting in an estimated partial overall room shape for the living room that is based on visual data acquired by the one or more image acquisition devices in the living room. In addition, similar analyses are performed for each of the rooms of the building, providing estimated partial room shapes of each of the rooms. Furthermore, while not illustrated in FIG. 2D-2J, the analysis of the visual data captured by the one or more image acquisition devices may be supplemented and/or replaced in some embodiments by analysis of depth data (not shown) captured by the one or more image acquisition devices in the living room, such as to directly generate an estimated 3D point cloud from the depth data that represents the walls and optionally ceiling and/or floor of the living room. While also not illustrated in FIGS. 2D-2J, other room shape estimation operations may be performed in at least some embodiments using only a single target panorama image, such as via an analysis of the visual data of that target panorama image by one or more trained neural networks, as discussed in greater detail elsewhere herein.

FIG. 2K continues the examples of FIGS. 2A-2J, and illustrates information 255k about additional information that may be generated from one or more images in a room and used in one or more manners in at least some embodiments. In particular, images (e.g., video frames) captured in the living room of the house 198 may be analyzed in order to determine an estimated 3D shape of the living room, such as from a 3D point cloud of features detected in the video frames (e.g., using SLAM and/or SfM and/or MVS techniques, and optionally further based on IMU data captured by the one or more image acquisition devices). In this example, information 255k reflects an example portion of such a point cloud for the living room, such as in this example to correspond to a northwesterly portion of the living room (e.g., to include northwest corner 195-1 of the living room, as well as windows 196-1) in a manner similar to image 250c of FIG. 2C. Such a point cloud may be further analyzed to detect features such as windows, doorways and other inter-room openings, etc.—in this example, an area 299 corresponding to windows 196-1 is identified, as well as borders 298 corresponding to the north wall of the living room. It will be appreciated that in other embodiments such an estimated 3D shape of the living room may be determined by using depth data captured by the one or more image acquisition devices in the living room, whether in addition to or instead of using visual data of one or more images captured by the one or more image acquisition devices in the living room. In addition, it will be appreciated that various other walls and other features may be similarity identified in the living room and in the other rooms of the house 198.

FIG. 2L illustrates additional information 255l corresponding to, after final estimated room shapes are determined for the rooms of the illustrated floor of the house 198 (e.g., 2D room shape 236 for the living room), positioning the rooms' estimated room shapes relative to each other, based at least in part in this example on connecting inter-room passages between rooms and matching room shape information between adjoining rooms—in at least some embodiments, such information may be treated as constraints on the positioning of the rooms, and an optimal or otherwise preferred solution is determined for those constraints. Examples of such constraints in FIG. 2L include matching 231 connecting passage information (e.g., passages detected in the automated image analyses discussed with respect to FIGS. 2E-2J and/or FIGS. 2P-2X) for adjacent rooms so that the locations of those passages are co-located, and matching 232 shapes of adjacent rooms in order to connect those shapes (e.g., as shown for rooms 229d and 229e, and for rooms 229a and 229b). Various other types of information may be used in other embodiments for room shape positions, whether in addition to or instead of passage-based constraints and/or room shape-based constraints, such as exact or approximate dimensions for an overall size of the house (e.g., based on additional metadata available regarding the building, analysis of images from one or more image acquisition locations external to the building, etc.). House exterior information 233 may further be identified and used as constraints (e.g., based at least in part of automated identification of passages and other features corresponding to the building exterior, such as windows), such as to prevent another room from being placed at a location that has been identified as the building's exterior. In the example of FIG. 2L, the final estimated room shapes that are used may be 2D room shapes, or instead 2D versions of 3D final estimated room shapes may be generated and used (e.g., by taking a horizontal slice of a 3D room shape).

FIGS. 2M through 2-O continue the examples of FIG. 2A-2L, and illustrate mapping information that may be generated from the types of analyses discussed in FIGS. 2A-2L and FIGS. 2P-2V, such as by the MIGM system. In particular, FIG. 2M illustrates an example 2D floor plan 230m that may be constructed based on the positioning of determined final estimated room shapes, which in this example includes walls and indications of doorways and windows. In some embodiments, such a floor plan may have further information shown, such as about other features that are automatically detected by the analysis operations and/or that are subsequently added by one or more users. For example, FIG. 2N illustrates a modified floor plan 230n that includes additional information of various types, such as may be automatically identified from analysis operations of visual data from images and/or from depth data, and added to the floor plan 230m, including one or more of the following types of information: room labels (e.g., "living room" for the living room), room dimensions, visual indications of fixtures or appliances or other built-in features, visual indications of positions of additional types of associated and linked information (e.g., of panorama images and/or perspective images acquired at specified acquisition positions, which an end user may select for further display; of audio annotations and/or sound recordings that an end user may select for further presentation; etc.), visual indications of doorways and windows, etc.—in other embodiments and situations, some or all such types of information may instead be provided by one or more MIGM system operator users and/or ICA system operator users. In addition, if assessment and/or other information generated by the BUAM system is available, it may similarly be added to or otherwise associated with the floor plans 230m and/or 230n, whether in addition to or instead of some or all of the other additional types of information shown for floor plan 230n relative to floor plan 230m, although such BUAM system-generated information is not illustrated in this example. Furthermore, when the floor plans 230m and/or 230n are displayed to an end user, one or more user-selectable controls may be added to provide interactive functionality as part of a GUI (graphical user interface) screen 255n, such as to indicate a current floor that is displayed, to allow the end user to select a different floor to be displayed, etc., with a corresponding example user-selectable control 228 added to the GUI in this example—in addition, in some embodiments, a change in floors or other levels may also be made directly from the displayed floor plan, such as via selection of a corresponding connecting passage (e.g., a stairway to a different floor), and other visual changes may be made directly from the displayed floor plan by selecting corresponding displayed user-selectable controls (e.g., to select a control corresponding to a particular image at a particular location, and to receive a display of that image, whether instead of or in addition to the previous display of the floor plan from which the image is selected). In other embodiments, information for some or all different floors may be displayed simultaneously, such as by displaying separate sub-floor plans for separate floors, or instead by integrating the room connection information for all rooms and floors into a single floor plan that is shown together at once. It will be appreciated that a variety of other types of information may be added in some embodiments, that some of the illustrated types of information may not be provided in some embodiments, and that visual indications of and user selections of linked and associated information may be displayed and selected in other manners in other embodiments.

FIG. 2-O continues the examples of FIGS. 2A-2N, and illustrates additional information 265o that may be generated from the automated analysis techniques disclosed herein and displayed (e.g., in a GUI similar to that of FIG. 2N), which in this example is a 2.5D or 3D model floor plan of the house. Such a model 265o may be additional mapping-related information that is generated based on the floor plan 230m and/or 230n, with additional information about height shown in order to illustrate visual locations in walls of features such as windows and doors, or instead by combined final estimated room shapes that are 3D shapes. While not illustrated in FIG. 2-0, additional information may be added to the displayed walls in some embodiments, such as from images taken during the video capture (e.g., to render and illustrate actual paint, wallpaper or other surfaces from the house on the rendered model 265), and/or may otherwise be used to add specified colors, textures or other visual information to walls and/or other surfaces. In addition, some or all of the additional types of information illustrated in FIG. 2N may similarly be added to and shown in the floor plan model 265o.

Additional details related to embodiments of a system providing at least some such functionality of an MIGM system or related system for generating floor plans and associated information and/or presenting floor plans and associated information, and/or of a system providing at least some such functionality of an ILDM (Image Location Determination Manager) system for determining acquisition positions of images, are included in U.S. Non-Provisional patent application Ser. No. 16/190,162, filed Nov. 14, 2018 and entitled "Automated Mapping Information Generation From Inter-Connected Images" (which includes disclosure of an example Floor Map Generation Manager, or FMGM, system that is generally directed to automated operations for generating and displaying a floor map or other floor plan of a building using images acquired in and around the building); in U.S. Non-Provisional patent application Ser. No. 16/681,787, filed Nov. 12, 2019 and entitled "Presenting Integrated Building Information Using Three-Dimensional Building Models" (which includes disclosure of an example FMGM system that is generally directed to automated operations for displaying a floor map or other floor plan of a building and associated information); in U.S. Non-Provisional patent application Ser. No. 16/841,581, filed Apr. 6, 2020 and entitled "Providing Simulated Lighting Information For Three-Dimensional Building Models" (which includes disclosure of an example FMGM system that is generally directed to automated operations for displaying a floor map or other floor plan of a building and associated information); in U.S. Non-Provisional patent application Ser. No. 17/080,604, filed Oct. 26, 2020 and entitled "Generating Floor Maps For Buildings From Automated Analysis Of Visual Data Of The Buildings' Interiors" (which includes disclosure of an example Video-To-Floor Map, or VTFM, system that is generally directed to automated operations for generating a floor map or other floor plan of a building using video data acquired in and around the building); in U.S. Provisional Patent Application No. 63/035,619, filed Jun. 5, 2020 and entitled "Automated Generation On Mobile Devices Of Panorama Images For Buildings Locations And Subsequent Use"; in U.S. Non-Provisional patent application Ser. No. 17/069,800, filed Oct. 13, 2020 and entitled "Automated Tools For Generating Building Mapping Information"; in U.S. Non-Provisional patent application Ser. No. 16/807,135, filed Mar. 2, 2020 and entitled "Automated Tools For Generating Mapping Information For Buildings" (which includes disclosure of an example MIGM system that is generally directed to automated operations for generating a floor map or other floor plan of a building using images acquired in and around the building); in U.S. Non-Provisional patent application Ser. No. 17/013,323, filed Sep. 4, 2020 and entitled "Automated Analysis Of Image Contents To Determine The Acquisition Location Of The Image" (which includes disclosure of an example Image Location Mapping Manager, or ILMM, system that is generally directed to automated operations for determining acquisition positions of images); in U.S. Provisional Patent Application No. 63/135,312, filed Jan. 8, 2021 and entitled "Automated Determination Of Image Acquisition Locations In Building Interiors Using Multiple Data Capture Devices" (which includes disclosure of an example Image Location Determination Manager, or ILDM, system that is generally directed to automated operations for determining room shapes and acquisition positions of images); and in U.S. Provisional Patent Application No. 63/117,372, filed Nov. 23, 2020 and entitled "Automated Determination Of Image Acquisition Locations In Building Interiors Using Determined Room Shapes" (which includes disclosure of an example Mapping Information Generation Manager, or MIGM, system that is generally directed to automated operations for determining acquisition positions of images); each of which is incorporated herein by reference in its entirety.

FIGS. 2P-2X continue the examples of FIGS. 2A through 2-0, with FIG. 2P illustrating further information 255p that shows a portion of the living room of the house 198 of FIG. 1B. In particular, in the example of FIG. 2P, an image 250p is illustrated of the southwest portion of the living room (in a manner similar to that of image 250c of FIG. 2C), but with additional information overlaid on the image to illustrate information determined about objects and target attributes identified in that portion of the room for further analysis, along with information about locations of those objects. In particular, in this example, the west window (element 196-2 of image 250c) has been selected as an object of interest for the room, with the corresponding 'west window' label 246p2 having been determined for the object (whether automatically or based at least in part on information provided by one or more associated users), and an automatically determined location 199b of the object in the image being shown (which in this example is a bounding box for the object). The information 255p of FIG. 2P further illustrates a list 248p of objects and target attributes of interest identified based at least in part on the visual data of image 250p, which indicates that target attributes of interest for the west window include its size and information about a view through the window. The image 250p further indicates that the door (element 190-1 of FIG. 2C) has been identified as an object of interest, with a 'front door' label 246p1 (whether determined automatically or based at least in part on information provided by one or more associated users) and automatically determined bounding box location 199a being shown. In addition, the information 248p indicates that target attributes of the door include the doorknob and door hinges, which are further visually indicated 131p on the image 250p. In addition, the image 250p also indicates that the couch (element 191 of FIG. 2C) has been identified as an object of interest, with an automatically determined pixel-level mask location 199c being identified for the couch, but without a label being shown in this example. Other objects may similarly be identified, such as one or more ceiling light fixtures as indicated in information 248p, but which are not shown in the example image 250p (e.g., based at least in part on a list of defined types of objects that are expected or typical for rooms of type 'living room'). Similarly, other target attributes may be identified, such as the latching hardware of the west window as indicated in information 248p, but which are not shown in the example image 250p (e.g., based at least in part on a list of defined types of target attributes that are expected or typical for objects of type 'window'). In addition, a 'living room' label 246p3 for the room is also determined (whether automatically or based at least in part on information provided by one or more associated users) and shown. Such an image 250p and/or information 248p may, for example, be displayed to an associated user in the room in some embodiments (e.g., on a mobile computing device of the user or other image acquisition device of the user) as part of providing instructions to the user regarding additional data to be captured, such as to identify particular objects and/or target attributes, as well as their locations. FIG. 2Q provides an alternative image 250q as part of its information 255q, which in this example is a panorama image with 360° of visual coverage of the living room—such a panorama image may be used instead of or in addition to a perspective image such as image 250p for identifying objects and target attributes and additional related information (e.g., locations, labels, etc.), as well as for assessing an overall layout of items in the room and/or expected traffic flow for the room, with the example panorama image 250q similarly showing the location bounding boxes 199a and 199b for the front door and west window objects (but not the couch object in this example), as well as an additional location bounding box 199d for ceiling light 130b. It will be appreciated that a variety of other types of objects and/or target attributes may be identified in other embodiments.

FIGS. 2R-2T continue the examples of FIGS. 2P-2Q, and illustrate further information regarding instructions that may be provided to cause the capture of additional data in the living room, as well as corresponding additional data that is captured. In particular, FIG. 2R illustrates an image 250r that may be displayed to an associated user in the living room, such as in a manner similar to that of image 250p of FIG. 2P, but with additional information 249r to provide instructions to the associated user regarding obtaining additional data about the front door object, including about the target attributes of the hinges and doorknob, along with an option for the user to receive examples and optionally additional instructive information. While not illustrated in FIG. 2R, similar instructions may be provided for other objects such as the west window and/or couch and/or ceiling light, such as serially after the instructions 249r have been provided and corresponding additional data has been obtained, or simultaneously with the instructions 249r. FIG. 2S illustrates an additional image 250s that represents additional data captured in the living room about the front door (e.g., in response to instructions provided by the BUAM system), such as with additional detail about the door that is not available on the visual data of the image 250r. In addition, the image 250s is overlaid with examples of additional instructions or other information that may be provided to an associated user (e.g., before or after the user acquires the image of the front door shown in image 250s), such as instructions 249s1 that indicate after the image 250s is captured to recapture the image with better lighting based on an automated determination of a corresponding issue with the initial additional image 250s and/or a notification before or after the image 250s is captured that the visible object(s) do not appear to actually be the front door object shown in image 250r (e.g., based on an automated comparison of visual data in the two images). FIG. 2S further illustrates an example 249s2 of additional instructions that may be provided to an associated user about additional non-visual data to capture regarding the front door object, whether before or after capture of the image 250s, such as to provide a short textual description of the door material and age, and/or to record and provide a short video of the door opening that includes a view through the open door. FIG. 2T further provides example additional images 250t1 and 250t3 that are captured to provide further details about the identified target attributes of the front door object, with image 250t1 showing additional details about the doorknob and image 250t3 showing additional details about one of the hinges. In this example, image 250t1 is further overlaid with example instructions 249t1 to indicate that sufficient details about the doorknob are not available in the image 250t1 (e.g., due to the image not focusing sufficiently on just the doorknob), and that a new substitute additional image should be captured, with image 250t2 providing one example of such a substitute additional image to be used instead of image 250t1. Image 250t3 further provides an example of additional instructions or other notification information 249t2 to obtain additional data about the visible hinge, which in this example is for the associated user to confirm that the visual data in the image 250t3 is for the front door object in the living room. It will be appreciated that the types of instructions and the manner of providing them to an associated user that are illustrated in FIGS. 2P-2T are non-exclusive examples provided for the purpose of illustration, and that similar and/or other types of information may be provided in other manners in other embodiments.

FIG. 2U continues the examples of FIGS. 2P-2T, and provide examples of additional data that may be obtained about the living room based at least in part on analysis of one or more initial room-level images of the living room, such as panorama image 250q and/or multiple perspective images that include images 250a-250c and include visual data of all or substantially all of the living room. In particular, FIG. 2U illustrates information 255u that shows alternative examples 237a and 237b of a room shape of the living room (e.g., as may be determined by the MIGM system, as discussed in greater detail elsewhere herein), along with additional data 236u and 238 for room shape 237a that may be determined based at least in part on automated operations of the BUAM system and optionally additional actions of an associated user. In this example, the illustrated information 236u provides an example of expected traffic flow information for the living room, such as based at least in part on a determined layout (not shown) for the living room (e.g., using information about furniture in the living room and inter-wall openings). In addition, the illustrated information 238 indicates that a target attribute of the west window may have been evaluated as showing a mountain view in this example (e.g., based at least in part on an automated determination using visual data that is visible through the window; at least in part using information from an associated user; at least in part using information from other sources, such as publicly available data; etc.). It will be appreciated that these types of additional information are illustrated in FIG. 2U are non-exclusive examples provided for the purpose of illustration, and that similar and/or other types of information may be determined in other manners in other embodiments.

FIGS. 2V-2W continue the examples of FIGS. 2P-2U, and provide examples of additional data that may be obtained about other rooms of the building based at least in part on analysis of one or more initial room-level images of those other rooms. In particular, FIG. 2V illustrates information 255v that includes an image 250v, such as for bathroom 1 of the example house 198 shown in FIG. 1B (as identified in FIGS. 2N and 2-0). In a manner analogous to that of image 250p of FIG. 2P, image 250v includes indications 131v of objects and/or target attributes in the bathroom that are identified for which to capture additional data, which in this example includes a tile floor, a sink countertop, a sink faucet and/or other sink hardware, a bathtub faucet and/or other bathtub hardware, a toilet, etc.—however, location information, labels and provided instructions are not illustrated in this example. In a similar manner, FIG. 2W illustrates information 255w that includes an image 250w, such as for the kitchen of the example house 198 shown in FIG. 1B (as identified in FIGS. 2N and 2-0). In a manner analogous to that of image 250v of FIG. 2V, image 250w includes indications 131w of objects and/or target attributes in the kitchen that are identified for which to capture additional data, which in this example includes a refrigerator, a stove on a kitchen island, a sink faucet and/or other sink hardware, a countertop and/or backsplash beside the sink, etc.—however, location information, labels and provided instructions are not illustrated in this example It will be appreciated that various types of corresponding instructions may be generated and provided to acquire additional data about such identified objects and/or target attributes, and that these types of additional data are illustrated in FIGS. 2V-2W as non-exclusive examples provided for the purpose of illustration, such that similar and/or other types of information may be determined in other manners in other embodiments.

FIG. 2X continues the examples of FIGS. 2P-2W, and provides additional information 255x related to performing overall usability assessment for a building (in this example, the house 198 of FIG. 1B). In particular, an example 2.5D or 3D floor plan 265x of the building is shown, which includes information 236x and 247 that may be used as part of the usability assessment for the building. In this example, the information 236x illustrates expected traffic flow patterns through the building, in a manner similar to that of information 236u of FIG. 2U for the living room. In addition, information 255x further illustrates information about determined room types for various rooms of the building, using graphical icons in this example for different types of corresponding activities for those room types, and with those room types and/or corresponding activities available to be used in at least some embodiments as intended purposes for the corresponding rooms (e.g., sleeping for the bed icon 247 shown in bedroom 2, as identified in FIGS. 2N and 2-0). It will be appreciated that information about assessments of particular objects, rooms and/or the building may also be overlaid on such a floor plan or otherwise provided in at least some embodiments, and that the types of additional data illustrated in FIG. 2X are non-exclusive examples provided for the purpose of illustration, such that similar and/or other types of information may be determined in other manners in other embodiments.

Various details have been provided with respect to FIGS. 2A-2X, but it will be appreciated that the provided details are non-exclusive examples included for illustrative purposes, and other embodiments may be performed in other manners without some or all such details.

As a non-exclusive example embodiment, the automated operations of the BUAM system may include the following actions with respect to providing instructions related to capturing additional data to use in assessment usability of objects, rooms and buildings.

Non-exclusive examples of assessing objects of interest and evaluating target attributes in this example embodiment may include answering questions such as the following: are the kitchen cabinets new, do they reach up to the ceiling, what do the bathroom fixtures look like, what condition are the door and window frames in, what condition are the gutters and downspouts in, what does the under-sink plumbing look like, what does the hot-water tank look like? To do so, the BUAM system of the example embodiment may generate and provide instructions and related information such as the following non-exclusive examples: "Take a picture of the kitchen sink", "Zoom in more so we can see more detail", "Are you sure that's the sink?", "Thanks for the photo of the bathtub. Is that from the master bedroom bath or the hall bath?", "Can you take a close-up of the drain?", etc. As part of doing so, the BUAM system of the example embodiment may perform automated operations to classify or detect common house features (such as sinks, drains, door frames, from images or video), such as by building convolutional neural network models of these, optionally together with a predefined checklist of target attributes (also referred to as 'properties' for this example embodiment) about which to capture additional data (e.g., for a bathtub, obtaining and analyzing a close-up image of the drain; for a doorway, obtaining and analyzing a close-up image of the door jamb; etc.), including to verify that the drain is visible in corresponding captured additional image and that it is a certain minimum size. As part of doing so, such a BUAM system may provide a GUI (or other user interface) that provides an associated user with a list of identified objects and/or target attributes for which to capture additional images, and corresponding examples of good images of those types.

The BUAM system of the example embodiment may, for example, implement a workflow with steps as follows to assess rooms of a house:
1) Start with a set of initial images from the house, along with room labels or object labels generated by machine learning models and/or users.
2) Given this list of labeled rooms and/or objects, generate a list of target attributes to capture or investigate.
3) Use a detector model to determine whether the initial images already contain visual data for the target attributes at a sufficient image resolution.
4) For target attributes that lack such visual data in the initial images, prompt an associated user to capture them, such as in the following manner:
   a. Present the user with one or more initial images of the room of interest as an "establishing shot".
   b. Optionally, show example images that illustrate the detail and camera angle to be captured.
   c. Instruct the user to capture an image and/or other media (e.g., a video, a 3D model, etc.) with visual data about the indicated target attribute and/or object.
   d. Analyze the captured media through automated on-board processing to:
      i. Verify the presence of the desired data at the desired resolution.

ii. Confirm other properties of the capture.
e. Optionally, verify that the background in the captured media matches the background in the "establishing shot" or other previously-captured images of the room. This verification may occur, for example, using image information (e.g., by analyzing the background) and/or using telemetry information (e.g., by checking that the camera pose information in the captured media is consistent with the camera pose information in the initial images).
f. If steps (d) or (e) reveal problems with the captured media, prompt the user to re-capture to correct the problems.
g. Optionally, prompt the user to enter more data about the target attribute and/or object that is not visually determinable.

With respect to step 1 above, the initial images may be panorama images and/or perspective images (e.g., submitted by a seller or agent or photographer in the course of listing a property) and ideally captured separately in each room. They might be annotated with room classification labels at the time of submission (e.g., a user might label images as "Kitchen", "Bedroom", "Living Room", etc.) and/or might be labeled after submission using machine learning models for room classification. In addition, there might be image regions or points where a user has added "point of interest" labels to objects (e.g., e.g. "industrial oven" or "new shower"), which might be further used to identify objects of interest and/or associated target attributes. Such operations may, for example, be performed on a mobile computing device used as an image acquisition device and/or on a remote server computing device.

With respect to step 2 above, the BUAM system may perform a mapping from labels to target attributes and/or types of additional data to capture. For example, the mappings may indicate information such as in the following non-exclusive examples: in a kitchen, a closeup shot of the oven (so a viewer can tell the brand, or inspect its controls); in a bathroom, closeup shots of each sink's hardware, the bathtub hardware, all sides of the bathtub, etc.; if a fireplace is present, information about whether it burns gas or wood; etc.

With respect to step 3 above, the BUAM system may use one or more deep learning detector models to detect certain objects and/or target attributes in the images. For example, such detections may include one or more of the following non-exclusive examples: in a kitchen, detect the oven, sink, and fridge; in a bathroom, detect each sink; in a living room, detect a fireplace or wood stove; etc. Such detector models may extract bounding regions to determine object locations from the input images (e.g., a <width, height> pixel rectangle whose upper left corner is <x,y> for a sink, auxiliary bounding regions for target attributes such as the sink hardware and/or drain, etc.). The BUAM system may use predefined information that specifies, for each type of detectable object and target attribute, minimum desired image dimensions and area in pixels for corresponding captured additional data, which the BUAM system would then verify in the visual data of captured additional images (e.g., to see if they meet the desired dimensions and area).

With respect to step 4a above, the BUAM system may present an initial image of a bathroom, along with a prompt saying, "Please capture a photo/video/3D model capturing the sink hardware". With respect to step 4b above, the BUAM system may have a defined library of standard example images, for each type of object and target attribute. With respect to step 4c above, the BUAM system may use different types of media in different situations, such as an image to obtain fine details (and optionally capturing additional data, such as to simultaneously take a second image using a wide-angle lens of the image acquisition device, to provide a narrow/wide field-of-view pair), a short video to assess functionality (e.g., assess water pressure using a short video of the faucet running at full), a 3D model to assess larger scenes (e.g., capture the perimeter of the house using a phone's LIDAR scanner), etc. With respect to step 4d above, the BUAM system may apply models similar to those of step 3 to detect the objects and target attributes, extract their location regions, and compare them against the desired sizes—such operations may, for example, be performed on a mobile computing device used as an image acquisition device. Other verification operations may be performed with respect to image brightness (e.g., if an image is captured in dark spaces such as underneath cabinets or near the furnace/hot water heater), properties of 3D captures (e.g., does a captured 3D model of a house perimeter form a closed loop?—if not, provide instructions to capture missed areas), etc. With respect to step 4e above, the BUAM system may perform verification activities to ensure that a captured image is in the correct room (e.g., check that the scene background of a captured additional image of a sink is from the correct bathroom, optionally using information from a narrow/wide field-of-view pair if available; use image-to-image feature matching to match visual data in the captured additional image to that of one or more of the initial room-level images; verify similar colors or textures between visual data in the captured additional image to that of one or more of the initial room-level images; etc.)—such operations may, for example, be performed on a mobile computing device used as an image acquisition device. With respect to step 4g above, the BUAM system may perform automated operations such as providing a prompt to enter a year that an object (e.g., a hot water tank) was last replaced, to specify when a wood floor was last refinished and/or whether it needs refinishing, etc. In addition, the automated operations of the BUAM system may include prioritizing an order in which additional images are captured based on one or more defined criteria, such as to capture visual data and/or other data about a kitchen appliance before capturing visual data and/or other data about kitchen drawer handles (e.g., if the kitchen appliance information has a greater weight or other effect on the usability determination with respect to the kitchen).

For efficiency purposes, the analysis of visual data of initial images and/or captured additional images may include using downsampling of captured images (to reduce resolution of the resulting images) if possible—for example, if data is available from LIDAR sensors to give 3D geometry information, this can also help in choosing an appropriate amount of downsampling to perform. In addition, some or all of the operations described above for the example embodiment of the BUAM system may be performed on a mobile computing device used as an image acquisition device and/or may be performed on one or more remote server computing systems (e.g., if the operations cannot be performed efficiently or quickly enough on the mobile computing device)—in the latter case, there may be latency between the time that media is captured and related feedback is issued, and if so, the feedback in Step 4f may be aggregated and presented together later for all the objects and/or target attributes.

Various details have been provided with respect to this example non-exclusive embodiment, but it will be appreciated that the provided details are included for illustrative purposes, and other embodiments may be performed in other manners without some or all such details.

Figure 3:
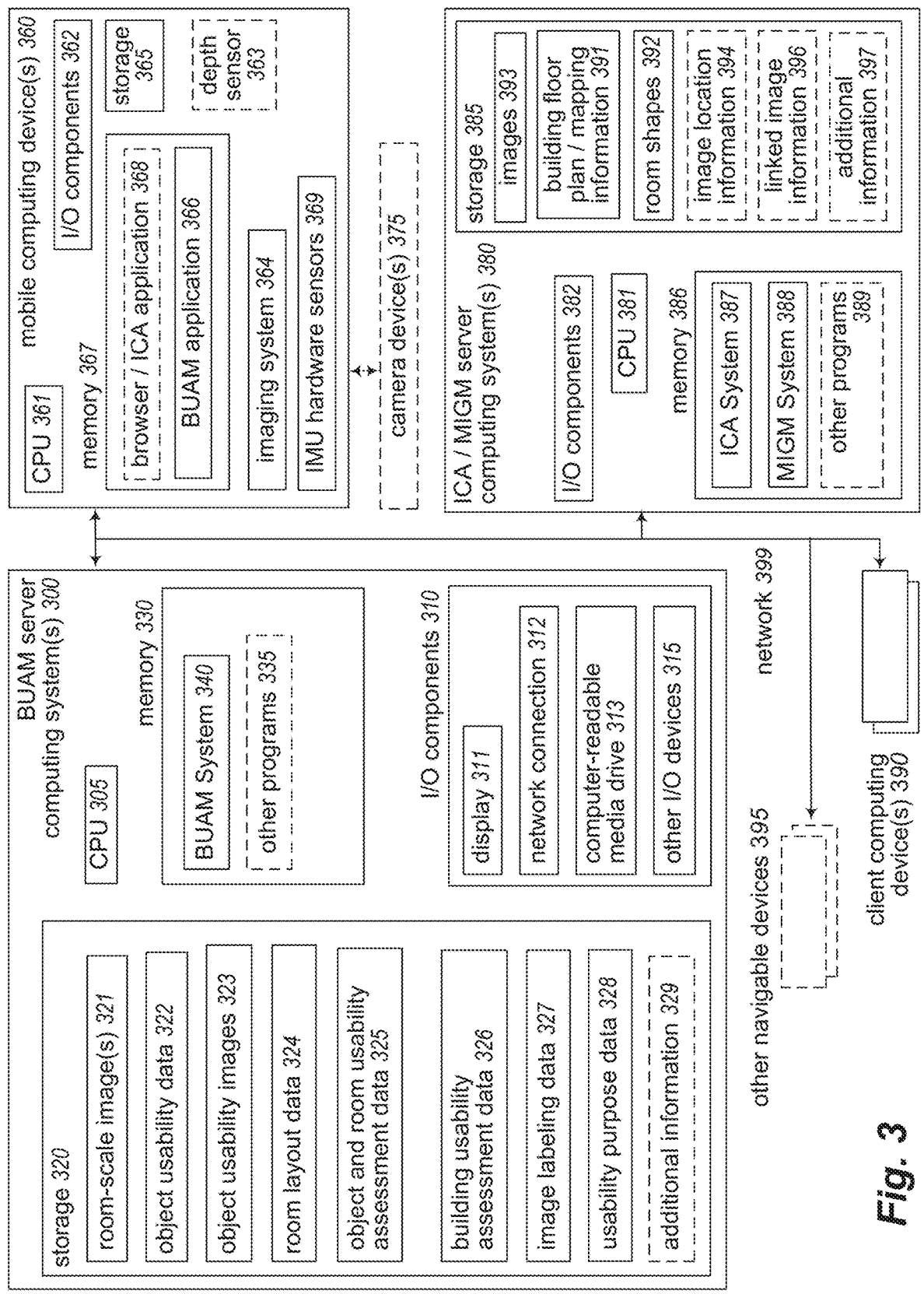
FIG. 3 is a block diagram illustrating computing systems suitable for executing embodiments of one or more systems that perform at least some of the techniques described in the present disclosure.

FIG. 3 is a block diagram illustrating an embodiment of one or more server computing systems 300 executing an implementation of an BUAM system 340, and one or more server computing systems 380 executing an implementation of an ICA system 387 and an MIGM system 388—the server computing system(s) and BUAM system may be implemented using a plurality of hardware components that form electronic circuits suitable for and configured to, when in combined operation, perform at least some of the techniques described herein. In the illustrated embodiment, each server computing system 300 includes one or more hardware central processing units ("CPU") or other hardware processors 305, various input/output ("I/O") components 310, storage 320, and memory 330, with the illustrated I/O components including a display 311, a network connection 312, a computer-readable media drive 313, and other I/O devices 315 (e.g., keyboards, mice or other pointing devices, microphones, speakers, GPS receivers, etc.). Each server computing system 380 may include hardware components similar to those of a server computing system 300, including one or more hardware CPU processors 381, various I/O components 382, storage 385 and memory 386, but with some of the details of server 300 being omitted in server 380 for the sake of brevity.

The server computing system(s) 300 and executing BUAM system 340 may communicate with other computing systems and devices via one or more networks 399 (e.g., the Internet, one or more cellular telephone networks, etc.), such as user client computing devices 390 (e.g., used to view floor plans, associated images, object and/or room and/or building assessments, and/or other related information), ICA and MIGM server computing system(s) 380, one or more mobile computing devices 360 (e.g., mobile image acquisition devices), optionally one or more camera devices 375, optionally other navigable devices 395 that receive and use floor plans and/or room/building assessment information (e.g., room and building layouts and traffic flow information) and optionally other generated information for navigation purposes (e.g., for use by semi-autonomous or fully autonomous vehicles or other devices), and optionally other computing systems that are not shown (e.g., used to store and provide additional information related to buildings; used to capture building interior data; used to store and provide information to client computing devices, such as additional supplemental information associated with images and their encompassing buildings or other surrounding environment; etc.). In some embodiments, some or all of the one or more camera devices 375 may directly communicate (e.g., wirelessly and/or via a cable or other physical connection, and optionally in a peer-to-peer manner) with one or more associated mobile computing devices 360 in their vicinity (e.g., to transmit captured target images, to receive instructions to initiate an additional image acquisition or capture of other additional data, etc.), whether in addition to or instead of performing communications via network 399, and with such associated mobile computing devices 360 able to provide captured images and optionally other captured data that is received from one or more camera devices 375 over the network 399 to other computing systems and devices (e.g., server computing system(s) 300 and BUAM system 340, server computing system(s) 380, etc.).

In the illustrated embodiment, an embodiment of the BUAM system 340 executes in memory 330 in order to perform at least some of the described techniques, such as by using the processor(s) 305 to execute software instructions of the system 340 in a manner that configures the processor(s) 305 and computing system(s) 300 to perform automated operations that implement those described techniques. The illustrated embodiment of the BUAM system may include one or more components, not shown, to each perform portions of the functionality of the BUAM system, and the memory may further optionally execute one or more other programs 335—as one specific example, copies of the ICA and/or MIGM systems may execute as one of the other programs 335 in at least some embodiments, such as instead of or in addition to the ICA system 387 and MIGM system 388 on the server computing system(s) 380. The BUAM system 340 may further, during its operation, store and/or retrieve various types of data on storage 320 (e.g., in one or more databases or other data structures), such as information 321 about captured room-scale images and information 323 about captured additional images (e.g., with details about objects and/or target attributes of objects), data 324 about determined room layouts and optionally other room-level information (e.g., traffic flow data), data 322 about additional captured data regarding usability for objects and/or rooms and/or buildings (including evaluations of target attributes of objects), data 325 about generated usability assessments for objects and rooms, data 326 about generated usability assessments for buildings, data 328 about intended purposes for particular types of rooms and buildings (or for particular factors associated with the rooms and/or buildings), data 327 for use in labeling information in images (e.g., object label data, room label data, etc.), and optionally various other types of additional information 329 (e.g., about users of client computing devices 390 and/or operator users of mobile devices 360 and/or 375 who interact with the BUAM system; lists or other predefined information about types of objects expected in a type of room; lists or other predefined information about types of target attributes expected in a type of object and optionally a type of room; lists or other predefined information about types of rooms expected in a type of building; data about other buildings and their assessments for use in comparisons, including valuations; etc.). The ICA system 387 and/or MIGM system 388 may similarly store and/or retrieve various types of data on storage 385 (e.g., in one or more databases or other data structures) during their operation and provide some or all such information to the BUAM system 340 for its use (whether in a push and/or pull manner), such as images 393 (e.g., acquired 360° panorama images), and optionally other information such as inter-image directional link information 396 that is generated by the ICA and/or MIGM systems and used by the MIGM system to generate floor plans, resulting floor plan information and optionally other building mapping information 391 that is generated by the MIGM system, additional information that is generated by the MIGM system as part of generating the floor plans such as determined room shapes 392 and optionally image location information 394, and optionally various types of additional information 397 (e.g., various analytical information related to presentation or other use of one or more building interiors or other environments captured by an ICA system).

Some or all of the user client computing devices 390 (e.g., mobile devices), mobile computing devices 360, other navigable devices 395 and other computing systems may similarly include some or all of the same types of components illustrated for server computing systems 300 and 380. As one non-limiting example, the mobile computing devices 360 are each shown to include one or more hardware CPU(s) 361, I/O components 362, storage 365, imaging system 364, IMU hardware sensors 369, optional depth sensor 363, and memory 367, having a BUAM application 366 and optionally having one or both of a browser and one or more other client applications 368 (e.g., an application specific to the ICA system) executing within memory 367, such as to participate in communication with the BUAM system 340, ICA system 387 and/or other computing systems. While particular components are not illustrated for the other navigable devices 395 or client computing systems 390, it will be appreciated that they may include similar and/or additional components.

It will also be appreciated that computing systems 300 and 380 and the other systems and devices included within FIG. 3 are merely illustrative and are not intended to limit the scope of the present invention. The systems and/or devices may instead each include multiple interacting computing systems or devices, and may be connected to other devices that are not specifically illustrated, including via Bluetooth communication or other direct communication, through one or more networks such as the Internet, via the Web, or via one or more private networks (e.g., mobile communication networks, etc.). More generally, a device or other computing system may comprise any combination of hardware that may interact and perform the described types of functionality, optionally when programmed or otherwise configured with particular software instructions and/or data structures, including without limitation desktop or other computers (e.g., tablets, slates, etc.), database servers, network storage devices and other network devices, smart phones and other cell phones, consumer electronics, wearable devices, digital music player devices, handheld gaming devices, PDAs, wireless phones, Internet appliances, and various other consumer products that include appropriate communication capabilities. In addition, the functionality provided by the illustrated BUAM system 340 may in some embodiments be distributed in various components, some of the described functionality of the BUAM system 340 may not be provided, and/or other additional functionality may be provided.

It will also be appreciated that, while various items are illustrated as being stored in memory or on storage while being used, these items or portions of them may be transferred between memory and other storage devices for purposes of memory management and data integrity. Alternatively, in other embodiments some or all of the software components and/or systems may execute in memory on another device and communicate with the illustrated computing systems via inter-computer communication. Thus, in some embodiments, some or all of the described techniques may be performed by hardware means that include one or more processors and/or memory and/or storage when configured by one or more software programs (e.g., by the BUAM system 340 executing on server computing systems 300) and/or data structures, such as by execution of stored contents including software instructions of the one or more software programs and/or by storage of such software instructions and/or data structures, and such as to perform algorithms as described in the flow charts and other disclosure herein. Furthermore, in some embodiments, some or all of the systems and/or components may be implemented or provided in other manners, such as by consisting of one or more means that are implemented partially or fully in firmware and/or hardware (e.g., rather than as a means implemented in whole or in part by software instructions that configure a particular CPU or other processor), including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the components, systems and data structures may also be stored (e.g., as software instructions or structured data) on a non-transitory computer-readable storage mediums, such as a hard disk or flash drive or other non-volatile storage device, volatile or non-volatile memory (e.g., RAM or flash RAM), a network storage device, or a portable media article (e.g., a DVD disk, a CD disk, an optical disk, a flash memory device, etc.) to be read by an appropriate drive or via an appropriate connection. The systems, components and data structures may also in some embodiments be transmitted via generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of the present disclosure may be practiced with other computer system configurations.

Figure 4:
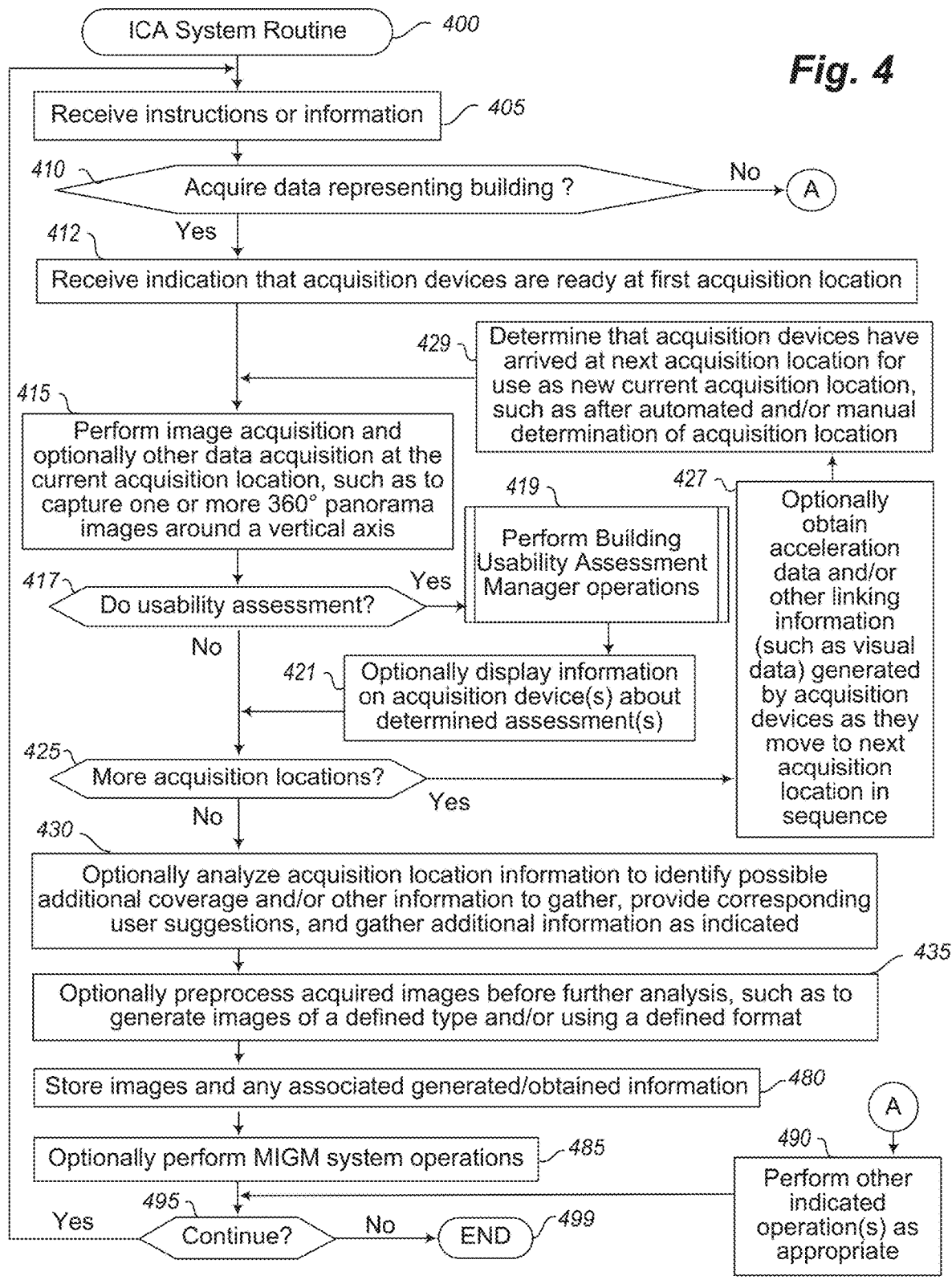
FIG. 4 illustrates an example flow diagram for an Image Capture and Analysis (ICA) system routine in accordance with an embodiment of the present disclosure.

FIG. 4 illustrates an example flow diagram of an embodiment of an ICA System routine 400. The routine may be performed by, for example, the ICA System 160 of FIG. 1A, the ICA System 387 of FIG. 3, and/or an ICA system as otherwise described herein, such as to acquire 360° target panorama images and/or other images within buildings or other structures (e.g., for use in subsequent generation of related floor plans and/or other mapping information, such as by an embodiment of an MIGM system routine, with one example of such a routine illustrated with respect to FIGS. 5A-5C; for use in subsequent assessments of usability of rooms and buildings, such as by an embodiment of a BUAM system routine, with one example of such a routine illustrated with respect to FIGS. 6A-6B; for use in subsequent determination of acquisition locations and optionally acquisition orientations of the target images; etc.). While portions of the example routine 400 are discussed with respect to acquiring particular types of images at particular locations, it will be appreciated that this or a similar routine may be used to acquire video or other data (e.g., audio, textual, etc.) and/or other types of images that are not panoramic, whether instead of or in addition to such panorama images. In addition, while the illustrated embodiment acquires and uses information from the interior of a target building, it will be appreciated that other embodiments may perform similar techniques for other types of data, including for non-building structures and/or for information external to one or more target buildings of interest. Furthermore, some or all of the routine may be executed on a mobile device used by a user to participate in acquiring image information and/or related additional data, and/or by a system remote from such a mobile device.

The illustrated embodiment of the routine begins at block 405, where instructions or information are received. At block 410, the routine determines whether the received instructions or information indicate to acquire data representing a building (e.g., in the building interior), and if not continues to block 490. Otherwise, the routine proceeds to block 412 to receive an indication that one or more image acquisition devices are ready to begin the image acquisition process at a first acquisition location, such as for a mobile computing device that is acting as an image acquisition device and/or is otherwise associated with one or more separate camera devices acting as image acquisition devices, and with the image acquisition device(s) carried by an associated user or moved under their own power or the power of one or more other devices that carry or otherwise move the one or more image acquisition devices—the received indication may be, for example, from one of the image acquisition devices, from another powered device that carries or otherwise moves the image acquisition device(s), from a user of one or more of the image acquisition devices, etc. After block 412, the routine proceeds to block 415 in order to perform acquisition location image acquisition activities in order to acquire at least one 360° panorama image by at least one image acquisition device (and optionally one or more additional images and/or other additional data by one or more of the image acquisition devices, such as from IMU sensors and/or depth sensors) for the acquisition location at the target building of interest, such as to provide horizontal coverage of at least 360° around a vertical axis. The routine may also optionally obtain annotation and/or other information from a user regarding the acquisition location and/or the surrounding environment, such as for later use in presentation of information regarding that acquisition location and/or surrounding environment.

Figure 6A:
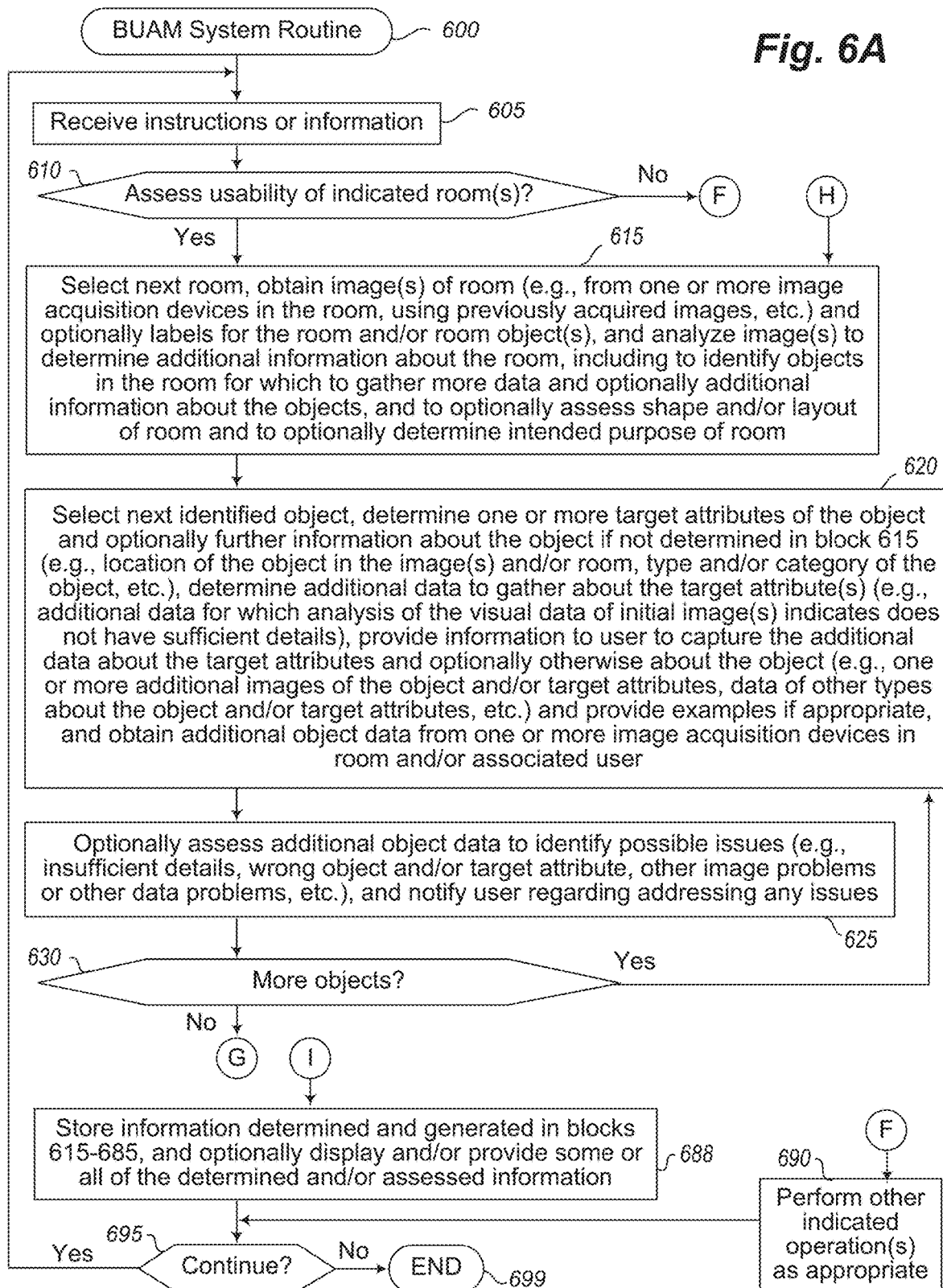
FIGS. 6A-6B illustrate an example flow diagram for a Building Usability Assessment Manager (BUAM) system routine in accordance with an embodiment of the present disclosure.
Figure 6B:
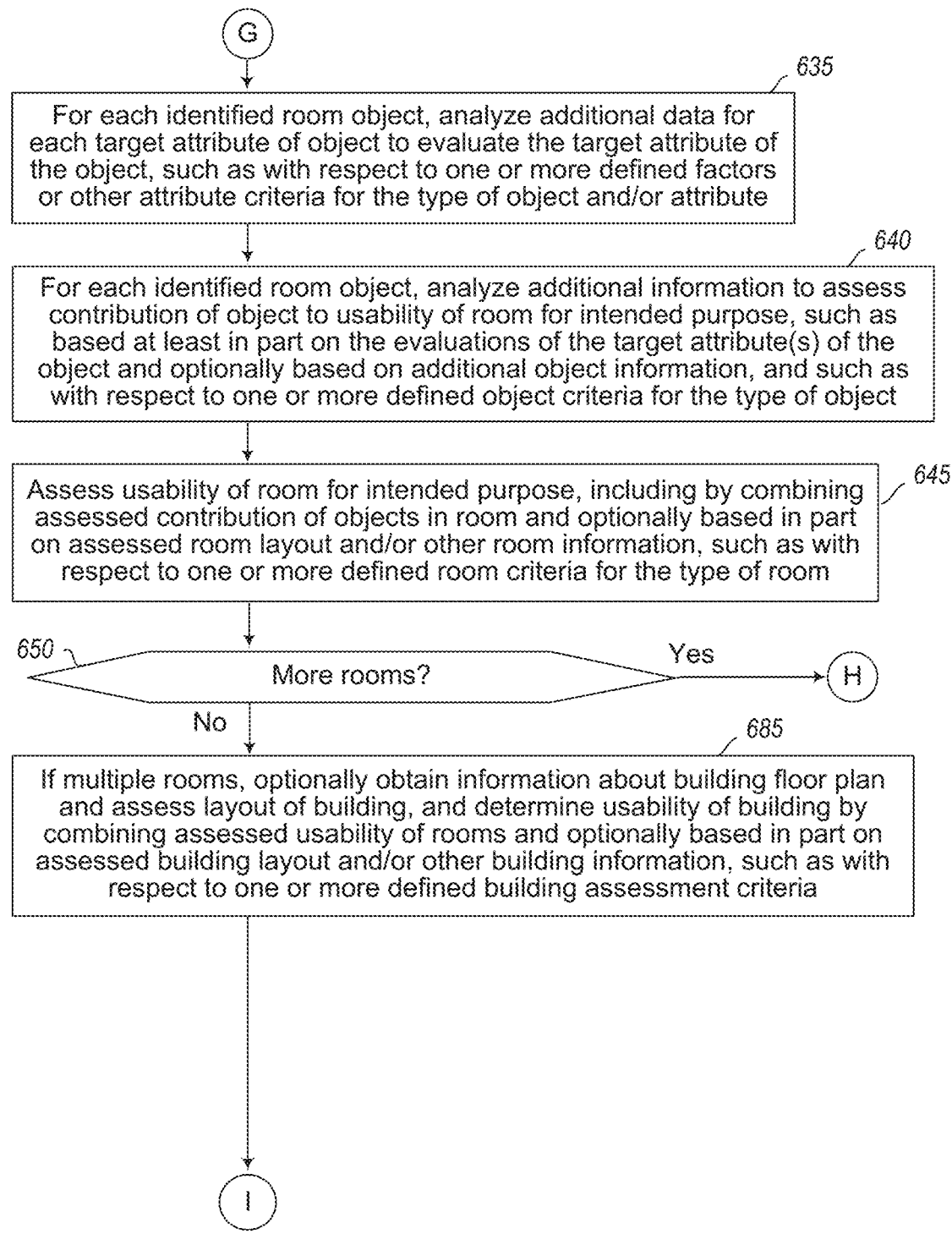

After block 415 is completed, the routine continues to block 417 to determine whether to perform a determination at the current time of a usability assessment based on the one or more images acquired in block 415, such as with respect to one or more objects visible from that acquisition location and/or with respect to one or more visible target attributes of such object(s) and/or with respect to a room enclosing the acquisition location, and if so the routine continues to block 419 to perform automated operations of a Building Usability Assessment Manager routine to determine the usability assessment information based at least in part on the visual data of the image(s)—FIGS. 6A-6B illustrate one example of such a Building Usability Assessment Manager routine. After block 419, the routine continues to block 421 to optionally display information on one or more of the image acquisition devices (e.g., on the mobile computing device) about determined usability assessment information based at least in part of the visual data of the image(s), such as in some embodiments and situations to display one or more of the images on the mobile computing device along with overlaid information about the determined usability assessment information.

After block 421, or if it is instead determined in block 417 not to determine usability assessment information at the current time for the one or more images acquired in block 415, the routine continues to block 425 to determine if there are more acquisition locations at which to acquire images, such as based on corresponding provided information (e.g., from one of the image acquisition devices, from another device that carries or otherwise moves the image acquisition device(s) under power of the other device, from a user of one or more of the image acquisition devices, etc.) and/or to satisfy specified criteria (e.g., at least two panorama images to be captured in each of some or all rooms of the building and/or in each of one or more areas external to the building). If so, the routine continues to block 427 to optionally initiate the capture of linking information (such as visual data, acceleration data from one or more IMU sensors, etc.) during movement of the image acquisition device(s) along a travel path away from the current acquisition location and towards a next acquisition location for the building. As described elsewhere herein, the captured linking information may include additional sensor data (e.g., from one or more IMU, or inertial measurement units, on one or more of the image acquisition devices or otherwise carried by the user or other powered device carrying or moving the image acquisition devices) and/or additional visual information (e.g., panorama images, other types of images, panoramic or non-panoramic video, etc.) recorded during such movement, and in some embodiments may be analyzed to determine a changing pose (location and orientation) of the image acquisition device(s) during the movement, as well as information about a room shape of the enclosing room (or other area) and the path of the image acquisition device(s) during the movement. Initiating the capture of such linking information may be performed in response to an explicit received indication (e.g., from one of the image acquisition devices, from another device that carries or otherwise moves the image acquisition device(s) under power of the other device, from a user of one or more of the image acquisition devices, etc.) or based on one or more automated analyses of information recorded from the mobile computing device and/or separate camera devices. In addition, the routine in some embodiments may further optionally determine and provide one or more guidance cues to a user regarding the motion of the image acquisition device(s), quality of the sensor data and/or visual information being captured during movement to the next acquisition location (e.g., by monitoring the movement of one or more of the image acquisition devices), including information about associated lighting/environmental conditions, advisability of capturing a next acquisition location, and any other suitable aspects of capturing the linking information. Similarly, the routine may optionally obtain annotation and/or other information regarding the travel path (e.g., from the user), such as for later use in presentation of information regarding that travel path or a resulting inter-panorama image connection link. In block 429, the routine then determines that the image acquisition device(s) have arrived at the next acquisition location (e.g., based on an indication from one of the image acquisition devices, from another device that carries or otherwise moves the image acquisition device(s) under power of the other device, from a user of one or more of the image acquisition devices; based on the forward movement of the image acquisition device(s) stopping for at least a predefined amount of time; etc.), for use as the new current acquisition location, and returns to block 415 in order to perform the image acquisition activities for the new current acquisition location.

If it is instead determined in block 425 that there are not any more acquisition locations at which to acquire image information for the current building or other structure, the routine proceeds to block 430 to optionally analyze the acquisition location information for the building or other structure, such as to identify possible additional coverage (and/or other information) to acquire within the building interior or otherwise associated with the building. For example, the ICA system may provide one or more notifications (e.g., to the user) regarding the information acquired during capture of the multiple acquisition locations and optionally corresponding linking information, such as if it determines that one or more segments of the recorded information are of insufficient or undesirable quality, or do not appear to provide complete coverage of the building, or alternatively may provide corresponding recapture instructions (e.g., to the user, to a device carrying or otherwise moving the image acquisition device(s), etc.). In addition, in at least some embodiments, if minimum criteria for images (e.g., a minimum quantity and/or type of images) have not been satisfied by the captured images (e.g., at least two panorama images in each room, panorama images within a maximum specified distance of each other, etc.), the ICA system may prompt or direct the acquisition of additional panorama images to satisfy such criteria in a similar manner. After block 430, the routine continues to block 435 to optionally preprocess the acquired 360° target panorama images before their subsequent use for generating related mapping information (e.g., to place them in a spherical format, to determine vanishing lines and vanishing points for the images, etc.). In block 480, the images and any associated generated or obtained information is stored for later use.

If it is instead determined in block 410 that the instructions or other information recited in block 405 are not to acquire images and other data representing a building, the routine continues instead to block 490 to perform any other indicated operations as appropriate, such as any housekeeping tasks, to configure parameters to be used in various operations of the system (e.g., based at least in part on information specified by a user of the system, such as a user of an image acquisition device that captures one or more building interiors, an operator user of the ICA system, etc.), to obtain and store other information about users of the system, to respond to requests for generated and stored information (e.g., requests for such information by an MIGM system and/or BUAM system for their use, requests for such information for use by a Building May Viewer system or other system for display or other presentation, requests from one or more client devices for such information for display or other presentation, operations to generate and/or train one or more neural networks or another analysis mechanisms for use in the automated operations of the routine, etc.).

Following blocks 480 or 490, the routine proceeds to block 495 to determine whether to continue, such as until an explicit indication to terminate is received, or instead only if an explicit indication to continue is received. If it is determined to continue, the routine returns to block 405 to await additional instructions or information, and if not proceeds to step 499 and ends.

Figure 5A:
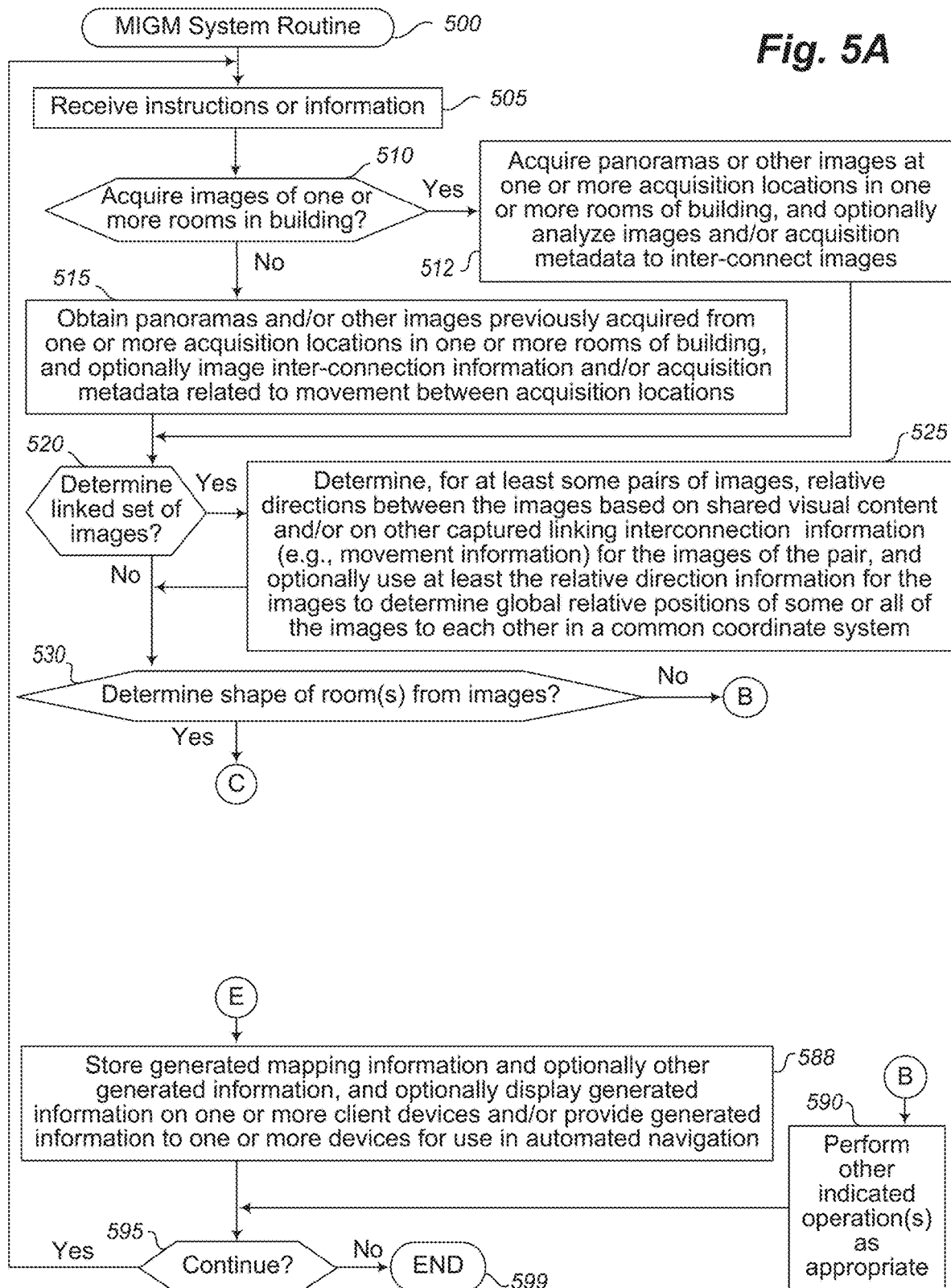
FIGS. 5A-5C illustrate an example flow diagram for a Mapping Information Generation Manager (MIGM) system routine in accordance with an embodiment of the present disclosure.
Figure 5B:
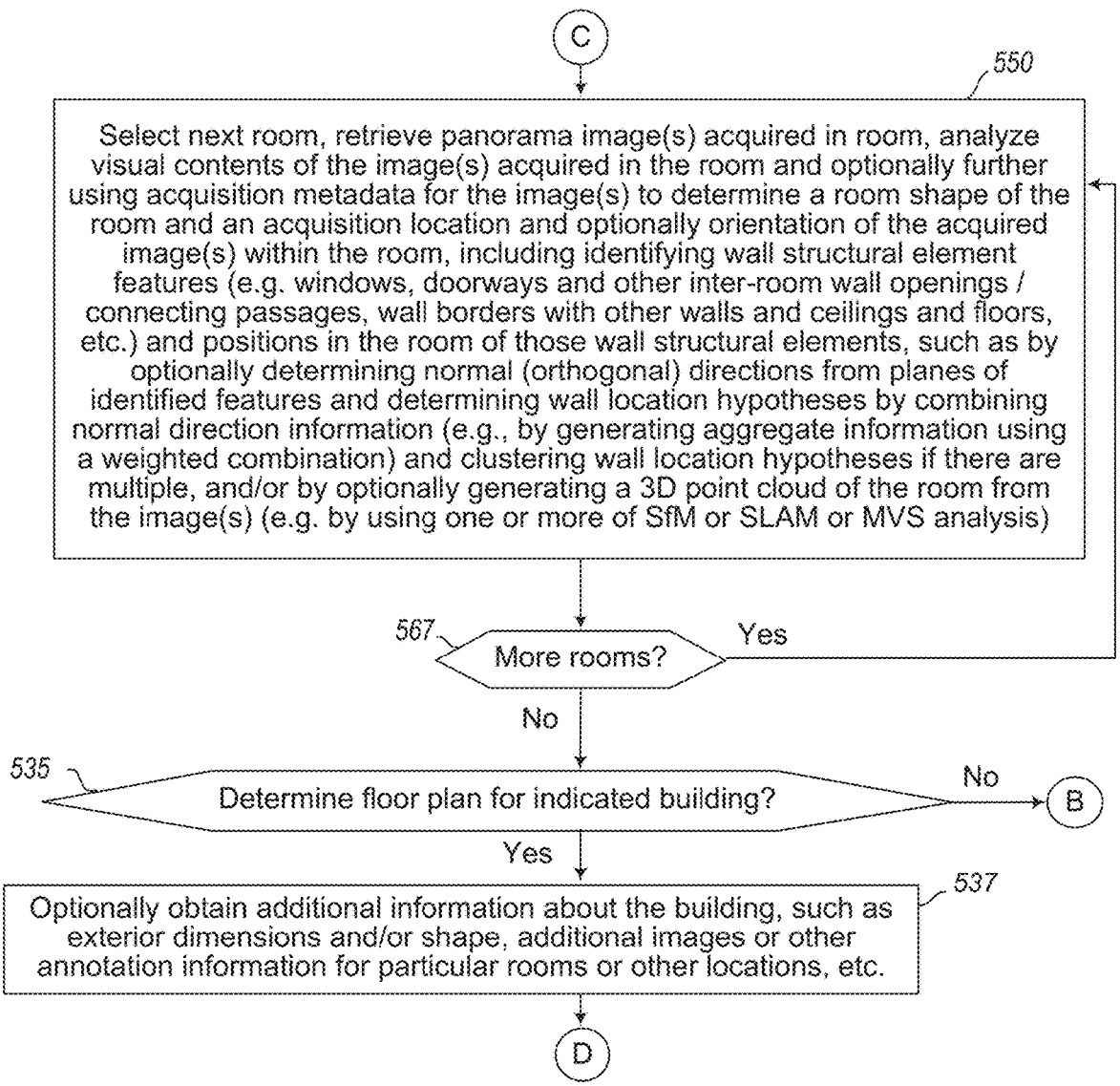
Figure 5C:
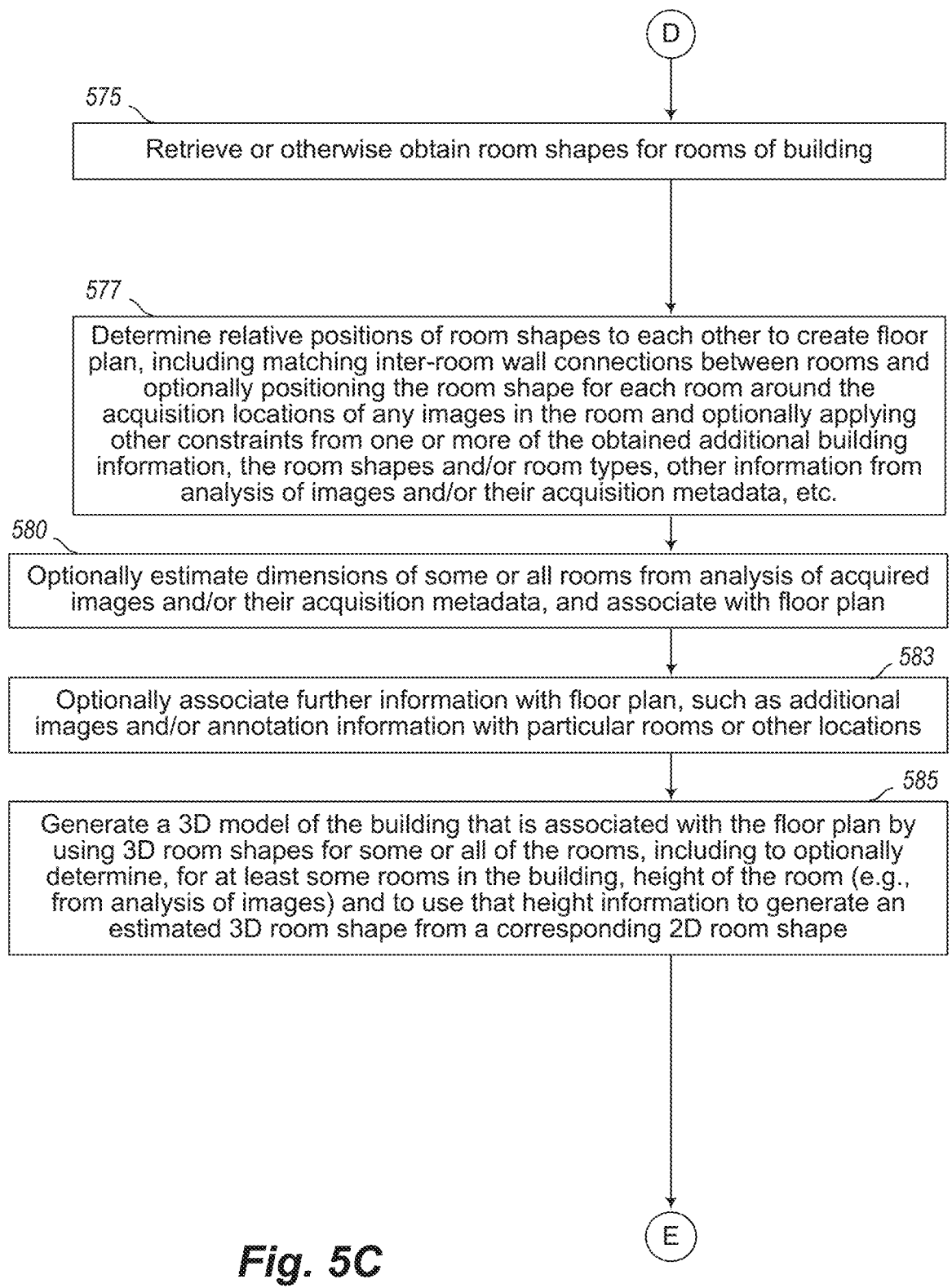

FIGS. 5A-5C illustrate an example embodiment of a flow diagram for a Mapping Information Generation Manager (MIGM) System routine 500. The routine may be performed by, for example, execution of the MIGM system 160 of FIG. 1A, the MIGM system 388 of FIG. 3, and/or an MIGM system as described elsewhere herein, such as to determine a room shape for a room (or other defined area) by analyzing and combining information from one or more images acquired in the room, to generate a floor plan for a building or other defined area based at least in part on one or more images of the area and optionally additional data captured by a mobile computing device, and/or to generate other mapping information for a building or other defined area based at least in part on one or more images of the area and optionally additional data captured by a mobile computing device. In the example of FIGS. 5A-5C, the determined room shape for a room may be a 3D fully closed combination of planar surfaces to represent the walls and ceiling and floor of the room, or may have other forms (e.g., based at least in part on a 3D point cloud), and the generated mapping information for a building (e.g., a house) includes a 2D floor plan and/or 3D computer model floor plan and/or a linked set of images with the links indicating relative directions between various pairs of images, but in other embodiments, other types of room shapes and/or mapping information may be generated and used in other manners, including for other types of structures and defined areas, as discussed elsewhere herein.

The illustrated embodiment of the routine begins at block 505, where information or instructions are received. The routine continues to block 510 to determine whether image information is already available to be analyzed for one or more rooms (e.g., for some or all of an indicated building), or if such image information instead is to be currently acquired. If it is determined in block 510 to currently acquire some or all of the image information, the routine continues to block 512 to acquire such information, optionally waiting for one or more image acquisition devices to move throughout one or more rooms of a building (e.g., carried by an associated user or moved under their own power or the power of one or more other devices that carry or otherwise move the one or more image acquisition devices) and acquire panoramas or other images at one or more acquisition locations in one or more of the rooms (e.g., at multiple acquisition locations in each room of the building), optionally along with metadata information regarding the acquisition and/or interconnection information related to movement between acquisition locations, as discussed in greater detail elsewhere herein—FIG. 4 provides one example embodiment of an ICA system routine for performing such image acquisition. If it is instead determined in block 510 not to currently acquire the images, the routine continues instead to block 515 to obtain existing panoramas or other images from one or more acquisition locations in one or more rooms (e.g., at multiple acquisition locations in each room of a building), optionally along with metadata information regarding the acquisition and/or interconnection information related to movement between the acquisition locations, such as may in some situations have been supplied in block 505 along with the corresponding instructions and/or previously obtained by an ICA system.

After blocks 512 or 515, the routine continues to block 520, where it determines whether to generate a linked set of target panorama images (or other images) for a building or other group of rooms, and if so continues to block 525. The routine in block 525 selects pairs of at least some of the images (e.g., based on the images of a pair having overlapping visual content and/or based on linking information that connects the images of a pair), and determines, for each pair, relative directions between the images of the pair based on shared visual content and/or on other captured linking interconnection information (e.g., movement information) related to the images of the pair (whether movement directly from the acquisition location for one image of a pair to the acquisition location of another image of the pair, or instead movement between those starting and ending acquisition locations via one or more other intermediary acquisition locations of other images). The routine in block 525 further uses at least the relative direction information for the pairs of images to determine global relative positions of some or all of the images to each other in a common coordinate system, such as to create a virtual tour from which an end user may move from any one of the images to one or more other images to which that starting image is linked (e.g., via selection of user-selectable controls displayed for an image for each such other linked image, such as overlaid on the displayed image), and similarly move from that next image to one or more additional images to which that next image is linked, etc. Additional details are included elsewhere herein regarding creating such a linked set of images.

After block 525, or if it is instead determined in block 520 that the instructions or other information received in block 505 are not to determine a linked set of images, the routine continues to block 530 to determine whether the instructions received in block 505 indicate to determine the shape of one or more rooms from previously or currently acquired images in the rooms (e.g., from one or more panorama images acquired in each of the rooms), and if so continues to block 550, and otherwise continues to block 590.

In block 550, the routine proceeds to select the next room (beginning with the first) for which one or more panorama images and/or other images acquired in the room are available, and to determine a 2D and/or 3D shape of that room based at least in part on the visual data of the one or more images acquired in that room and/or on additional data acquired in that room, including to optionally obtain additional metadata for each image (e.g., acquisition height information of the camera device or other image acquisition device used to acquire an image). The determination of a room shape for a room may include analyzing visual contents of one or more images acquired in that room by one or more image acquisition devices and/or analyzing additional non-visual data acquired in that room (e.g., by the one or more image acquisition devices), including to determine initial estimated acquisition pose information (e.g., acquisition location and optionally acquisition orientation) of each of the images. The analysis of the various data acquired in that room may further include identifying wall structural elements features of that room (e.g., windows, doorways and stairways and other inter-room wall openings and connecting passages, wall borders between a wall and another wall and/or receiving and/or a floor, etc.) and determining positions of those identified features within the determined room shape of the room, optionally by generating a 3D point cloud of some or all of the room walls and optionally the ceiling and/or floor (e.g., by analyzing at least visual data of images acquired in the room and optionally additional data captured by one or more of the image acquisition devices, such as using one or more of SfM or SLAM or MVS analysis), and/or by determining planar surface corresponding to some or all walls and optionally the floor and/or ceiling (e.g., by determining normal/orthogonal directions from planes of identified features and combining such information to determine wall location hypotheses and optionally clustering multiple wall location hypotheses for a given wall to reach a final determination of a location of that wall). Additional details are included elsewhere herein regarding determining room shapes and identifying additional information for the rooms, including initial estimated acquisition pose information for images acquired in the rooms.

After block 550, the routine continues to block 567 to determine whether there are more rooms for which one or more captured images are available, and if so returns to block 550 to determine the room shape for the next such room. Otherwise, the routine continues to block 537 to determine whether to generate a floor plan for the indicated building (e.g., based in part on the room shapes determined in block 550), and if not continues to block 590. Otherwise, the routine continues to block 537, where it optionally obtains additional information about the building, such as from activities performed during acquisition and optionally analysis of the images, and/or from one or more external sources (e.g., online databases, information provided by one or more end users, etc.)—such additional information may include, for example, exterior dimensions and/or shape of the building, additional images and/or annotation information acquired corresponding to particular locations within the building (optionally for locations different from acquisition locations of the acquired panorama or other images), additional images and/or annotation information acquired corresponding to particular locations external to the building (e.g., surrounding the building and/or for other structures on the same property), etc.

After block 537, the routine continues to block 575 to retrieve room shapes (e.g., room shapes generated in block 550) or otherwise obtain room shapes (e.g., based on human-supplied input) for rooms of the building, whether 2D or 3D room shapes. The routine then continues to block 577, where it uses the determined room shapes to create an initial 2D floor plan, such as by connecting inter-room passages in their respective rooms, by optionally positioning room shapes around determined acquisition location positions of the images (e.g., if the acquisition location positions are inter-connected), and by optionally applying one or more constraints or optimizations. Such a floor plan may include, for example, relative position and shape information for the various rooms without providing any actual dimension information for the individual rooms or building as a whole, and may further include multiple linked or associated sub-maps (e.g., to reflect different stories, levels, sections, etc.) of the building. The routine further associates positions of the doors, wall openings and other identified wall elements on the floor plan. After block 577, the routine optionally performs one or more steps 580-583 to determine and associate additional information with the floor plan. In block 580, the routine optionally estimates the dimensions of some or all of the rooms, such as from analysis of images and/or their acquisition metadata or from overall dimension information obtained for the exterior of the building, and associates the estimated dimensions with the floor plan. After block 580, the routine continues to block 583 to optionally associate further information with the floor plan (e.g., with particular rooms or other locations within the building), such as additional existing images with specified positions and/or annotation information. In block 585, if the room shapes from block 575 are not 3D room shapes, the routine further estimates heights of walls in some or all rooms, such as from analysis of images and optionally sizes of known objects in the images, as well as height information about a camera when the images were acquired, and uses that height information to generate 3D room shapes for the rooms—the routine further uses the 3D room shapes (whether from block 575 or block 585) to generate a 3D computer model floor plan of the building, with the 2D and 3D floor plans being associated with each other. In block 485, the routine then optionally invokes a MIGM system to perform further analysis using information obtained and/or generated in routine 400, such as to generate a partial or full floor plan for a building and/or to generate other mapping-related information, and with routine 500 of FIGS. 5A-5C providing one example of a routine for such an MIGM system. It will be appreciated that if sufficiently detailed dimension information is available, architectural drawings, blueprints, etc. may be generated from the floor plan.

After block 585, the routine continues to block 588 to store the determined room shape(s) and/or generated mapping information and/or other generated information, and to optionally further use some or all of the determined and generated information, such as to provide the generated 2D floor plan and/or 3D computer model floor plan for display on one or more client devices and/or to one or more other devices for use in automating navigation of those devices and/or associated vehicles or other entities, to similarly provide and use information about determined room shapes and/or a linked set of panorama images and/or about additional information determined about contents of rooms and/ or passages between rooms, to provide information as a response to another routine that invokes routine 500, etc.

If it is determined in block 530 that the information or instructions received in block 505 are not to determine shapes of one or more room, or in block 535 that the information or instructions received in block 505 are not to generate a floor plan for an indicated building, the routine continues instead to block 590 to perform one or more other indicated operations as appropriate. Such other operations may include, for example, receiving and responding to requests for previously generated floor plans and/or previously determined room shapes and/or previously determined linked sets of images and/or other generated information (e.g., requests for such information for one or more other devices for use in automated navigation, requests for such information for use by a BUAM system, requests for such information for use by a Building May Viewer system or other system for display or other presentation, requests from one or more client devices for such information for display or other presentation, operations to generate and/or train one or more neural networks or another analysis mechanisms for use in the automated operations of the routine, etc.), obtaining and storing information about buildings for use in later operations (e.g., information about dimensions, numbers or types of rooms, total square footage, adjacent or nearby other buildings, adjacent or nearby vegetation, exterior images, etc.), etc.

After blocks 588 or 590, the routine continues to block 595 to determine whether to continue, such as until an explicit indication to terminate is received, or instead only if an explicit indication to continue is received. If it is determined to continue, the routine returns to block 505 to wait for and receive additional instructions or information, and otherwise continues to block 599 and ends.

While not illustrated with respect to the automated operations shown in the example embodiment of FIGS. 5A-5C, in some embodiments human users may further assist in facilitating some of the operations of the MIGM system, such as for operator users and/or end users of the MIGM system to provide input of one or more types that is further used in subsequent automated operations. As non-exclusive examples, such human users may provide input of one or more types as follows: to provide input to assist with the linking of a set of images, such as to provide input in block 525 that is used as part of the automated operations for that block (e.g., to specify or adjust initial automatically determined directions between one or more pairs of images, to specify or adjust initial automatically determined final global positions of some or all of the images relative to each other, etc.); to provide input in block 537 that is used as part of subsequent automated operations, such as one or more of the illustrated types of information about the building; to provide input with respect to block 550 that is used as part of subsequent automated operations, such as to specify or adjust automatically determined pose information for one or more of the images, to specify or adjust initial automatically determined information about acquisition height information and/or other metadata for one or more images, to specify or adjust initial automatically determined element locations and/or estimated room shapes, etc.; to provide input with respect to block 577 that is used as part of subsequent operations, such as to specify or adjust initial automatically determined positions of room shapes within a floor plan being generated and/or to specify or adjust initial automatically determined room shapes themselves within such a floor plan; to provide input with respect to one or more of blocks 580 and 583 and 585 that is used as part of subsequent operations, such as to specify or adjust initial automatically determined information of one or more types discussed with respect to those blocks; etc. Additional details are included elsewhere herein regarding embodiments in which one or more human users provide input that is further used in additional automated operations of the MIGM system.

FIGS. 6A-6B illustrate an example flow diagram for a Building Usability Assessment Manager (BUAM) system routine 600. The routine may be performed by, for example, execution of the BUAM system 140 and/or BUAM application 156 of FIG. 1A, the BUAM system 340 and/or BUAM application 366 of FIG. 3, and/or an BUAM system as described with respect to FIGS. 2P-2X and elsewhere herein, such as to perform automated operations related to analyzing visual data from images captured in rooms of a building and optionally additional captured data to assess room layout and other usability information for the building's rooms and in-room objects (e.g., based at least in part on automated evaluations of one or more target attributes of each object) and for the building itself. In the example of FIGS. 6A-6B, analysis is performed using specified types of captured data and in particular manners, but in other embodiments, other types of information may be obtained and analyzed and otherwise used in other manners. In addition, while the illustrated embodiment acquires and uses information from the interior of a target building, it will be appreciated that other embodiments may perform similar techniques for other types of data, including for non-building structures and/or for information external to one or more target buildings of interest. Furthermore, some or all of the routine may be executed on a mobile device (e.g., a mobile computing device or other image acquisition device) used by a user to participate in acquiring image information and/or related additional data, and/or by a system remote from such a mobile device.

The illustrated embodiment of the routine begins at block 605, where information or instructions are received. The routine continues to block 610 to determine whether the instructions or other information indicate to assess usability of one or more indicated rooms (e.g., for some or all rooms of an indicated building). If not, the routine continues to block 690, and otherwise continues to block 615, where it selects the next indicated room (beginning with the first), and obtains one or more initial images of the room whose visual data includes most or all of the room (e.g., images previously acquired by an ICA system; images that are concurrently acquired in the room by one or more image acquisition devices, such as in an automated manner and/or using one or more associated users who participate in the image acquisition, and optionally in response to corresponding instructions initiated by the routine and provided to the image acquisition device(s) and/or associated user; etc.). The one or more initial images are then analyzed to identify one or more objects of interest in the room for which to gather more data (if the one or more initial images do not include sufficient details in their visual data about the objects, if other types of data than visual data is to be captured and is not available with the obtained information about the one or more images, etc.), and to optionally determine additional information about the room, such as to assess a label or other type or category information for the room, to assess a shape of the room and/or a layout of items in the room, to assess expected traffic flow patterns for the room (e.g., based at least in part on the layout and/or shape) and/or actual traffic flow patterns for the room (e.g., if there are sufficient images to show people moving through the room), etc. In some embodiments, additional information about some or all of the objects is additionally determined at the same time as identifying the objects (e.g., in a joint manner or otherwise related manner) based at least in part on the analysis of the visual data, such as object locations, objects labels or other type or category information for the objects, etc.—alternatively, in some embodiments and situations, at least some such information (e.g., one or more labels or other type or category information) may be obtained for the room and/or for one or more objects in the room in other manners, such as from previously generated information (e.g., by an ICA system) and/or from concurrently generated information (e.g., based at least in part on information from one or more users in the room who are participating in a concurrent image acquisition, etc.). Additional details are included elsewhere herein regarding determining information about a room based at least in part on visual data of one or more initial images captured in the room.

After block 615, the routine continues to block 620, where it selects the next object identified in block 615 (beginning with the first) for the current room, and determines additional information about the object, such as by analyzing visual data in the one or more initial images and optionally using other data to determine a type and/or category of the object (if not determined in block 615), to determine one or more target attributes of interest about the object for which to gather additional data (e.g., based at least in part on a type or category of the object, such as from a predefined list of some or all such target attributes for that type or category of object), to determine a location of the object (if not determined in block 615), etc.—as part of doing so, the routine may further analyze the visual data of the initial image(s) to verify whether that visual data includes sufficient detail about each of the target attributes, and to not include the target attribute in the additional data to be captured if sufficient detail is already available (and other non-visual types of additional data is not identified to be captured). The routine further determines one or more types of additional data to be gathered about each of the target attributes that is not already available (whether one or more additional images and/or one or more other types of additional data), generates corresponding instructions to direct automated capture of the additional data and/or to direct an associated user to participate in the capture of the additional data, and provides the instructions to the image acquisition device(s) and/or user, optionally along with examples (or access to such examples if desired, such as via user-selectable links). The routine then further acquires the additional data about the object and its target attributes from the one or more image acquisition devices and/or the associated user. Additional details are included elsewhere herein regarding determining information about an object based at least in part on visual data of one or more initial images captured for a room in which the object is located.

After block 620, the routine continues to block 625, where it optionally assesses the additional data that is captured in block 620 to identify possible issues (e.g., an incorrect object and/or target attribute that is visible in additional images and/or described in other data, insufficient details in visual data of additional images or other data to enable an evaluation of a target attribute and/or an assessment of an object, other types of image problems or other types of data problems, etc.), and if so may initiate corrective actions (e.g., providing further instructions to the image acquisition device(s) and/or associated user to capture additional images and/or other data that correct the issues), including obtaining any such corrective additional images and/or other data that are used to supplement or replace the initial additional images and/or other initial additional data that have the identified possible issues. In addition, while the acquisition of initial images, additional images and optionally other additional data is illustrated in blocks 615-625 as occurring after the providing of instructions and before proceeding to a next block of the routine, it will be appreciated that the obtaining of such images and/or other data may occur substantially immediately (e.g., concurrently with the instructions, such as in an interactive manner) and/or in an asynchronous manner (e.g., at a substantial amount of time after providing the instructions, such as minutes, hours, days, etc.), and that the routine may perform other operations (e.g., for other rooms and/or other buildings) while waiting for the images and optionally other additional data.

After block 625, the routine continues to block 630, where it determines whether there are more identified objects in the current room, and if so returns to block 620 to select the next such object. Otherwise, the routine continues to block 635 where it analyzes, for each identified target attribute of each of the identified objects in the current room, the captured additional data available about that target attribute in order to evaluate the target attribute for its object with respect to one or more defined factors or other defined attribute criteria for that type of target attribute and/or object—in at least some embodiments, the evaluation for a target attribute is performed to estimate a current contribution of that target attribute to its object's assessment of usability, such as that object's contribution to the overall usability of the room for an intended purpose of the room. After block 635, the routine continues to block 640, where for each identified object in the current room, the captured additional data and other information about the room is analyzed to assess usability for the object with respect to one or more defined object criteria for that type of object and/or enclosing room, such as to assess the contribution of that object to the overall usability of the room for an intended purpose of the room, including to use the information from the evaluations of the one or more target attributes of the object (e.g., to combine the evaluation information from multiple target attributes) and to optionally further use additional information about the object. In block 645, the routine then assesses the overall usability of the room for the intended purpose, such as with respect to one or more defined room criteria for that type of room, including to use the information from the assessments of the one or more identified objects in the room (e.g., to combine the assessment information from multiple identified objects), and to optionally further use additional information about the room (e.g., an assessed room layout, estimated traffic flow patterns for the room, etc.).

After block 645, the routine continues to block 650, where it determines whether there are additional indicated rooms to assess, and if so returns to block 615 to select the next such room—in at least some embodiments and situations, the determination of whether there are additional rooms may be made in a dynamic manner based at least in part on information received from one or more image acquisition devices and/or an associated user in the room, such as if the image acquisition device(s) and/or associated user move to a next room in the building and interactively proceed to obtain one or more initial images for that next room as part of the next iteration of the operations of block 615 (or instead indicate that a last room of the building has been captured, such that there are not more rooms). Otherwise, the routine continues to block 685 where, if multiple rooms of a building have been assessed, the routine optionally assesses overall usability of the building with respect to one or more defined building assessment criteria, such as with respect to an intended purpose of the building—as part of doing so, the routine may use information from the assessments of the rooms in the building (e.g., to combine the assessment information from multiple rooms), and to further optionally use additional information about the building (e.g., an assessed building layout, estimated traffic flow patterns for the building, etc.). Additional details are included elsewhere herein regarding the evaluations and assessments performed with respect to block 635-645 and 685.

After block 685, the routine continues to block 688, where it stores the information determined and generated in blocks 615-685, and optionally displays some or all of the determined and/or assessed information and/or optionally provides some or all of the determined and/or assessed information for further use (e.g., for use in automated navigation of the building by one or more devices; as a response to another routine that invokes routine 600, such as with respect to block 419 of FIG. 4; etc.).

If it is instead determined in block 610 that the instructions or information received in block 605 are not to assess usability of one or more indicated rooms, the routine continues instead to block 690, where it performs one or more other indicated operations as appropriate. Such other operations may include, for example, one or more of the following: receiving and responding to requests for previously generated assessments for rooms, buildings and/or objects and/or other generated information (e.g., requests for such information for one or more other devices for use in automated navigation, requests for such information for use by a Building May Viewer system or other system for display or other presentation, requests from one or more client devices for such information for display or other presentation, etc.); operations to generate and/or train one or more neural networks or another analysis mechanisms for use in the automated operations of the routine; obtaining and storing information about buildings, rooms, objects and/or object target attributes for use in later operations (e.g., information about expected or typical target attributes for particular objects or object types, information about expected or typical objects for particular rooms or room types, information about expected or typical rooms for particular buildings or building types, information about defined criteria of one or more types for use in automated analyses, information about factors to use in evaluating particular target attributes or types of target attributes or types of associated objects, etc.); information about intended purposes for particular rooms and/or room types and/or buildings and/or building types; etc.

After blocks 688 or 690, the routine continues to block 695 where it determines whether to continue, such as until an explicit indication to terminate is received, or instead to not continue unless an explicit indication to continue is received. If it is determined to continue, the routine returns to block 605, and otherwise continues to block 699 and ends. It will be appreciated that, while the example embodiment of the routine 600 receives information about assessing one or more rooms and optionally multi-room buildings and proceeds to perform such activities, other embodiments of the routine may analyze other levels of information, such as to instead evaluate one or more indicated target attributes (e.g., without further assessing one or more objects to which the target attribute(s) correspond), to assess one or more indicated objects (e.g., without further assessing one or more rooms in which the object(s) are located), etc.

FIG. 7 illustrates an example embodiment of a flow diagram for a Building Map Viewer system routine 700. The routine may be performed by, for example, execution of a map viewer client computing device 175 and its software system(s) (not shown) of FIG. 1A, a client computing device 390 and/or mobile computing device 360 of FIG. 3, and/or a mapping information viewer or presentation system as described elsewhere herein, such as to receive and display determined room shapes and/or other mapping information (e.g., a 2D or 3D floor plan) for a defined area that optionally includes visual indications of one or more determined image acquisition locations and/or of one or more generated usability assessments (e.g., associated with particular locations in the mapping information), as well as to optionally display additional information (e.g., images, optionally with overlaid or otherwise associated usability assessment information for one or more objects and/or rooms visible in the images) associated with particular locations in the mapping information. In the example of FIG. 7, the presented mapping information is for the interior of a building (such as a house), but in other embodiments, other types of mapping information may be presented for other types of buildings or environments and used in other manners, as discussed elsewhere herein.

The illustrated embodiment of the routine begins at block 705, where instructions or information are received. At block 710, the routine determines whether the received instructions or information indicate to display or otherwise present information representing a building interior, and if not continues to block 790. Otherwise, the routine proceeds to block 712 to retrieve one or more room shapes or a floor plan for a building or other generated mapping information for the building, and optionally indications of associated linked information for the building interior and/or a surrounding location external to the building, and optionally indications of information (e.g., usability assessment information) to overlay on the mapping information or otherwise be associated with the mapping information, and selects an initial view of the retrieved information (e.g., a view of the floor plan, a particular room shape, etc.). In block 715, the routine then displays or otherwise presents the current view of the retrieved information, and waits in block 717 for a user selection. After a user selection in block 717, if it is determined in block 720 that the user selection corresponds to adjusting the current view for a current location (e.g., to change one or more aspects of the current view, to add usability assessment information that is overlaid or otherwise associated with the current view, etc.), the routine continues to block 722 to update the current view in accordance with the user selection, and then returns to block 715 to update the displayed or otherwise presented information accordingly. The user selection and corresponding updating of the current view may include, for example, displaying or otherwise presenting a piece of associated linked information that the user selects (e.g., a particular image associated with a displayed visual indication of a determined acquisition location, such as to overlay the associated linked information over at least some of the previous display), and/or changing how the current view is displayed (e.g., zooming in or out; rotating information if appropriate; selecting a new portion of the floor plan to be displayed or otherwise presented, such as with some or all of the new portion not being previously visible, or instead with the new portion being a subset of the previously visible information; etc.).

If it is instead determined in block 710 that the instructions or other information received in block 705 are not to present information representing a building interior, the routine continues instead to block 790 to perform other indicated operations as appropriate, such as any housekeeping tasks, to configure parameters to be used in various operations of the system (e.g., based at least in part on information specified by a user of the system, such as a user of a mobile device who captures one or more building interiors, an operator user of the MIGM system, etc., including for use in personalizing information display for a particular user in accordance with his/her preferences), to obtain and store other information about users of the system, to respond to requests for generated and stored information, etc.

Following block 790, or if it is determined in block 720 that the user selection does not correspond to the current building area, the routine proceeds to block 795 to determine whether to continue, such as until an explicit indication to terminate is received, or instead only if an explicit indication to continue is received. If it is determined to continue (including if the user made a selection in block 717 related to a new location to present), the routine returns to block 705 to await additional instructions or information (or to continue directly on to block 712 if the user made a selection in block 717 related to a new location to present), and if not proceeds to step 799 and ends.

Aspects of the present disclosure are described herein with reference to flowchart illustrations and/or block diagrams of methods, apparatus (systems), and computer program products according to embodiments of the present disclosure. It will be appreciated that each block of the flowchart illustrations and/or block diagrams, and combinations of blocks in the flowchart illustrations and/or block diagrams, can be implemented by computer readable program instructions. It will be further appreciated that in some implementations the functionality provided by the routines discussed above may be provided in alternative ways, such as being split among more routines or consolidated into fewer routines. Similarly, in some implementations illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel, or synchronous or asynchronous) and/or in a particular order, in other implementations the operations may be performed in other orders and in other manners. Any data structures discussed above may also be structured in different manners, such as by having a single data structure split into multiple data structures and/or by having multiple data structures consolidated into a single data structure. Similarly, in some implementations illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by corresponding claims and the elements recited by those claims. In addition, while certain aspects of the invention may be presented in certain claim forms at certain times, the inventors contemplate the various aspects of the invention in any available claim form. For example, while only some aspects of the invention may be recited as being embodied in a computer-readable medium at particular times, other aspects may likewise be so embodied.

What is claimed is:

1. A computer-implemented method comprising:
   obtaining, by one or more computing systems, one or more panorama images captured in a room of a house and having visual data that in combination provides 360 degrees of horizontal visual data of the room;
   analyzing, by the one or more computing systems, the visual data of the one or more panorama images to identify problems with quality of the one or more panorama images and with coverage of the house by the one or more panorama images;
   initiating, by the one or more computing systems, recapture of the one or more panorama images to produce new copies of the one or more panorama images that have no problems with quality and no problems with coverage of the house;
   determining, by the one or more computing systems after the analyzing and the initiating, and for each of multiple objects installed in the room, one or more target attributes of that object for which to capture additional data, including analyzing the visual data of the recaptured one or more panorama images to identify the multiple objects and to determine a type of each of the multiple objects and to determine locations of the multiple objects in the room and to determine based at least in part on the determined type of each of the multiple objects that the one or more target attributes of that object lack details in the visual data of the one or more panorama images sufficient to satisfy a defined threshold;
   providing, by the one or more computing systems, instructions about capturing the additional data about the one or more target attributes of each of the multiple objects and information about the determined locations of the multiple objects, wherein the capturing of the additional data includes obtaining additional perspective images of one or more specified types of the multiple objects;
   analyzing, by the one or more computing systems and via use of at least one trained neural network, additional visual data of the additional perspective images to, for each of the multiple objects, verify whether the additional data about the one or more target attributes of that object has been captured, including to determine for one of the additional perspective images that the one additional perspective image lacks any of the additional data by failing to include visual data that satisfies the defined threshold about any target attribute of any of the multiple objects;
   providing, by the one or more computing systems, further instructions to recapture the one additional perspective image, and obtaining a new copy of the one additional perspective image that includes at least some of the additional data;
   determining, by the one or more computing systems, an assessment of a current usability of the room for an indicated purpose, including assessing current contributions of the multiple objects to the current usability of the room based at least in part on information from the additional data about the one or more target attributes of each of the multiple objects, and including combining information about the assessed current contributions of the multiple objects; and
   displaying, by the one or more computing systems, information about the determined assessment of the current usability of the room along with additional visual information about the room.

2. The computer-implemented method of claim 1 wherein the providing of the instructions about the capturing of the additional data further includes providing instructions to obtain additional information about at least one of a type of the room or a label for the room, and about, for each of the multiple objects, a label for that object, and about, for one or more of the multiple objects, a textual description of one or more additional attributes of the one or more objects, and wherein the determining of the assessment of the current usability of the room and the assessing of the current contributions of the multiple objects are based at least in part on the obtained additional information.

3. The computer-implemented method of claim 1 wherein the house includes multiple rooms and has one or more associated external areas outside of the house, and wherein the method further comprises:
  performing, by the one or more computing systems, and for each of the multiple rooms, the obtaining, and the determining of the one or more target attributes for each of the multiple objects, and the providing of the instructions, and the analyzing, and the providing of the further instructions, and the determining of the assessment of the current usability of that room;
  performing, by the one or more computing systems, and for each of the one or more associated external areas, obtaining of one or more further images captured in that external area, and determining of one or more further target attributes for each of one or more further objects in that external area, and providing of additional instructions about capturing further additional visual data in further additional images about the one or more further target attributes for each of the one or more further objects, and determining an assessment of the usability of that external area for a further indicated purpose based at least in part on combining further determined contributions of the one or more further objects; and
  determining, by the one or more computing systems, an assessment of overall usability of the house based at least in part on combining information about the determined assessment of the current usability of each of the multiple rooms and information about the determined assessment of the usability of each of the one or more external areas,
  and wherein the displaying of the information by the one or more computing systems further includes displaying information about the determined assessment of the overall usability of the house overlaid on a displayed floor plan of the house.

4. A computer-implemented method comprising:
  obtaining, by one or more computing systems, one or more images captured in a room of a house and having visual data about multiple objects installed in the room;
  determining, by the one or more computing systems, additional visual data to acquire for the multiple objects to enable assessments of the multiple objects, including determining, for each of the multiple objects, one or more target attributes of that object for which to capture additional data for use in a respective one of the assessments for that object, including analyzing the visual data of the one or more images to identify the multiple objects and to determine a type of each of the multiple objects and to determine based at least in part on the determined type of each of the multiple objects that the one or more target attributes of that object lack details in the visual data sufficient to satisfy a defined threshold;
  providing, by the one or more computing systems, instructions for capturing additional images of the multiple objects having the additional visual data to provide the additional data about the one or more target attributes of each of the multiple objects to enable the assessments of the multiple objects;
  analyzing, by the one or more computing systems and via use of at least one trained neural network, the additional visual data of the additional images to, for each of the multiple objects, verify that the additional data about the one or more target attributes of that object has been captured;
  determining, by the one or more computing systems, an assessment of a current usability of the room for an indicated purpose by using the additional data from the additional images about the one or more target attributes of each of the multiple objects to generate the assessments of the multiple objects, including assessing contributions of the multiple objects to the current usability of the room based at least in part on information from the additional data about the one or more target attributes of each of the multiple objects, and by further combining information about the assessed contributions of the multiple objects; and
  providing, by the one or more computing systems, information about the determined assessment of the current usability of the room.

5. The computer-implemented method of claim 4 further comprising analyzing, by the one or more computing systems, the visual data of the one or more images to identify problems with quality of the one or more images and with coverage of the house by the one or more images, and initiating, by the one or more computing systems, recapture of the one or more images to produce new copies of the one or more images that overcome those one or more problems, and wherein the determining of the additional visual data to acquire is performed using the recaptured one or more images.

6. The computer-implemented method of claim 4 further comprising:
  obtaining, by the one or more computing systems, information about labels identifying the multiple objects; and
  identifying, by the one or more computing systems and based on the labels, a plurality of target attributes for the multiple objects that include the one or more target attributes of each of the multiple objects.

7. The computer-implemented method of claim 4 further comprising:
  obtaining, by the one or more computing systems, information about at least one of a label for the room or a type of the room; and
  determining, by the one or more computing systems and based at least in part on the at least one of the label for the room or the type of the room, the multiple objects.

8. The computer-implemented method of claim 4 wherein the additional data includes information about at least one of a shape of the room or a layout of items in the room, and wherein the determining of the assessment of the current usability of the room for the indicated purpose is based at least in part on the information about the at least one of the shape or layout of the room.

9. The computer-implemented method of claim 4 wherein the additional data includes at least one of a type of the room or a label for the room, and wherein the method further comprises determining, by the one or more computing systems, the indicated purpose of the room based at least in part on the at least one of the type of the room or the label for the room.

10. The computer-implemented method of claim 4 wherein the analyzing of the additional visual data of the additional images further includes determining that the additional visual data lacks visual data that satisfies the defined threshold about at least one target attribute of one of the multiple objects, and wherein the method further comprises providing, by the one or more computing systems, further instructions to capture a further additional image with further additional visual data that satisfies the defined threshold about the at least one target attribute of the one object, and using the further additional visual data as part of the assessing the contribution of the one object to the current usability of the room.

11. The computer-implemented method of claim 4 wherein the analyzing of the additional visual data of the additional images further includes determining that one of the additional images lacks any of the additional data, and wherein the method further comprises providing, by the one or more computing systems, further instructions to capture a further copy of the one additional image that includes at least some of the additional data, and using the further copy of the additional image as part of the assessing of the contributions of the multiple objects to the current usability of the room.

12. The computer-implemented method of claim 4 wherein the analyzing of the visual data of the one or more images further includes determining locations of the multiple objects in the one or more images, and wherein the providing of the instructions further includes providing information about the determined locations of the multiple objects.

13. The computer-implemented method of claim 4 wherein the multiple objects installed in the room each is at least one of a light fixture, or a plumbing fixture, or a piece of built-in furniture, or a built-in structure inside walls of the room, or an electrical appliance, or a gas-powered appliance, or an oil-powered appliance, or an object to produce a fire by burning fuel, or installed flooring, or an installed wall covering, or an installed window covering, or hardware attached to a door, or hardware attached to a window, or an installed countertop.

14. The computer-implemented method of claim 4 wherein the analyzing of the visual data of the one or more images further identifies one or more additional objects in the room that are each a piece of furniture or a moveable item, wherein the determining of the one or more target attributes and the providing of the instructions and the analyzing of the additional visual data and the assessing of the contributions are each further performed for the one or more additional objects, and wherein the determining of the assessment of the current usability of the room for the indicated purpose is further based in part on assessments of contributions for the one or more additional objects to the current usability of the room.

15. The computer-implemented method of claim 4 wherein the determining of the assessment of the current usability of the room for the indicated purpose based at least in part on combining the information about the assessed contributions of the multiple objects includes at least one of, by the one or more computing systems, performing a weighted average of the assessed contributions of the multiple objects using weights based at least in part on types of the multiple objects, or providing the assessed contributions of the multiple objects to an additional trained neural network, and receiving the determined assessment of the current usability for the room from the additional trained neural network.

16. The computer-implemented method of claim 4 wherein the assessing of the contributions of the multiple objects to the current usability of the room for the indicated purpose and the determining of the assessment of the current usability of the room for the indicated purpose are performed by assessing properties of the multiple objects and of the room that include at least one of condition, or quality, or functionality, or effectiveness.

17. The computer-implemented method of claim 4 wherein the one or more images include one or more panorama images that in combination include 360 degrees of horizontal visual coverage of the room, wherein the additional images include one or more perspective images each having less than 180 degrees of horizontal visual coverage of the room, wherein the analyzing of the visual data and the analyzing of the additional visual data are performed without using any depth information from any depth-sensing sensors for distances to surrounding surfaces from locations at which the one or more images and the additional images are captured, wherein the additional visual data further includes visual information in at least one of a video or a three-dimensional model about at least one of the multiple objects and/or at least one target attribute, wherein the method further comprises obtaining, by the one or more computing systems, additional non-visual data that has further additional details about at least one object and/or at least one target attribute and that includes at least one of textual data or audio data, and wherein the determining of the contribution of one or more of the multiple objects is further based in part on analysis of the additional non-visual data and of the at least one of the video or the three-dimensional model.

18. A non-transitory computer-readable medium having stored contents that cause one or more computing devices to perform automated operations that include at least:
   obtaining, by the one or more computing devices, one or more images captured in a room of a building;
   analyzing, by the one or more computing devices, visual data of the one or more images to determine that there are no problems with quality of the one or more images and no problems with coverage of the building by the one or more images;
   determining, by the one or more computing devices and based at least in part on analyzing visual data of the one or more images, additional visual data to acquire for multiple objects identified in the room to enable further assessments of the multiple objects, including determining, for each of the multiple objects, one or more target attributes of that object for which to gather additional data for use in a respective one of the assessments for that object;
   providing, by the one or more computing devices, instructions for capturing additional images of the multiple objects having the additional visual data to provide the additional data about the one or more target attributes of each of the multiple objects to enable the assessments of the multiple objects;
   analyzing, by the one or more computing devices, the additional visual data of the additional images to, for each of the multiple objects, verify whether the additional data about the one or more target attributes of that object has been captured, including to determine that the additional visual data lacks visual data that satisfies a defined threshold about at least one target attribute of one of the multiple objects;
providing, by the one or more computing devices, further instructions to capture a further additional image with further additional visual data that satisfies the defined threshold about the at least one target attribute of the one object, and obtaining the further additional image;
determining, by the one or more computing devices, the assessments of the multiple objects, including, for each of the multiple objects, using the additional data from the additional images about the one or more target attributes of that object to determine an assessment of a contribution of that object to usability of the room for an indicated purpose based at least in part on information from the additional data about the one or more target attributes of that object; and
providing, by the one or more computing devices, information about the determined assessment of the multiple objects.

19. The non-transitory computer-readable medium of claim 18 wherein the stored contents include software instructions that, when executed, cause the one or more computing devices to perform further automated operations that include determining, by the one or more computing devices and based at least in part on the analyzing of the visual data of the recaptured one or more images that lack problems with quality and with coverage of the building, that the visual data lacks a level of details to satisfy a defined threshold about the one or more target attributes of each of the multiple objects, and wherein the providing of the instructions is performed in response to the determining that the visual data lacks the level of details.

20. The non-transitory computer-readable medium of claim 18 wherein the analyzing of the visual data of the one or more images is performed using at least one first trained neural network, and wherein the analyzing of the additional visual data of the additional images is performed using at least one second trained neural network.

21. The non-transitory computer-readable medium of claim 18 wherein the automated operations further include determining, by the one or more computing devices, an assessment of the usability of the room for the indicated purpose, including combining information about the assessments of the contributions of the multiple objects, and wherein the providing of the information about the determined assessment for each of the multiple objects further includes displaying, by the one or more computing devices, information about the determined assessment of the usability of the room.

22. The non-transitory computer-readable medium of claim 21 wherein the additional data includes information about at least one of a shape of the room or a layout of items in the room, and wherein the determining of the assessment of the usability of the room for the indicated purpose is based at least in part on the information about the at least one of the shape or layout of the room.

23. The non-transitory computer-readable medium of claim 21 wherein the additional data includes at least one of a type of the room or a label for the room, and wherein the automated operations further include determining, by the one or more computing devices, the indicated purpose of the room based at least in part on the at least one of the type of the room or the label for the room.

24. The non-transitory computer-readable medium of claim 18 wherein the automated operations further include:
obtaining, by the one or more computing devices, information about labels identifying the multiple objects; and
identifying, by the one or more computing devices and based on the labels, a plurality of target attributes for the multiple objects that include the one or more target attributes of each of the multiple objects.

25. A system comprising:
one or more hardware processors of one or more computing systems; and
one or more memories with stored instructions that, when executed by at least one of the one or more hardware processors, cause at least one of the one or more computing systems to perform automated operations including at least:
obtaining one or more images captured in a room of a building;
determining, based at least in part on analyzing visual data of the one or more images, one or more objects in the room, a type of each of the one or more objects, and for each of the one or more objects based at least in part on the type of that object, one or more target attributes of that object for which to capture additional data based at least in part on the visual data of the one or more images lacking details sufficient to satisfy a defined threshold about those target attributes;
providing instructions for capturing the additional data about the one or more target attributes of each of the one or more objects, including to obtain additional visual data about the one or more objects;
analyzing, for each of the one or more objects, the additional visual data as part of verifying that the additional data about the one or more target attributes of that object has been captured; and
providing information about the verifying for each of the one or more objects.

26. The system of claim 25 wherein the automated operations further include:
assessing contributions of the one or more objects to usability of the room for an indicated purpose based at least in part on information from the additional data about the one or more target attributes of each of the one or more objects; and
providing information about the assessed contributions of the one or more objects.

27. The system of claim 26 wherein the one or more objects include multiple objects, and wherein the stored instructions include software instructions that, when executed, cause the one or more computing systems to perform further automated operations that include:
determining an assessment of the usability of the room for the indicated purpose, including combining information about the assessed current contributions of the multiple objects; and
providing information about the determined assessment of the usability of the room, to cause display of information about the determined assessment of the usability of the room in a manner associated with other visual information about the room.

28. The system of claim 26 wherein the one or more images include one or more initial images with initial visual data,
wherein the analyzing of the visual data of the one or more images is performed using at least one first trained neural network, wherein the additional visual data is included in at least one of one or more additional images or one or more videos or one or more three-dimensional models, and wherein the automated operations further include evaluating the one or more target attributes of each of the one or more objects based at least in part on using at least one second trained neural network to analyze the additional visual data, and using information from the evaluating as part of the assessing of the contributions of the one or more objects.

29. The system of claim 28 wherein the automated operations further include analyzing information associated with the additional visual data to verify that it matches other information associated with the visual data of the one or more images, including by at least one of comparing at least some of the additional visual data to at least some of the visual data of the one or more images to verify that the additional visual data and the visual data show at least one common object, or comparing first acquisition pose information for the one or more additional images to second acquisition pose information for the one or more images to verify that the first and second acquisition pose information matches.

30. The system of claim 25 wherein the automated operations further include obtaining, by the one or more computing systems, additional non-visual data having further additional details about at least one object and/or at least one target attribute, and wherein the automated operations further include evaluating the one or more target attributes of each of the one or more objects based at least in part on the additional non-visual data, and using information from the evaluating as part of the assessing of the contributions of the one or more objects.

* * * * *